US009842295B2

(12) United States Patent
Fisher, Jr.

(10) Patent No.: US 9,842,295 B2
(45) Date of Patent: Dec. 12, 2017

(54) TECHNICAL SUPPORT AGENT AND TECHNICAL SUPPORT SERVICE DELIVERY PLATFORM

(75) Inventor: John W. Fisher, Jr., Boulder, CO (US)

(73) Assignee: TROPPUS SOFTWARE CORPORATION, Boulder, CO (US)

( * ) Notice: Subject to any disclaimer, the term of this patent is extended or adjusted under 35 U.S.C. 154(b) by 347 days.

(21) Appl. No.: 13/593,702

(22) Filed: Aug. 24, 2012

(65) Prior Publication Data

US 2012/0321071 A1  Dec. 20, 2012

Related U.S. Application Data

(62) Division of application No. 11/966,874, filed on Dec. 28, 2007, now Pat. No. 9,271,402.

(60) Provisional application No. 60/882,928, filed on Dec. 30, 2006.

(51) Int. Cl.
*G06N 5/02* (2006.01)
*G06Q 10/06* (2012.01)
*G06Q 10/10* (2012.01)

(52) U.S. Cl.
CPC .............. *G06N 5/02* (2013.01); *G06Q 10/06* (2013.01); *G06Q 10/10* (2013.01)

(58) Field of Classification Search
CPC ........... G06N 5/02; G06Q 10/06; G06Q 10/10
See application file for complete search history.

(56) References Cited

U.S. PATENT DOCUMENTS

| 5,204,897 A | 4/1993 | Wyman |
| 5,630,125 A | 5/1997 | Zellweger |
| 5,774,118 A | 6/1998 | Hatakama |
| 6,292,796 B1 | 9/2001 | Drucker et al. |
| 6,298,457 B1 | 10/2001 | Rachlin et al. |
| 6,357,017 B1 | 3/2002 | Bereiter et al. |
| 6,604,141 B1 | 8/2003 | Ventura |
| 6,615,240 B1 | 9/2003 | Sullivan et al. |
| 6,658,598 B1 | 12/2003 | Sullivan |
| 6,694,314 B1 | 2/2004 | Sullivan et al. |
| 6,901,397 B1 | 5/2005 | Moldenhauer et al. |
| 6,999,990 B1 | 2/2006 | Sullivan et al. |
| 7,013,410 B2 | 3/2006 | Asauchi |
| 7,305,465 B2 * | 12/2007 | Wing et al. .................. 709/223 |
| 7,376,620 B2 | 5/2008 | Kay et al. |
| 7,415,417 B2 | 8/2008 | Boyer et al. |
| 7,451,142 B2 | 11/2008 | Arellanes et al. |
| 7,565,338 B2 | 7/2009 | Beniaminy et al. |
| 7,657,436 B2 | 2/2010 | Elmore et al. |

(Continued)

FOREIGN PATENT DOCUMENTS

| WO | 01/39042 A2 | 5/2001 |
| WO | WO0139042 | * 5/2001 |

OTHER PUBLICATIONS

Windows Vista Network and Sharing Center, Mar. 15, 2006.*

(Continued)

*Primary Examiner* — Benjamin Wu
(74) *Attorney, Agent, or Firm* — Seed Intellectual Property Law Group LLP

(57) ABSTRACT

An embodiment of a method for providing technical support service includes generating a plurality of problem resolutions that are determined to resolve an identified technical problem; attributing weights to each of said plurality of problem resolutions according to frequency of use; and in response to a request to resolve said identified problem, selecting a problem resolution from among said plurality of problem resolutions based at least in part on said attributed weights.

30 Claims, 36 Drawing Sheets

(56) References Cited

U.S. PATENT DOCUMENTS

| | | | |
|---|---|---|---|
| 7,765,525 B1 | 7/2010 | Davidson et al. | |
| 7,962,416 B1* | 6/2011 | Durbin | G06F 21/10 705/55 |
| 2002/0161600 A1 | 10/2002 | Stubiger et al. | |
| 2003/0028513 A1 | 2/2003 | Pawar | |
| 2003/0065418 A1 | 4/2003 | Kwak | |
| 2003/0088451 A1 | 5/2003 | Ueno | |
| 2003/0088641 A1 | 5/2003 | Ueno | |
| 2003/0149756 A1 | 8/2003 | Grieve et al. | |
| 2004/0012808 A1* | 1/2004 | Payne | G06F 11/0733 358/1.15 |
| 2004/0083213 A1 | 4/2004 | Wu et al. | |
| 2004/0139106 A1 | 7/2004 | Bachman et al. | |
| 2004/0236843 A1 | 11/2004 | Wing et al. | |
| 2005/0081111 A1 | 4/2005 | Morgan et al. | |
| 2005/0097197 A1* | 5/2005 | Vincent | G06F 9/4446 709/223 |
| 2005/0097396 A1 | 5/2005 | Wood | |
| 2005/0097507 A1 | 5/2005 | White et al. | |
| 2006/0064403 A1 | 3/2006 | Rechterman et al. | |
| 2006/0106725 A1 | 5/2006 | Finley, Jr. et al. | |
| 2006/0126818 A1* | 6/2006 | Berger | H04M 3/5191 379/265.09 |
| 2006/0265337 A1* | 11/2006 | Wesinger, Jr. | 705/65 |
| 2007/0033230 A1 | 2/2007 | Minowa et al. | |
| 2007/0043717 A1 | 2/2007 | Arellanes et al. | |
| 2007/0150417 A1 | 6/2007 | Hu | |
| 2007/0150465 A1 | 6/2007 | Brave et al. | |
| 2007/0220308 A1* | 9/2007 | Yeung | G06F 11/1469 714/5.1 |
| 2008/0021838 A1 | 1/2008 | Wardaschka et al. | |
| 2008/0034060 A1* | 2/2008 | Fisher, Jr. | G06F 9/4446 709/218 |
| 2008/0091454 A1* | 4/2008 | Fisher, Jr. | H04L 12/66 705/301 |
| 2008/0172574 A1* | 7/2008 | Fisher | G06Q 10/06 714/25 |
| 2008/0222533 A1* | 9/2008 | Hankejh | G06Q 30/02 715/738 |
| 2008/0282204 A1 | 11/2008 | Del Valle Lopez | |
| 2009/0030981 A1* | 1/2009 | Knoepp | H04L 12/1818 709/204 |

OTHER PUBLICATIONS

International Search Report, dated Dec. 17, 2007, for PCT/US2007/075275, 2 pages.
Written Opinion, dated Dec. 17, 2007, for PCT/US2007/075275, 7 pages.
International Search Report, dated Dec. 28, 2007, for PCT/US2007/075006, 2 pages.
Written Opinion, dated Dec. 28, 2007, for PCT/US2007/075006, 5 pages.
International Search Report, dated Oct. 9, 2008, for PCT/US2007/089141, 2 pages.
Office Action, dated Oct. 8, 2010, for U.S. Appl. No. 11/832,464, 17 pages.
Amendment and Response to Office Action, filed Mar. 8, 2011, for U.S. Appl. No. 11/832,464, 17 pages.
Final Office Action, dated May 26, 2011, for U.S. Appl. No. 11/832,464, 14 pages.
Amendment and Response to Final Office Action, filed Jul. 20, 2011, for U.S. Appl. No. 11/832,464, 10 pages.
Request for Continued Examination, filed Sep. 23, 2011, for U.S. Appl. No. 11/832,464, 4 pages.
Prelim Amendment, filed Aug. 29, 2007, for U.S. Appl. No. 11/833,949, 6 pages.
Office Action, dated Jul. 2, 2009, for U.S. Appl. No. 11/833,949, 17 pages.
Petition to Revive, Amendment, and Response to Final Office Action, filed Sep. 14, 2011, for U.S. Appl. No. 11/833,949, 13 pages.
Final Office Action, dated Nov. 16, 2011, for U.S. Appl. No. 11/833,949, 23 pages.
Response to Final Office Action, filed Feb. 14, 2012, for U.S. Appl. No. 11/833,949, 6 pages.
Office Action, dated Mar. 8, 2012, for U.S. Appl. No. 11/832,464, 16 pages.
Amendment, Terminal Disclaimer, and 1-month Extension of Time, filed Jul. 9, 2012, for U.S. Appl. No. 11/832,464, 12 pages.
Final Office Action, dated Oct. 3, 2012, for U.S. Appl. No. 11/832,464, 18 pages.
Amendment and Response to Final Office Action, filed Dec. 3, 2012, for U.S. Appl. No. 11/832,464, 12 pages.
Advisory Action, dated Dec. 11, 2012, for U.S. Appl. No. 11/832,464, 3 pages.
Amendment and Response to Office Action filed Feb. 14, 2012, for U.S. Appl. No. 11/966,874, 19 pages.
Amendment and Response to Restriction Requirement filed Sep. 27, 2011, for U.S. Appl. No. 11/966,874, 17 pages.
Office Action—Restriction Requirement dated Sep. 8, 2011, for U.S. Appl. No. 11/966,874, 13 pages.
Office Action dated Dec. 8, 2011, for U.S. Appl. No. 11/966,874, 14 pages.

* cited by examiner

FIG.29

| ACTIVATION | PRODUCT FEATURE NAME | EXPIRATION DATE | ACTIVATION STATUS | FEATURE ID | LICENSE PRODUCT ID |
|---|---|---|---|---|---|
| ACTIVATE FEATURE | SC.CHAT | 12/31/2007 12:57:16 AM | 3 | 1577 | 18676 |
| ACTIVATE FEATURE | SC.PROVIDER | 12/31/2007 12:57:16 AM | 3 | 1578 | 18676 |
| ACTIVATE FEATURE | SC.HISTORY | 12/31/2007 12:57:16 AM | 3 | 1579 | 18676 |
| ACTIVATE FEATURE | SC.PHONESUPPORT | 12/31/2007 12:57:16 AM | 3 | 1580 | 18676 |
| ACTIVATE FEATURE | SC.SETTINGS | 12/31/2007 12:57:16 AM | 3 | 1581 | 18676 |
| ACTIVATE FEATURE | SC.FILTEREDHELP | 12/31/2007 12:57:16 AM | 3 | 1582 | 18676 |
| ACTIVATE FEATURE | SC.SMARTHELP | 12/31/2007 12:57:16 AM | 3 | 1583 | 18676 |
| ACTIVATE FEATURE | SC.REMOTECONTROL | 12/31/2007 12:57:16 AM | 3 | 1584 | 18676 |

FIG. 30

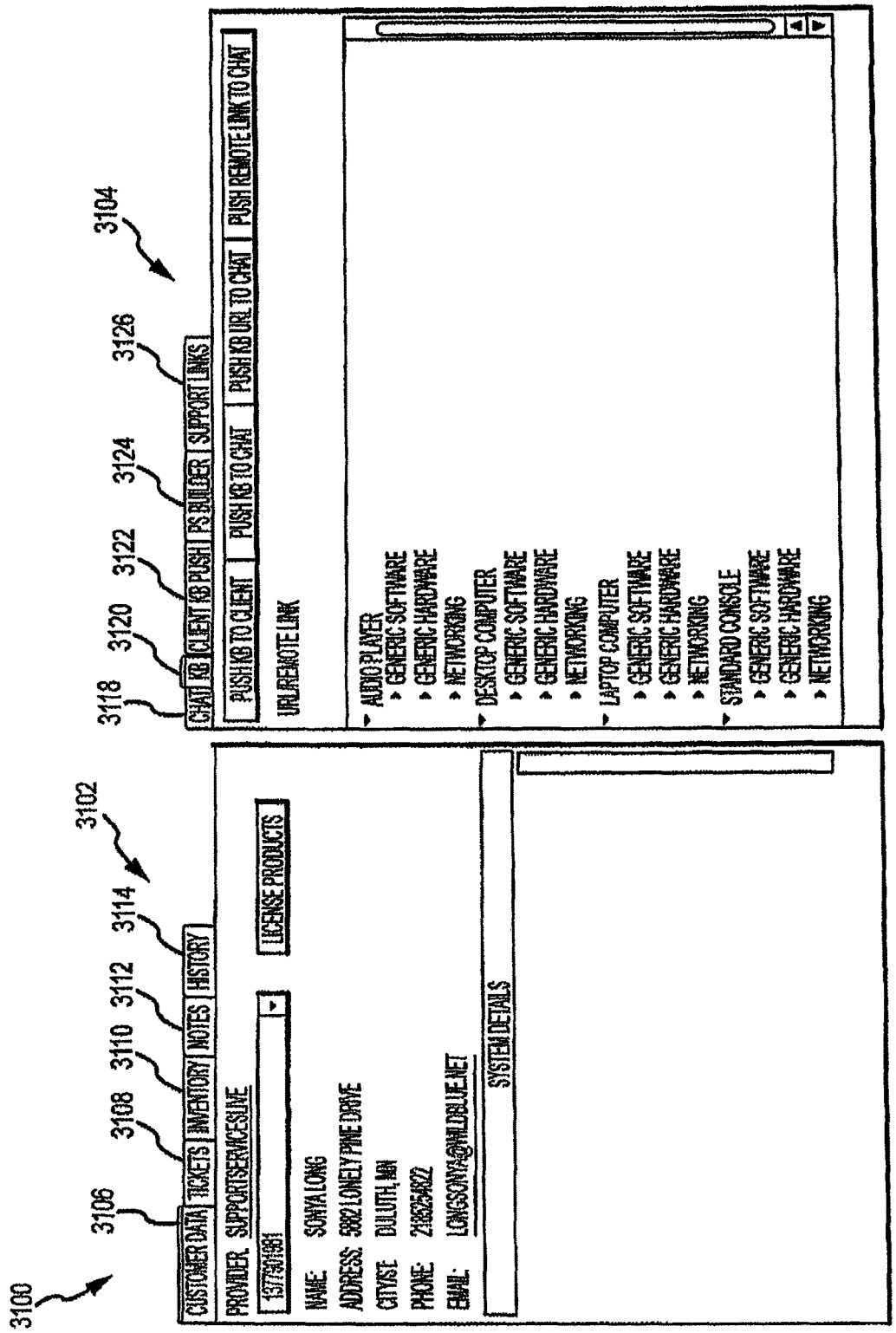

3102

| CUSTOMER DATA | TICKETS | INVENTORY | NOTES | HISTORY |

- SELECT TICKET: NEW
- TICKET ID: NEW
- APPLIANCE: LAPTOP COMPUTER
- COMP GROUP: SOFTWARE
- COMP TYPE: SELECT
- MANUFACTURER: ▶ SELECT
  - ANTISPYWARE & MALWARE
  - ANTIVIRUS
- INTERFACE/APP: ▶ AUDIO
  - BROWSER
- MODEL/VERSION: ▶ DISK UTILITIES
  - DRIVERS
- SYMPTOM: ▶ EMAIL
  - ENTERTAINMENT
- ERROR MSG: GENERIC CONFIGURATION
- PROBLEM DESC: GENERIC HELP
  - GENERIC INSTALL
  - GENERIC UNINSTALL
- TICKET STATUS: GS
  - ISP
  - NEW CTYPE TEST
  - OPERATION SYSTEMS
  - PRODUCTIVITY
  - SPYWARE
  - SYSTEM UTILITIES
  - UNKNOWN APPLICATION TYPE
  - VIDEO

TECHNICAL SUPPORT AGENT AND TECHNICAL SUPPORT SERVICE DELIVERY PLATFORM

CROSS REFERENCE TO RELATED PATENT APPLICATIONS

This application claims the benefit of U.S. Provisional Application No. 60/882,928, filed Dec. 30, 2006, and titled "TECHNICAL SUPPORT AGENT AND SERVER-SIDE TECHNOLOGY AND SERVICE DELIVERY PLATFORM FOR PROVISIONING A CUSTOMER TECHNICAL SUPPORT SOLUTION," which is incorporated herein by reference for all purposes.

BACKGROUND

Internet service providers (ISPs) provide connections to the Internet for millions of customers, and the untapped market is still substantial. ISPs today may offer one or more of cable, phone, and Internet service. In addition to providing the underlying cable, phone, or Internet service, most ISPs also provide a host of other services to their customers, such as email, personalized homepages, web page hosting, and other content and/or value-added resources. Quality of Service (QoS) is an important determinant of customer satisfaction with an ISP. Customers today have come to expect high-quality service virtually all the time. If expected QoS is not met, customers expect the problem to be fixed promptly. Unfortunately, for a number of reasons ISPs are often unwilling or unable to adequately address customers' complaints when they have arisen.

Of course, no matter how hard an ISP tries, technical, and other problems, occur, which reduce the perceived QoS. For one thing, the cause of the customer's problem may not be the ISP equipment or service, but rather the customer's computer, software, or other equipment. The reduction in QoS can range from simply a slow connection speed, to inability to access a particular service (e.g., email), up to outright failure to connect to the Internet. In a perfect world, these problems would not occur, but reasonable Internet users understand and accept that these problems will occur from time to time. When expected QoS is not met, customers often call on their ISP to fix the problem (even if the cause of the failure is not the ISP). The ISPs that are able to promptly and professionally fix the customer's problems will tend to keep their customers happier. As a result, ISPs that can promptly and professionally address customers' QoS complaints stand to succeed, whereas ISPs that cannot fix these problems in a quick, efficient, low-cost, professional, and thorough manner will tend to lose out to their competition.

Accordingly, ISPs typically provide resources that customers can call on when problems arise. Through these resources, customers can typically notify the ISP of the problem and attempt to get the problem fixed. For example, a telephone number (e.g., a 1-800 number) may be provided with which the customer can contact a technical help desk and talk to a technical support person who can walk the person through a series of steps to attempt to fix the problem. In addition, the ISP may provide a self-help Web site with technical support information. The customer may be able to type in a problem report (also referred to as an "incident" report) to be sent over the network to a technician who will reply with a suggested fix. The ISP may even dispatch a technician to the customer's home.

Unfortunately, these conventional methods have significant limitations. ISPs typically cannot afford to send a technician to every customer's home when they complain of service problems; such an approach would be cost prohibitive. With regard to Web-based support, conventional self-help Web sites often leave customers confused and bewildered, due to their lack of knowledge in computer, software and network technology. Furthermore, customers and support technicians (e.g., telephone-based, chat-based, email-based) often have inadequate or inappropriate tools to address the customer's particular problem. Support technicians typically do not have a complete view of the customer's computer system, and must rely on the customer's knowledge of his/her own system, which may be very limited.

Most frustrating, after all attempts to address a customer's problem fail, the ISP often simply notifies the customer that the service provided by the ISP is functioning properly, and the customer's problem is not the ISP's responsibility. Problems that are not due to the ISP's equipment or service are often referred to as "out-of-scope" with respect to the ISP, and the customer is left stranded to fend for himself, or to chase down other vendors to find a solution.

All of the above situations result in unnecessary costs, wasted time, and all too often a very dissatisfied customer. When overall customer satisfaction drops, the ISP generally experiences a high rate of customer churn (i.e., customers leaving the ISP for a competing ISP), an increased cost of acquiring new customers, and the cost of re-acquiring former customers. In addition, when customer satisfaction falls, the ISP typically has significant resistance among its existing customer base to adopt new, advanced services such as Voice over Internet Protocol (VoIP) service, video on demand, music on demand, or other services that might otherwise generate new revenue.

As such, systems and methods are needed to address the above problems and other like issues.

SUMMARY

An embodiment of a method for providing technical support service includes generating a plurality of problem resolutions that are determined to resolve an identified technical problem, attributing weights to each of said plurality of problem resolutions according to frequency of use, and in response to a request to resolve said identified problem, selecting a problem resolution from among said plurality of problem resolutions based at least in part on said attributed weights. The method may further include delivering said selected problem resolution to a client application that generated said request. Selecting a problem resolution from among said plurality of problem resolutions may include selecting said problem resolution having said greatest weight among said plurality of problem resolutions.

The method may further involve classifying each of said plurality of problem resolutions according to skill level required to implement said problem resolution. Selecting a problem resolution from among said plurality of problem resolutions may further include selecting a problem resolution based at least part on skill level required to implement said problem resolution.

A method of providing technical support to an end user of an end user system includes inferring skill level of said end user based on usage patterns of said end user; and selecting a problem resolution to resolve an identified technical problem exhibited by said end user system, wherein selecting a problem resolution is based at least in part on said skill level of said send user. The method may further include prioritizing resolutions based on relationships between agent skill level, end user skill level and applicably weighted resolutions.

An embodiment of a method for delivering a service includes receiving a request from a client application for a service to satisfy a need, the client application including one or more disabled licensable features; determining that one of the one or more disabled licensable features could provide the service to satisfy the need; and enabling the one of the one or more disabled licensable features.

Another embodiment of a method for delivering a service includes establishing communication with a client application executing on a client system, the client application including one or more disabled features; selecting one of the one or more disabled features based at least in part on client system parameters; and enabling the selected one of the one or more disabled features.

Yet another embodiment of a method for delivering technical support service includes selecting a customer via a customer selection graphical element; and presenting an adaptive ticket data entry region for entry of problem report ticket data for a selected problem report ticket associated with the selected customer, wherein the ticket data entry region includes a plurality of ticket data entry fields, wherein data options that are selectable in at least one data entry field adapt in response to one or more data option selections in at least one other data entry field.

An embodiment of an adaptable problem report ticket includes a customer identifier; a problem report ticket identifier; a plurality of data elements wherein a first data element is selected from a first set of data options, and wherein a second data element is selected from a second set of data options, and wherein the second set of data options is adapted according to the option selected from among the first set of data options for the first data element.

Another embodiment of an adaptable problem report ticket includes a customer identifier, a problem report ticket identifier, and a first data element selected from a first set of data options, wherein selection of the first data element from among the first set of data options causes a second set of data options to adapt, wherein data options of the second set are selectable for a second data element.

An embodiment of an adaptive ticket management system for managing technical problem report tickets includes a ticket including a plurality of data fields, each data field configured to hold designated type of ticket data, and a ticket information entry user interface configured to enable entry of ticket data into each of the data fields, wherein the ticket information entry user interface adapts the range of ticket data available for entry in a selected data field, based on ticket data entered into previously selected data field. The range of ticket data available for entry into the previously selected data field may include hardware, software, and network.

An embodiment of an apparatus includes a device platform, an operating system executable on the device platform; and a client application operable to facilitate technical support services independent of the operating system and the device platform.

An embodiment of a method includes providing a device platform; providing an operating system on the device platform; and loading a client application on the device platform, the client application being operable to facilitate technical support services independent of the operating system and device platform.

BRIEF DESCRIPTION OF THE DRAWINGS

FIGS. 29-34 illustrate exemplary graphical user interfaces that may be presented by an agent application for use by a technical support agent.

Figure 1:
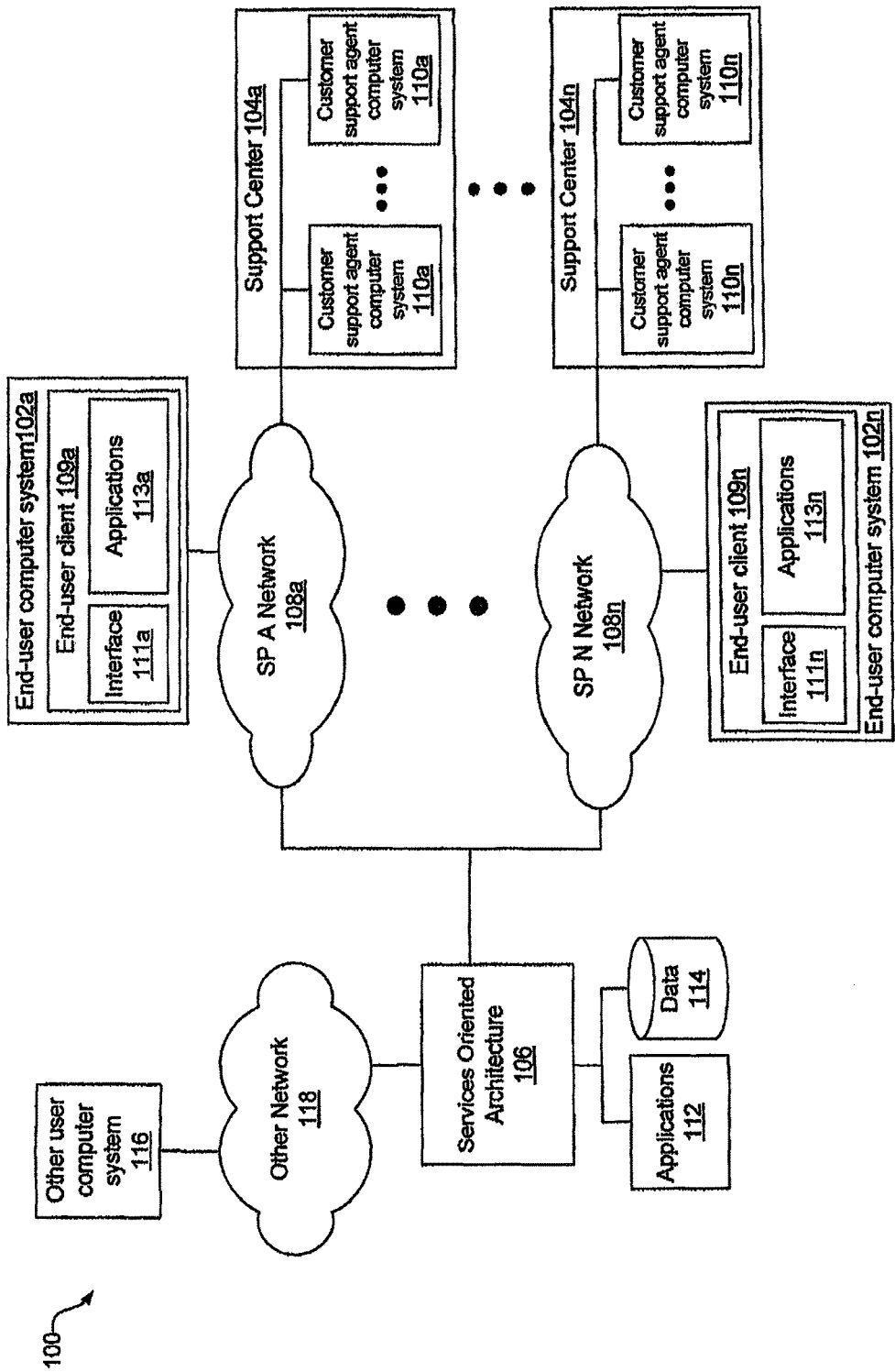
FIG. 1 illustrates an exemplary operating environment in which a technical support platform may be utilized in accordance with one embodiment.

While the invention is amenable to various modifications and alternative forms, specific embodiments have been shown by way of example in the drawings and are described in detail below. The intention, however, is not to limit the invention to the particular embodiments described.

DETAILED DESCRIPTION

Embodiments of the present invention relate to a agent technical support application providing a user agent with tools to interact with a user and provide technical support. The agent support application provides a user interface to the agent and an interface to a knowledge base of technical support information that can be pushed to the a client. The agent user interface can be a configurable browser-based interface. For example, the manner of display of client information can be customized by the agent. In some embodiments, user interface configurability is enabled using a browser-enabled web-application creation technology, such as Asynchronous JavaScript and XML (AJAX). As such, each agent can dynamically adjust the look and feel of data presentation to the particular agent.

Embodiments of the agent support application include a ticketing system that allows for dynamically creating a technical support ticket on a per-incident basis. Through the agent support application interface, the agent can enter context-specific data or select from context-specific options to build the ticket. When a client calls in for technical support, the agent can search for a client profile from the knowledge base using a number of different client criteria. By way of example, but not limitation, the agent can search by client name, customer account, machine identifier, license identifier, and ticket identifier.

Embodiments of the agent support application can include a chat module for chatting with one or more clients. Through the chat module, the agent can gather client information and provide information to the client. In addition, the agent can push solutions or documents to the user. A solution may be in the form of hyper link to a step-by-step process that the client can follow to potentially solve the technical problem. Such solutions are typically specific to the client's particular technical configuration, including the particular hardware and software components, brands, versions, interconnections, and so forth.

In accordance with various embodiments, the agent side support system is an automated tier 1 system. In these embodiments, the agent application doesn't need any special knowledge. The agent application can gather any necessary information from a remote technical support platform that includes a technical support knowledge base. The agent can access support applications on the technical support platform for dynamic technical support services. For example, the agent can push technical solutions to a client.

Embodiments of the agent support application provide for multi-customer or multi-client sessions. In these sessions, the agent can interact with multiple clients simultaneously. This may include multiple simultaneous chat sessions, multiple dispositions, and/or multiple tickets.

Various embodiments of the agent support application may include other technical support tools, or have the ability to access such tools through the technical support platform. By way of example, but not limitation, the agent application may include remote control functionality that enables an agent to remotely access and control the client's computer. By way of further example, the agent application may include an RMA module.

As yet another example, the agent support application can employ a service dispatching tool for dispatching on-site technical support to the client's location. The on-site service dispatch system can generate a service ticket to trigger on-site technical service. The ticket can include, reference, or otherwise provide all relevant client system profile data, any prior activity history, and/or directions/specifications of a desired or recommended fix.

Prior to describing one or more preferred embodiments of the present invention, definitions of some terms used throughout the description are presented.

Definitions

The term "service provider" refers broadly to any provider of products or services to one or more customer(s). Service providers include, without limitation, Internet service providers (ISPs), network service providers (NSPs), and broadband service providers (BSPs), cable providers, digital subscriber line (DSL) providers, digital satellite link providers, wireless service providers, and telecommunications providers (e.g., regional telephone service providers).

The term "incident" refers to an instance of a reported problem.

The term "technical support job" or simply "job" refers to the processes carried out from the time a problem is reported to a final disposition of the problem. A job may span multiple interactions between the end-user and a support agent. Typically a job is uniquely associated with an identifier, such as a ticket, to allow for referencing the job later.

The term "end-user" (or end user) refers to an individual who is using a product or service for which customer or technical support may be provided.

The term "customer" refers broadly to any consumer of services or products. Customers can include, without limitation, individuals or entities which may have more than one end user, such as households with one or more end-users, home businesses, small businesses, colleges, universities, government organizations, and for-profit and nonprofit companies.

The term "quality of service" refers broadly to the degree of excellence of a service or product. Quality of service is not limited to quality of service as that term is commonly understood in the TCP/IP protocol and/or packet-switched networks and/or computer networking. Rather, quality of service more generally relates to an end user's satisfaction or dissatisfaction with the performance of a product or service.

The term "module" refers broadly to a self-contained functional component. A module may be composed of software, hardware, or firmware (or any combination thereof). Modules are typically functional components that can generate useful data or other output using specified input(s). An application program (also called an "application") may include one or more modules, or a module can include one or more application programs.

The terms "connected" or "coupled" and related terms are used in an operational sense and are not necessarily limited to a direct connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

The terms "responsive" and "in response to" includes completely or partially responsive.

The term "computer-readable media" is media that is accessible by a computer or computer-like device (e.g. game console, IP devices), and can include, without limitation, computer storage media and communications media. Computer storage media generally refers to any type of computer-readable memory, such as, but not limited to, volatile, non-volatile, removable, or non-removable memory. Computer storage media may be magnetic, optical, or other format. Communication media refers to a modulated signal carrying computer-readable data, such as, without limitation, program modules, instructions, or data structures.

Exemplary System

One embodiment is a platform that includes an Internet-based service and support architecture that enables the efficient delivery of technical support to a consumer (e.g., Internet user or ISP customer). In this embodiment, a "thin" client software package facilitates communication and interaction with a technical support services architecture. The technical support service architecture may include a large portal infrastructure that contains information for use in providing or obtaining technical support. The information may be viewed as a warehouse of information gathered from multiple technical support incident reports and the jobs carried out to resolve them.

In some embodiments, the architecture is implemented according to an n-tier (e.g., three-tier or multi-tier) client-server model. As such, the architecture is modular, and any of the n-tiers can be upgraded independently of the other tiers. In a three-tier or multi-tier approach, a user interface tier executes on one or more user computers (e.g., desktop PC), a technical support services architecture executes on one or more network-based application servers, and data is stored by and accessed from one or more network-based database server(s). Technician user computer interfaces and/or end user computer interfaces are adapted to communicate with one or more applications of the technical support services architecture.

The architecture may be implemented using a virtual machine, such as .NET from Microsoft™ Corporation, or Java Virtual Machine from Sun™. Data may be stored in databases in accordance with any number of database models, such as flat, hierarchical, network, relational, object-oriented, or others. By way of example, but not limitation, Microsoft Structured Query Language (SQL), Oracle™ or MySQL databases may be used. Servers and their related services may be implemented using Microsoft's Internet Information Services (IIS) or Apache Hypertext Transport Protocol (HTTP) Servers, or others as appropriate to a particular implementation.

FIG. 1 illustrates an exemplary operating environment 100 in which a technical support platform may be implemented and utilized in accordance with one embodiment. End-users communicate over networks using their computer systems 102 to access customer support centers 104 and/or a services-oriented architecture 106. Different end users may communicate over different service provider (SP) networks, such as service provider network 108a through service provider network 108n, where the labels 'a' and 'n' have no inherent relationship.

Each network 108 represents a logical network that is provided, owned, managed, and/or maintained by a service provider. Of course, a service provider may actually use one or more other service providers' network(s) in providing service to the end user computer system 102. For example, a service provider may contract with wholesale network service providers and/or have peering arrangements with backbone networks or other arrangements whereby traffic through a SP network 108 is routed through other provider networks. Each network 108 can include the Internet (or a portion thereof), a Voice over Internet Protocol (VoIP) network, or other networks or sub networks that the end user may access. Importantly, communication via the networks 108 may be wireless, wired, or any combination thereof.

End user computer systems 102 typically include a computer, such as, but not limited to, a personal computer (PC), and one or more peripheral devices, such as a printer, fax machine, external mass storage device (e.g., CD ROM, disk drive). It will be understood by those skilled in the art that in general, the customer may utilize any type of computing device, such as, but not limited to, a laptop computer, a handheld computer, or an Internet-enabled cellular telephone. The end user computer system 102 may represent or be part of a home or business local area network (LAN). End user computer systems 102 typically include one or more communications devices or adapters to connect to the service provider network 108. Other network components, such as a router/firewall or a broadband modem may be communicably coupled to computers in the system 102 to provide for network 108 communication, data security, network address translation (NAT), or communication between end user computers on a LAN.

Accordingly, the end user generally makes use of multiple components in end user computer system 102. Of course, for numerous reasons, at any given time, the components (e.g., hardware devices, software applications) of the end user computer system 102 or the SP network 108 may have technical problems that render the quality of service to the end user less than satisfactory. In these situations, the end user can obtain technical support from one or more sources through an end user client 109. For example, end user system 102a includes end user client 109a and end user system 102n includes 109n. The end user clients 109 execute on a computer of the end user's system 102. The end user clients 109 typically include, at least in part, a client interface 111 and one or more applications or applets 113. The interface 111 is an interface to the services oriented architecture 106 and the applications 113 provide functionality related to obtaining customer support from the architecture 106 and customer support agents 110.

For example, through the interface 111a, the client 109a can contact customer support agents who provide customer support through customer agent computer systems 110a at one or more customer support center 104a. Similarly, the client 109n can contact customer support agent systems 110n associated with customer support center 104n. The customer support agents can provide services and data to assist the end user in identifying the cause of technical problems and in determining potential solutions.

In these and other embodiments, in addition to, or as an alternative to, contacting customer support agent's end user clients 109 may access the services-oriented architecture 106 for technical support, including assistance with products and services associated with their computer system 102. As discussed further below, the client interfaces 109 are adapted to communicate with modules of the services oriented architecture 106. For example, the end user can access "intelligent and/or interactive self-help" tools executing on the services oriented architecture. In addition, the end user client interfaces 109 and a customer support agent interfaces of the customer support agent computer system 110 can access a chat or messaging service provided by the services oriented architecture, whereby the end user can chat or message a customer support agent.

Although specific embodiments of the services oriented architecture 106 are described herein with regard to providing technical support services for a computer system, it is to be understood that other embodiments of the services oriented architecture 106 can relate to providing customer support for a wide variety of products and services. By way of example, but not limitation, end users may need assistance in fixing, assembling or troubleshooting automobiles, home/office appliances, machines, tools, household products, toys, or other products they use or own. The customer agents can assist the end users in detecting problems, determining a solution, and implementing the solution. Although embodiments can be beneficially applied to many areas of customer support, embodiments described herein relate to the providing of technical support for end users' computer systems 102.

Although only two end user computer systems 102 are shown in FIG. 1, in actual operation there will be many more (e.g. thousands or millions) end user computer systems 102. In addition, although the same numerical labels may be used to call out multiple modules, devices or systems, this is merely for convenience of description, and does not imply that these modules, devices or systems are identical. For example, in general end user computer systems 102 will have different hardware, software and/or have different configurations.

The term support center 104 refers to a logical organization of customer support agents and does not imply that the customer support agents are necessarily physically located in the same location. As such, the customer support agent computer systems 110 may or may not be geographically near each other, or even in the same building for each support center 104. For example, different ones of the customer support agents using computer systems 110a (i.e., the customer support agents associated with support center 104a) may be located in Los Angeles, Calif., Kansas City, Mo., and Anchorage, Ak. In this situation, customer support requests from end users 110a may be selectively routed to the customer support agents in each of the cities based on various criteria, such as availability, expertise, geographic proximity, network proximity, or network load balancing considerations.

Although each service provider network 108 is shown as associated with one support center in FIG. 1, it is to be understood that embodiments are not limited to one-to-one relationships. In general, a support center 104a may provide services for numerous SPs in addition to SP network 108a, and SP network 108a may utilize multiple support centers 104 in addition to support center 104a.

The services-oriented architecture 106 provides automated customer support services. In various embodiments, the services-oriented architecture 106 is accessible by end users as well as customer support agents. The services-oriented architecture 106 may be implemented in one or more server computers or other computing devices. The services-oriented architecture 106 provides access to various customer support applications 112 and data 114, which can be used by end users and customer support agents. The services-oriented architecture 106 also provides mechanisms through which end users and agents can communicate with each other.

The services-oriented architecture 106 generally supports a technical or customer support platform that is scaleable and extensible to provide customer support with respect to numerous different types of products (or services) within a category of products (or services). For example, embodiments described below relate to providing technical support to identify and solve problems in numerous different end user computer systems, even though different end user systems may have different configurations of hardware and software. Information learned from end user systems (e.g., from the clients 109), such as problem scenarios and solutions, can be advantageously applied to or stored in the services-oriented architecture 106, where it can be used by other end users or customer support agents.

Support centers 104 can subscribe to the services-oriented architecture 106. In some embodiments, knowledge acquired by different support centers, such as support center 'n' and support center 'a', can be used by the other(s). Embodiments of the customer or technical support platform are described in further detail below and further illustrate the general application or leveraging of knowledge from individual customer support interactions to the wider community of end users and customer support agents.

Other users may access the services-oriented architecture 106 through other user computer systems 116. Other computer systems 116 may communicate with the services-oriented architecture 106 over another network 118 as shown, or the other user computer systems 116 may communicate over one of the service provider networks 108. Other users may be managers or administrators of the services-oriented architecture 106. For example, administrative users may upload new applications 112 or data 114 through the services-oriented architecture. New applications 112 or data 114 may then be accessed by end users and customer support agents.

Generally, end user computer systems 102, customer support agent computer systems 110 and other user computer systems 116 provide interfaces to the service-oriented architecture 106. Each of the computer systems generally has a browser application, as well as other application programs and/or applets that enable access to and communication functionality with the services-oriented architecture 106.

Figure 2:
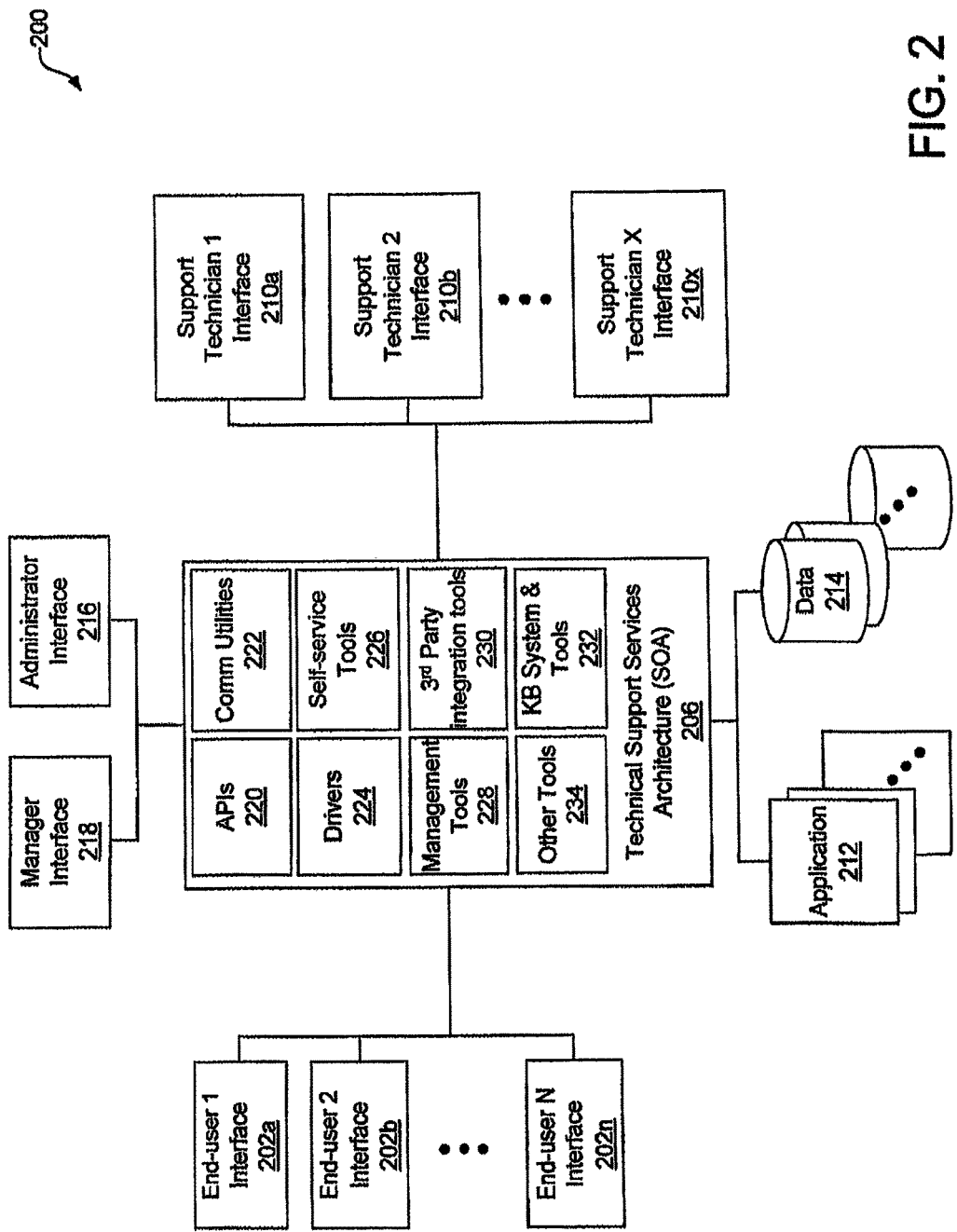
FIG. 2 illustrates a distributed technical support platform including user interfaces, a technical support services architecture, applications and data, wherein the user interfaces are adapted to interact with various modules of the technical support services architecture, in accordance with the embodiment of FIG. 1.

FIG. 2 illustrates a technical support platform 200 in accordance with the embodiment of FIG. 1 and other embodiments. Whereas the embodiment of FIG. 1 may generally be applicable to providing customer support with respect to all types of products or services, the embodiment of FIG. 2 is described with respect to systems and methods for providing technical support with respect to end users' computer systems.

In this regard, the technical support services architecture 206 is one particular embodiment of the service-oriented architecture 106. Support technician interface 1 (210a), support technician interface 2 (210b), through support technician X (210x) are interfaces that could be used in customer support agent computer systems 110a through customer support agent computer systems 110n (FIG. 1). End user interface 1 (202a), end user interface 2 (202b) through end user interface n (210n) are particular embodiments of end user interface 111a through end user interface 111n. Also shown in the system of FIG. 2 are an administrator user interface 216 and manager user interface 218.

The technical support services architecture 206 provides automated technical support services to end user interfaces 202 and support technician interfaces 210, by in part, providing access to applications 214 and data 216 for use in providing technical support. More specifically, the technical support services architecture 206 includes a number of functional modules that facilitate the provisioning of technical support services. In the illustrated embodiment, the technical support services architecture includes one or more application programming interfaces (APIs) 220, communications utilities 222, drivers 224, self-service tools 226, management tools 228, and third party integration tools 230.

With further regard to the end user interfaces 202, support technician interfaces 210, administrator user interface 216, and/or manager user interfaces 218, in one embodiment these interfaces are included in respective client applications executing on the respective computer systems. In these embodiments, a client application typically includes applets, applications, other executables and/or data that enable the various computer systems (e.g., end user computer systems, technical support agent computer systems, etc.) to contact, communicate with, and use the applications of, the technical support services 206. Typically different client applications reside on the technical support agent computer system, the end user computer system, the management computer system, and the administrative computer system, due to the different responsibilities of each of these users. As is discussed further below, the various client applications can be deployed to the respective user computer systems by the technical support services architecture (e.g., by the management tools 228).

APIs 220 include programming interfaces and/or web interfaces to one or more of the applications 212 and/or tools, utilities or other modules of the architecture 206. Examples of applications and corresponding interfaces are a chat application and chat integration API, and an electronic mail (email) application and an email interface. In these examples, and as discussed in further detail below, support technicians and end users can communicate with each other by sending messages through the chat application and the email system. APIs 220 may also include interfaces that allow managers, administrators, and/or support technicians to add third party applications and data to the technical support services architecture 206. Numerous other APIs may be included, embodiments of which are further described below.

Communications utilities 222 include functionality supporting communication applications including chat, email, instant messaging and others. For example, communications utilities 222 can include an email exchange server, point-of-presence (POP)/simple mail transport protocol (SMTP), and Short Message Service (SMS), as well as telephone communications support such as Internet Protocol Telephony (IPT) and Automatic Call Distribution (ACD). Drivers 224 include one or more drivers for determining how the one or more databases 214 will communicate with other systems such as manager interfaces 218 or administrator interfaces 216. For example, the drivers 224 may support Microsoft's Structured Query Language (SQL) database calls and/or Oracle database calls.

Self-service tools 226 include one or more tools that can be used by the end user without the assistance of a support technician. Examples of self-service tools 226 include, but are not limited to, key word searches for searching databases 214 for topical information, frequently asked questions (FAQs), or forums. As is discussed further below, key word searches are targeted to the end user computer system's particular hardware and software configuration.

Management tools 228 include applications, applets and other modules that administrative users or managers can use to manage aspects of the technical support services architecture. Management tools 228 may provide functionality for updating, adding or deleting applications 212 or data 214 and/or their associated APIs, communications utilities and drivers. In addition management tools 228 may include a program that deploys the client applications (e.g., end user applications 113, FIG. 1) to the associated users.

In an alternative embodiment, the appropriate client applications (e.g., end user applications 113, FIG. 1) can be deployed to end users by the associated support centers. In other embodiments, the SPs themselves may provide the client applications through other mechanisms, such as by Internet download, or by sending a compact disc (CD) through the mail. Regardless of the means by which the client application is provided, the client applications are operable to contact and access the technical support services architecture 206 and/or the associated SP support center.

Third party integration tools 230 include APIs, drivers, and/or other modules for updating, adding, and/or deleting third party tools on the technical support services architecture 206.

Knowledge base (KB) system & tools 232 provides tools (e.g., applications, applets, scripts, programs, etc.) related to processing of content. By way of example, but not limitation, KB system & tools 232 can include programs for filtering, building, generating, searching, formatting, etc. content. Content can include, without limitation, text, images, graphics, video, audio, dynamic web pages or web page scripts (e.g., Java scripts). In various embodiments, the content processed by KB tools 232 related to instructional technical support content, such as images of computer components (e.g., cables, printers, monitors, routers, etc.), step-by-step instructions to solve a technical problem, and so on. Such content is typically embodied in dynamically generated web pages accessible by the end user client.

One example of a KB tool 232 is a web page generator that dynamically generates web pages that describe technical problems (e.g., scenarios, causes, symptoms) and/or instruct an end user on how to solve technical problems. As another example, KB tools 232 may include a configuration difference generator that is operable to determine differences between system configurations. Other examples of KB tools are a problem searching module and problem filtering module, which may be used by an end user or agent to search on and filter a set of previously identified solutions in a problem set data store.

Other tools 234 provide other functions (e.g., in the form of applications, applets, scripts, programs, etc.) to end users, technical support agents or other users. Examples or other tools 234 are third party support tools and remote control, whereby an agent can remotely control the end user's computer. For example, the agent can use remote control to operate the input devices (e.g., mouse and keyboard).

As yet another example, other tools 232 may include functions to gather and analyze technical support data (e.g., problem scenarios, configurations, solutions, etc.) from technical support agents associated with different service providers and/or customer support centers. In this regard, the technical support service architecture 206 can capture data related to particular customers, client system configurations and/or particular technical problems reported by customers and end users. The technical support services architecture 206 can correlate problem data to identify problematic scenarios or configurations that have been observed in multiple technical support jobs in response to incident reports submitted by the general population of end users.

When a recurring technical problem is identified, a problem identifier can be stored (e.g., in a data store 214) along with one or more criteria that defines the problem and one or more possible causes to the problem. Problem scenarios may also be recorded in relation to identified problems. In addition, the technical support service architecture 206 can identify commonly implemented and successful solutions, and store the solutions in association with identified technical problems and/or system configurations. In this manner, recurring and common problems and fixes can be learned and provisioned on a broader scale to many or all subscribing technical support centers and utilized by the general population of technical support agents and the general population of end users. As such, problems and solutions developed for end users of one service provider can be applied to other end users, and even end users subscribing to network service from other service providers (SPs).

Accordingly, one feature of the technical support services architecture 206 is an ability to develop one or more knowledge bases that include information about technical problems, system configurations and solutions, and continually update the knowledge bases based on actual technical support interactions. In this embodiment, the SP customer support centers can register with the technical support services architecture 206 to gain access to the knowledge bases that are maintained by the architecture 206. In this fashion, the SP support centers and the technical support services architecture 206 may be viewed as forming a symbiotic relationship, in which both benefit from the other.

For example, during a performance of a technical support job between a technical support agent and an end user, the agent may search in a set of pre-developed solutions at the technical support services architecture. The pre-developed solutions may reside, for example, in a data store 214 and may be stored in association with previously identified problems and/or system configurations.

Embodiments of the technical support platform 200 can be implemented in a distributed architecture. For example, portions of the platform may be distributed among the technical support agent computer system (e.g., a technician/agent user client application), the end user computer system (e.g., an end user client application), and the technical support services architecture 206. In other words, portions of the technical support platform may be resident upon computing devices that are geographically or logically separated. A distributed technical support platform 200 can provide customers with a transparent, open, scaleable, fault tolerant support system.

In some embodiments, the interface used by technical support agents is a web interface that can be accessed through a browser on the agent's computer system. In these embodiments, the technical support and services platform includes a web based interface through which technical support agents can access other resources and applications in the technical support and service platform. The interface for administrative and management users may also include a web interface accessible through browsers on administrative and management users' systems. In such embodiments, the technical support agents, administrators and managers can access the platform at any location that has an Internet connection.

Figure 3A:
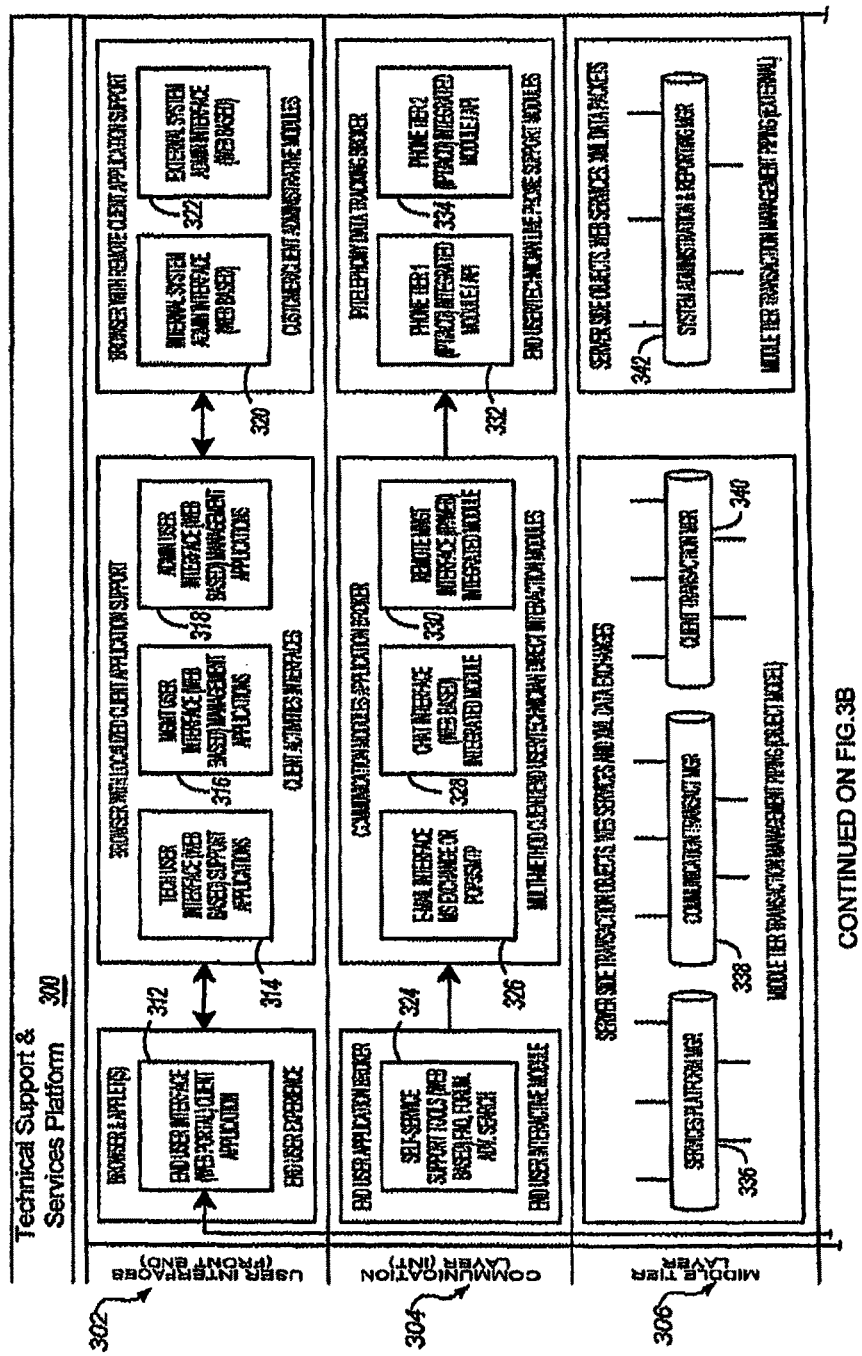
FIG. 3A-3B illustrates a technical support and services platform facilitating network-based technical support and services related thereto, in accordance with one embodiment.
Figure 3B:
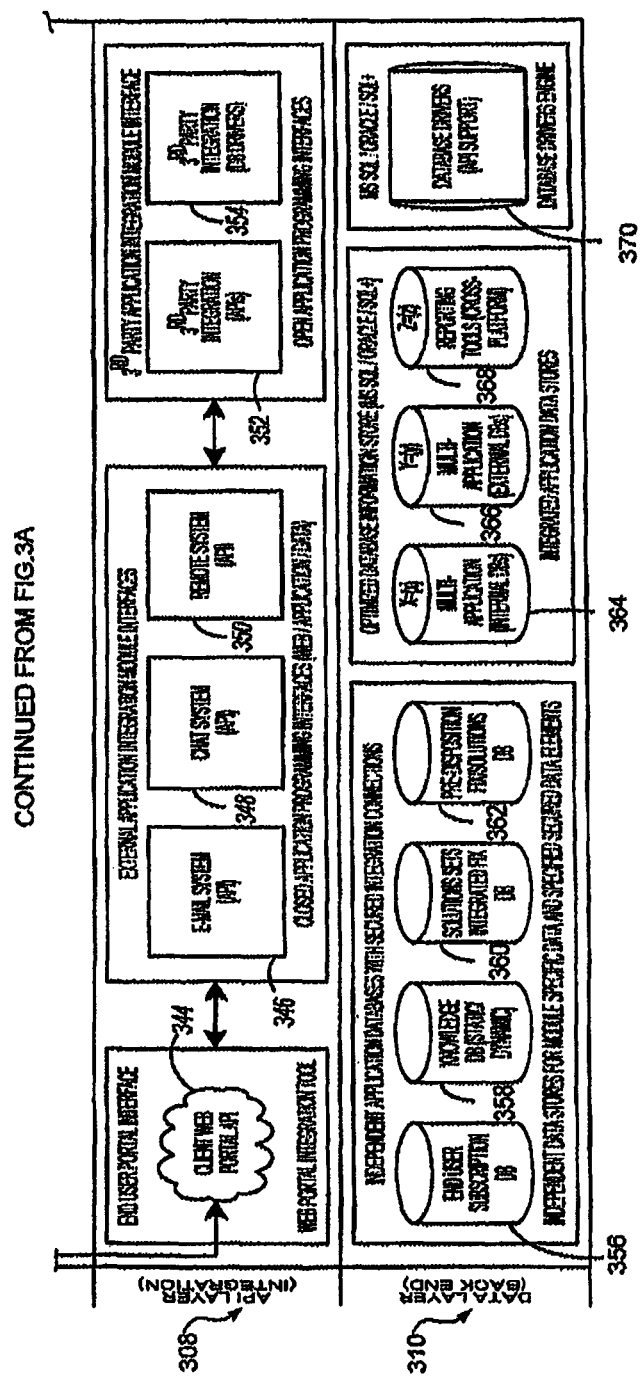

FIG. 3 illustrates one embodiment of a technical support and services platform 300 facilitating end user technical support. The technical support and services platform 300, and portions thereof, may be embodied on one or more client computers, server computers, database servers, and databases. In the embodiment illustrated, the technical support and services platform 300 includes five logical layers: user interfaces 302, communication 304, middle tier 306, application programming interface (API) 308, and data 310. Within each layer, data and/or functionality are provided that together form an integrated, scaleable, and extensible technical support framework and service delivery platform for handling many technical problems that may arise, and for "learning" about new problems and their solutions as they are discovered. Clients can access the technical support and services platform 300 via a network using interfaces provided by the technical support platform 300.

For example, the user interface layer 302 includes a number of interfaces through which a user (e.g., a customer, end user or agent) client accesses the technical support platform 300. An end-user interface 312 is provided by a client application, and represents the interface with which the end user interacts while using the technical support and services platform 300. In some embodiments, the end-user interface 312 is implemented as a browser with one or more applets that access a web portal, described further below. As such, the end-user interface 312 can provide personalized and customizable capabilities to the end user.

Localized client application support interfaces include a technical user interface 314, a management user interface 316, and an administrative user interface 318. These interfaces can be used by technical users (e.g., technicians), managers, and administrative users, respectively, for maintaining components of the technical support platform, obtaining reports of technical support data, and others. The end-user interface 312 and the client activities interfaces can transfer data bi-directionally to each other. As such, data transfer to the end-user interface 312 may be pushed or pulled. Conversely, data can be pushed or pulled to or from the technical user interface 314, the management user interface 316, and/or the administrative user interface 318.

Customer and client administrative modules can be accessed via administrative interfaces. In the illustrated embodiment, an internal system administrative interface 320 and an external administrative interface 322 are provided that can be accessed via a browser with remote client application support.

The communications layer 304 incorporates tools for accessing various modes of communication through which users (e.g., customers, technicians, managers, and administrators) interact with the technical support platform 300 and each other. Brokers manage user access to these tools. One or more intelligent and/or interactive self-service support tools 324 are made available by an end user application broker. Self-service support tools 324 can include filtered-help, offline (disk resident) content, interactive decision tree based drill-downs, web-based frequently asked questions and answers (FAQs), forums, and/or advanced search functions. Other self-service tools may be identified and implemented by those skilled in the art.

The communication layer 304 also typically includes communication modules and interfaces. Communication modules and interfaces can include, by way of example, but not limitation, an e-mail interface 326, such as Microsoft Exchange or POPS/SMTP, a chat interface 328, and a remote (or remote control) management interface 330. Other interfaces can be provided to support other modes of communication. The communication modules provide functionality for the customer and technician to communicate or interact via the associated communication mode. For example, the e-mail interface 326 enables e-mail communication between the customer and a technician.

Telephony support modules, such as phone tier 1 module 332 and phone tier 2 module 334 provide modular interfaces to live telephone technicians. In this embodiment, the phone tier 1 module 332 and the phone tier 2 module 334 can and/or may provide for communication over Voice over IP (VoIP). The phone tier modules provide various telephone agent functionality, such as, but not limited to, VoIP services, virtual Private Branch Exchange (PBX), and/or automatic call distribution (ACD). As such, for example, technical agents can be remotely located, and still have calls routed to them. As another example, in response to receiving a customer service support call, the phone tier modules can sequence through a list of telephone agents until one is reached.

The middle tier layer 306 provides transaction management functionality for managing transactions and data transfer between the user interface layer 302 or the communication layer 304 and the API layer 308, or for data transfer between applications. The modules at the middle tier layer 306 provide various functions to facilitate communication and data transfer, such as, but not limited to, data formatting, timing, and encapsulation. A services platform manager module 336, a communication transaction manager module 338, and a client transaction manager module 340 handle data transfers related to varying types of levels of interaction with the platform 300. For example, the services platform manager 336 handles data transfer or exchange to and from web services provided by the platform. The communication transaction manager 338 handles communications from server side transaction objects. The client transaction manager 340 handles Extensible Markup Language (XML) exchanges with the client modules. A system administration and reporting manager module 342 in the middle tier layer 306 manages interactions with the lower level layers that relate to administrative tasks and report generation.

The API layer 308 provides lower level interfaces through which higher level (e.g., user interfaces 302, communication layer 304) layers access applications and/or data of the technical support platform 300. For example, the API layer 308 includes a client web portal API 344 through which the end user can interface with web portal integration tools using the end user interface 312. External application integration module interfaces include an e-mail system API 346, a chat system API 348, and a remote system API 350, which correspond to the e-mail interface 326, the chat interface 328, and the remote management interface 330, respectively.

The API layer 308 also provides for integration with third party applications and data. A third party application integration module 352 enables third parties (e.g., SPs) to integrate third party-specific applications with the technical support platform 300. Similarly, a third party data integration module 354 enables third parties to integrate third party-specific data with the technical support platform. The third party applications and data can be accessed through the other communication modes, such as e-mail, chat, and remote management. Thus, the third party applications and data can extend the capabilities of the technical support platform.

The data layer 310 provides multiple data sets to keep track of numerous different types of data associated with the technical support platform. End user subscription information is stored in an end user subscription database 356. In addition, the end user subscription database 356 may store end user identification information, user component/configuration data, associated SP provider identifier(s), subscription terms, subscription prices, subscription services, and other customer information. Described further below is an embodiment in which the client outputs configuration data (e.g., system-specific parameters) for storage in the end user subscriptions 356 where they can be retrieved by technical support agents.

A knowledge base 358 includes data relevant to technical support. In one embodiment, the knowledge base (KB) includes a compilation of data gathered from actual problem reports or complaints. The knowledge base 358 is an electronic catalogue (e-catalogue) of numerous previously identified problem scenarios, problematic equipment, problematic configurations, or other data. The knowledge base 358 may be divided into a static portion and a dynamic portion. The static portion includes data that has been validated for accuracy and in general will not be changed; rather the static knowledge base data is intended only for read only access. The dynamic portion of the knowledge base 358 can change, often during real time technical support interactions. Dynamic knowledge base data may be updated as new information is gathered, and may change until it is validated or otherwise determined to be satisfactory for use in other technical support interactions.

Independent application databases also include solution sets 360 and pre-disposition solutions 362. Solution sets 360 are solutions that have been verified as proper for associated problem(s) and/or system configurations. As such, each of the solutions in the solution sets 360 may include an indication of the related problem or problems and/or system parameters characterizing the computer system(s) to which the solution set applies. The pre-disposition solutions 362 include potential solutions that have not been verified as working solutions, but rather they are solutions that have been proposed and may still be changing, based on new information related to the problem or results from implementing the proposed solutions. In one embodiment, while they are being worked on and/or validated, pre-disposition solutions are only accessible by the technician at the technical support center who is familiar with the problem. However, in other embodiments, such as one shown in FIGS. 5-7, described below, pre-disposition solutions may be available to technical support agents who can try using the pre-disposition solutions and report the results of their use.

In one embodiment pre-disposition solutions 362 are unstable solutions (i.e., they may change). When a pre-disposition solution becomes stable (e.g., verified as a valid solution), the pre-disposition solution is approved for application to a wider population of technical agents and end-users. Approved solutions in the pre-disposition solutions set 362 are moved into the solutions set 360. Because the solutions in the solution set 360 have been verified, these solutions can be deployed or made available more globally to all subscribing technical support centers.

Optimized data stores are included in the technical support platform 300 for storing application and reporting data. These data stores may be multi-application internal data stores 364, multi-application external data stores 366, and cross-platform reporting tools 368. The technical support platform 300 also includes a set of database drivers 370 for API support.

In the embodiment of the technical support platform 300 of FIG. 3, one or more modules of the communications layer 304, the middle tier layer 306, and the API layer 308 may logically or physically form a technical support services architecture or other services-oriented architecture. The technical support service architecture may or may not also include the data layer 310. For example the data layer 310 may be included in the technical support services architecture with the other layers, or the data layer 310 may be logically or physically separate from the other layers, but accessible by the other layers.

Figure 4:
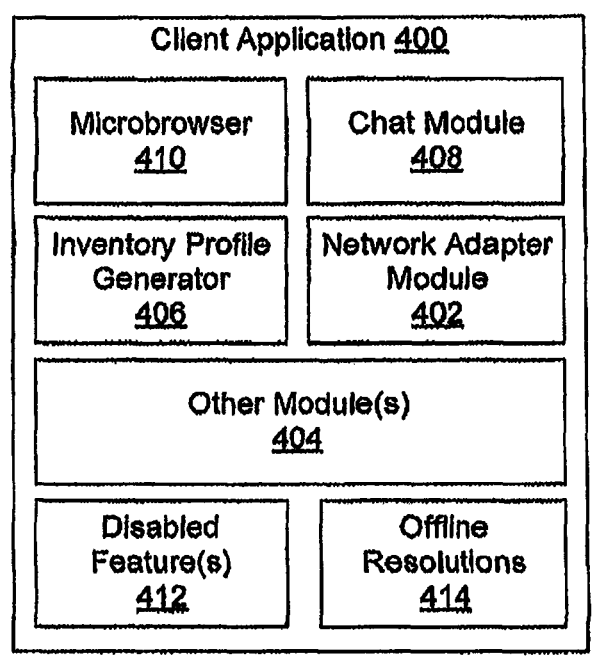
FIG. 4 illustrates and example client application that may be used by an end user in accordance with one embodiment.

FIG. 4 illustrates a client application 400 that may be used by an end user for technical support of numerous appliance types. The term appliance is used in its broadest sense to include not only computer or networking appliances, but also any electronics device. As such appliances include computers, personal digital assistants (PDAs), handheld computers, routers, cell phones, media consoles, game consoles, stereo systems, digital video disk (DVD) players, refrigerators, dishwashers, microwave ovens, and motorized vehicles. The client application 400 is platform independent, meaning that the client application 400 is independent of the particular hardware platform and operating system (OS)

platform. As such, the client application 400 could be loaded onto numerous different devices that have different hardware and software platforms.

For example, the client application 400 could be loaded onto a computer running Microsoft Windows™, a computer running an Apple Macintosh OS™, or another computer running a Linux OS™. As another example, the client application 400 can be loaded onto and execute on a handheld computer, media console, cable set-top box, or satellite receiver box. The client application 400 can facilitate technical support services for the device which it is loaded on and executes from, as well as appliances that the client application 400 is not loaded or executing on. For example, a client application 400 executing on a set-top box can facilitate providing technical support services for the set-top box or a refrigerator.

The client application 400 is functionally at least semi-autonomous from the operating system (OS) so that the client application 400 can perform at least some functions that are conventionally provided by the OS, in case the OS is not fully operational. For example, the client application 400 can include a network adapter module 402 that includes network communications functions, such as interfacing with a network adapter or other network interface. The client application 400 may include one or more other modules 404, such as a process manager, memory manager, security functions or file system support, which may be included to reduce or eliminate reliance upon corresponding functions in the OS, in case the OS is not fully functional.

For example, a process manager can be operable to manage processes that the client application 400 launches. Memory management by the client application 400 may involve controlling a certain amount of memory, which may be free or floating memory, or memory that is leaked. Memory management includes trash collection. The file system support may be structured file system support. The memory managed by client application 400 memory manager is not accessible to the OS or other applications. Similarly, a structured file system support of the client application 400 is not accessible to the OS or other applications. Such autonomy of the client application 400 from the OS allows for same-device problem solving when one or more functions of the OS are not completely operational.

In some embodiments, the client application 400 is a virtual machine (VM) creating a self-contained operating environment and operable to simulate an operating system. In these and other embodiments, the client application 400 can be fully autonomous, and not only semi-autonomous. For example, a fully autonomous client application 400 could boot the system up, or simulate booting the system, like an OS.

The client application 400 includes an inventory profile generator 406 that is operable to determine the inventory of the end user's system. For example, the inventory profile generator 406 may gather the hardware and software component inventory and store the inventory list in a file. In some embodiments, the inventory is stored in a hierarchical fashion. The inventory profile can be presented to the user and/or provided to a knowledge base of end user subscriber information or a technical support agent.

The client application 400 further includes a chat module 408 through which the end user can chat with other users, such as technical support agents. The chat module 408 may present a user interface that is part of a larger window that also includes a user region that can present one or more other user interfaces. For example, one region of the window can include the chat interface, where the user can chat with a technical support agent, while another portion of the window can include a user region, where user selectable information can be presented. In the user region, the user may select an inventory interface to view the system inventory, or a resolutions interface, where the user may view previously executed resolutions or new resolutions that have not been used. The user may alternatively select to browse the Internet through the user region via a client application-embedded browser 410.

The embedded browser 410 is functionally autonomous from other browsers that may be loaded on the end user's system. This means the embedded browser 410 is not functionally reliant upon other browsers. The embedded browser 410 is operable to browse Internet web pages, including resolutions web pages, without reliance upon another browser. As such, if other browsers, such as Netscape Navigator™ or Microsoft Explorer™ are malfunctioning or not fully operational, the embedded browser 410 can still provide browsing functionality, for example, to a resolutions web page that may provide a fix for the malfunctioning browser, a malfunctioning OS, or other technical problem.

The client application 400 may also include offline resolutions 414 that can be accessed. Offline resolutions 414 can be used to fix network communication problems that prevent the client from contacting a support agent or other network-based resource for problem resolution. For example, an offline resolution 400 can instruct the user to follow certain steps to restart network communications, such as by resetting a router, plugging in a cable, or installing a necessary driver.

The client application 400 may also include one or more disabled features 412 that can be enabled. These features 412 are typically licensable programs that end users may choose to purchase. For example, the client application 400 may have a phone support feature, but the phone support feature may be disabled at initial installation of the client 400. The end user may want to enable the phone support feature later. The phone support feature, and other disabled features, may be enabled in different ways. For example, a technical support agent can send a command to enable a disabled feature. Alternatively, the end user may be given a key or password to enable the disabled feature. The features 412 can be monetized; i.e., a monetary price can be attributed to the features to enable service providers and technical support service providers to market additional products to the end users. Different disabled features 412 may be included in the client application 400 and monetized differently, depending on the type of user (e.g., expert or novice) or the provider of the features. An example technical support agent interface screen is shown and discussed below, which a technical support agent can use to view and enable disabled features 412 on the client application 400.

Figure 5:
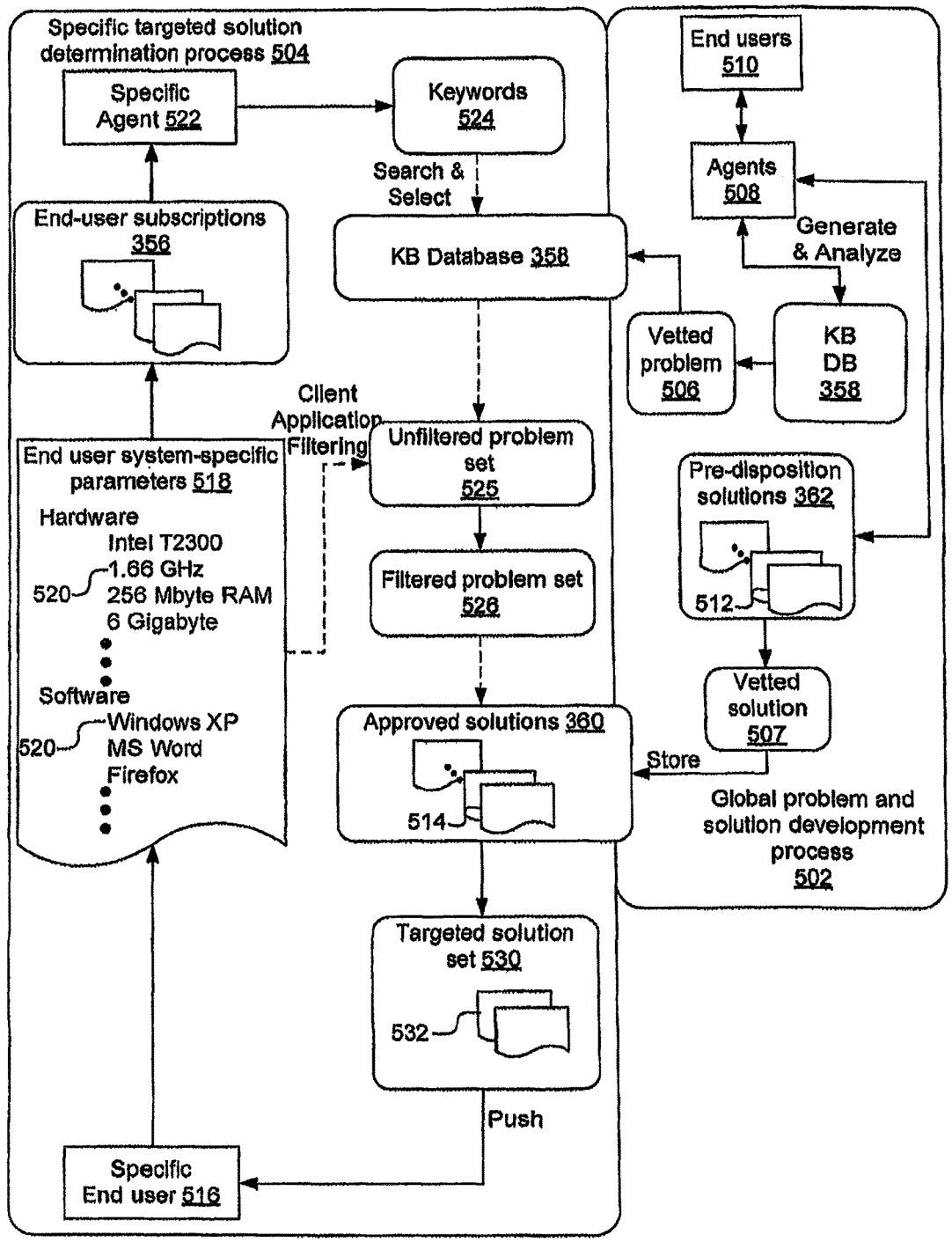
FIGS. 5-6 illustrate exemplary schemes for providing technical support for a particular problem incident based on an aggregation of problem information and solutions developed from other technical support jobs performed in response to other problem incidents reported across a general population of end user computer systems.

FIG. 5 illustrates an exemplary scenario in which problems and solutions are identified and developed in a global problem and solution development process 502. Also illustrated is a specific technical support problem and solution determination process 504 that attempts to provide support for a specific end user 516 by making use of identified problems and solutions developed in the global problem and solution development process 502. Generally, during the specific technical support problem and solution determination process 504 one or more targeted possible problems and solutions are determined based on the particular end user's computer system configuration and vetted problems 506 and vetted solutions 507 developed and validated during the global solution development process 502.

The global problem and solution development process 502 is ongoing and may be viewed as a by-product or aggregation of many specific technical support jobs. More concretely, technical support agents 508 are regularly interacting with end users 510 during technical support jobs, wherein the agents 508 may identify new problems and/or develop new solutions to problems in the end users' 510 computer systems. The agents 508 and end users 510 may be associated with any number of service providers (e.g., ISPs, NSPs, wholesale providers, enterprise service providers, etc.). As such, problems identified and solutions generated by the agents 508 comprise a service provider-agnostic, heterogeneous solution set, meaning that the solutions developed relate to a wide variety of different system configurations, platforms, platforms, users, organizations and others.

The problems identified by and the solutions developed by the technical support agents 508 may be new; i.e., these solutions have not been previously identified and stored for later reuse. For example, a technical support agent 508 may not find a problem reported by an end user 510 in the knowledge base 356. As another example, a technical support agent 508 may not find a solution to a particular problem or for a particular system configuration in the solutions set 360 (FIG. 3). The agent 508 will then work with the end user 510 to fully describe the problem, including identified causes, if any, and/or develop a new solution that solves the problem for the end user's 510 system configuration.

Although a newly identified problem may have been described for a particular end user incident, the description (e.g., symptoms, possible causes) may not be described in a way that it can or should be made available to other agents 508 or end users 510. For example, the problem description may not have taken into account other symptoms that would help identify the problem. Similarly, although a new solution may work for a particular end user 510, initially the solution has not been fully tested to determine if the solution can or should be applied more globally to a wider population of end users.

As such, new problems and new solutions are first proposed for application to a wider population. Proposed problems are submitted to a dynamic region of the knowledge base 358 where they can be tested, reapplied by agents in technical support scenarios and validated by administrators. After the proposed problems have been tested and have become static (i.e., no further changes), the vetted problems 506 are moved to the static region of the KB 358. The problems 506 may be stored as data objects that include a problem identifier, description, and one or more possible causes.

Solutions 512 are proposed for use by the general population of end users and agents. They are potentially applicable to a wider customer, agent and configuration base. Proposed solutions 512 are stored in the pre-disposition solution set 362 where they can be further tested, reapplied and validated. Possible dispositions of further testing of solutions are deletion of the proposed solution 512, further monitoring, or approval for broader application to the general end user population. While in the pre-disposition solution set 362 the proposed solutions 512 are vetted through testing and analysis to ensure that the solutions work consistently and have been associated with the appropriate problems and/or system configurations. The agents 508 can search for and use proposed solutions 512 that may be applicable to a system configuration or problem being experienced by an end user 510. The agents 508 can report on the results of using proposed solutions 512. Administrators may also test proposed solutions 512 and report results or findings. Reported results are reviewed to determine the disposition of proposed solutions 512. The amount of analysis and testing of the proposed solutions 512 may vary from system to system.

When proposed solutions 512 are approved for broader application to the global end user population, the vetted solutions 507 are stored in the globally accessible solutions set 360. The vetted solutions 506 are stored in such a way that they can be later retrieved based on the problem they solve and/or the configuration of the system that they are relevant to. For example, the vetted solutions may have a "problem" data field that enables searches of the solutions set 360. The solutions 506 may include a "configuration" data field that specifies configuration parameters relevant to the solution.

In one embodiment, a specific incident targeted solution determination process 504 can make use of vetted problems in the static region of the KB 358 and technical solutions previously vetted and stored in the solution set 360. In the targeted solution determination process 504 a specific end user 516 outputs a system configuration file 518 that includes system-specific parameters 520 characteristic of the end user 516 computer system. The configuration file 518 is transmitted to a specific agent 522 and/or the end-user subscriptions 356 where it is stored. In the embodiment illustrated, the configuration file 518 is stored in the end-user subscriptions 356 and retrieved from the end-user subscriptions 356 by the agent 522. The configuration file 518 is typically stored in association with the specific end user's 516 associated subscription. However, in other embodiments, the configuration file 518 is sent directly to the agent 522.

As mentioned, the system-specific parameters 520 characterize the end user's 516 computer system and present a generally complete view of the end user's 516 computer system, including the hardware and the software parameters, to the agent 522. The specific agent 522 is typically remote from the specific end user 516. It should be understood that although the configuration file 518 is sent to a specific agent 522, if the end user 516 works with a different agent (e.g., in a subsequent technical support session), the configuration file 518 will be available to the different agent via the end-user subscriptions 356.

The embodiment shown in FIG. 5 depicts agent-facilitated help, wherein the agent 522 uses information about the end user's computer system to assist the end user 516 in determining the cause of a problem and one or more targeted solutions. Based on information from the end user 516, including the system-specific configuration 518, the specific agent 522 generates problem descriptors 524 related to a problem or an identified cause of a problem. The key words 524 are used to search the static region of the knowledge base 358 for problems that relate to the key words 524.

An alternative embodiment involves end-user intelligent self-help. In this embodiment, the specific end-user 516 enters keywords that are used to search for targeted problems in the knowledge base 358. Only problems that relate to the end user's 516 system-specific parameters will be searched for. For example, if the end user has an Apple Macintosh™ computer, only problem related to Apple Macintosh™ will be found. Problem identifiers, description (e.g., symptoms, severity, secondary problems), and one or more possible causes are returned to the specific end-user 516.

In the particular embodiment shown in FIG. 5, an unfiltered set of problems 525 is determined from problems (either static or dynamic) the KB 358. The unfiltered problem set 525 may be viewed as a problem set that is relevant to the problem, but applies to the general end user 510 population, rather than the specific end user 516. As such, the system-specific parameters 520 of the configuration file 518 are applied to the unfiltered problem set 525 to filter out problems that do not apply to the specific end user computer system configuration. In the illustrated embodiment, the end user client application filters the unfiltered problem set 525. In another embodiment, illustrated in FIG. 6, the agent may carry out the filtering, based on an agent-assess configuration file.

With further regard to filtering the problem set 525, filtering may be performed using system-specific parameters 520 of the configuration file 518. Of course some system-specific parameters 520 may match parameters associated with problems in the problem set 525, while others do not. As such, in some embodiments the level of filtering can be set to allow for tolerance. For example the agent 522 may set the filter tolerance such that only a certain number of parameters must match. As another example, the agent 522 may set the filter tolerance such that only the hardware parameters (or only a certain number of hardware parameters) must match. As yet another example, the filter tolerance may specify particular parameters of the system-specific parameters 520 that must be in the technical solutions 528.

The result of filtering on the end user configuration is a targeted, filtered problem set 526 of one or more problem data objects describing problems that are specific to the end user's computer system configuration. The targeted problem set 526 can be used to determine targeted technical solutions that were previously developed and vetted and that relate to the particular problem identified with the specific end user's 516 computer system. In some embodiments, the problem data objects of the filtered problem set 526 include links to associated solutions in the approved solutions 360. In other embodiments, a key word search is performed on the approved solutions 360 using key words from the filtered problem set and/or using system-specific parameters 520. The output is a targeted solution set 530 with one or more technical solutions 532 that are targeted to end user's 516 computer system. In embodiments that use an adjustable filter tolerance as described above, the targeted solutions 532 of the targeted solution set 530 may be more or less targeted.

The targeted solution set 530 is then made available to the specific end user 516. In one embodiment, a targeted solution 532 is transmitted (e.g., pushed) to the end user 516 by the agent 522. In other embodiments, the technical solution 532 may be stored at a web site location where the end user 516 can retrieve it. In the latter embodiment, the agent 522 can transmit a hypertext link to the end user 516 that links to the stored technical solution 532.

Figure 6:
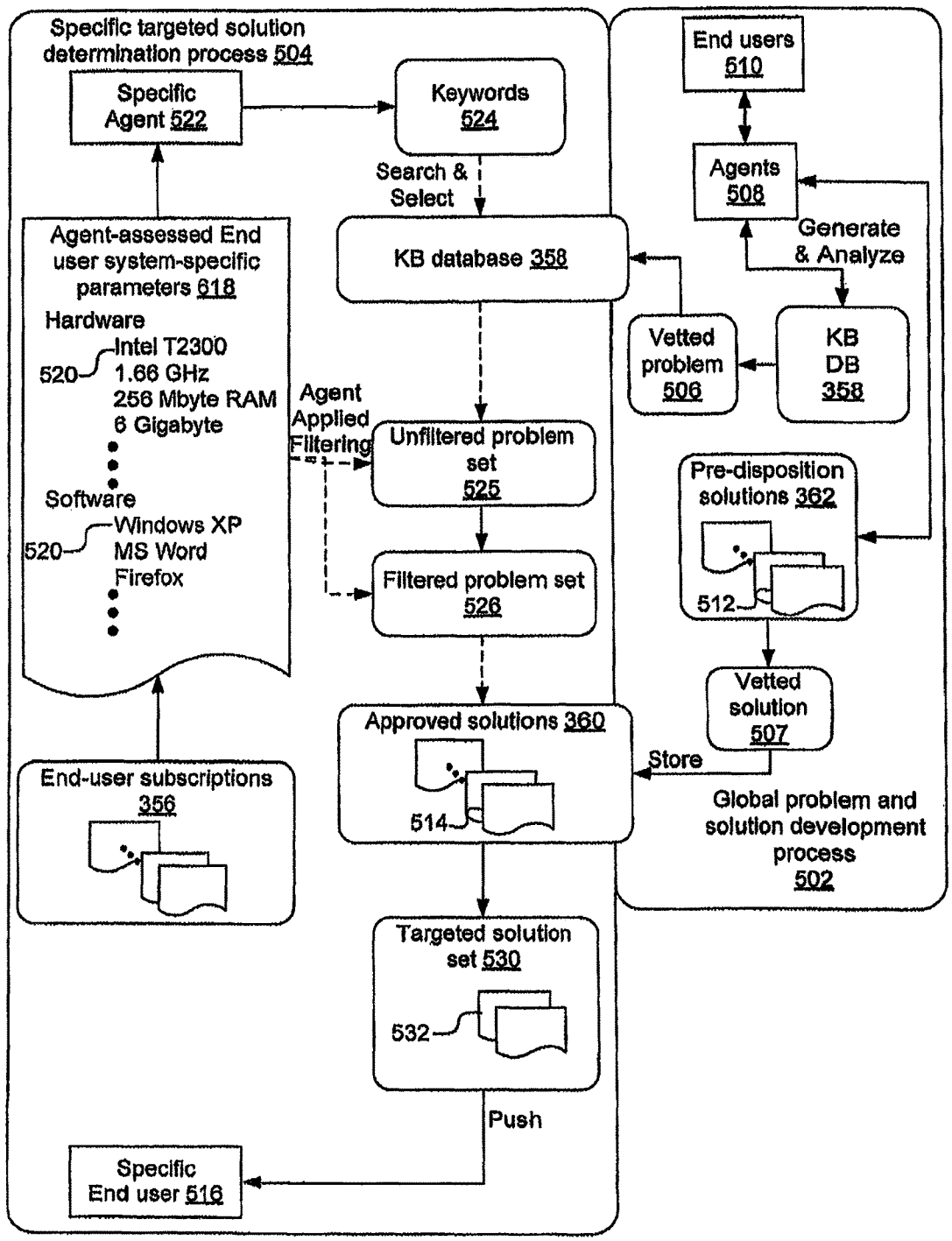

FIG. 6 illustrates a global problem and solution identification process 502 and a specific targeted solution determination process 504, much like those shown in FIG. 5. Generally, the modules and processes are the same as those shown in FIG. 5. However, in the embodiment shown in FIG. 6, the filtering of the problem set and solution determination is performed by the agent 522. In this embodiment, the agent 522 applies the filtering based on agent-assessed end user system-specific parameters 618.

Figure 7:
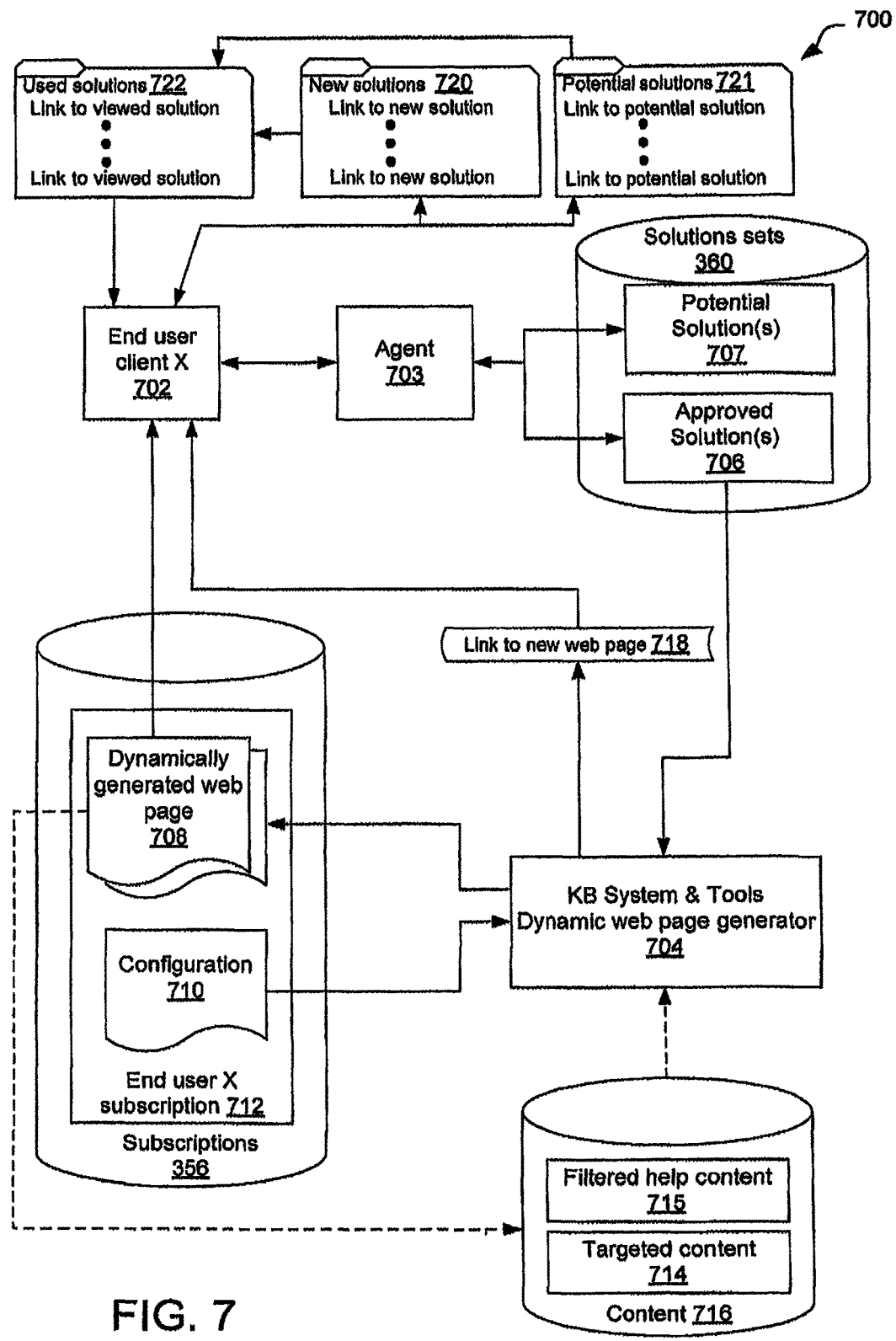
FIG. 7 illustrates an exemplary scheme for delivering network-based technical support to an end user in accordance with one embodiment.

FIG. 7 illustrates an exemplary scheme 700 for delivering network-based technical support to an end user in accordance with one embodiment. In this scheme 700, an end user client X 702 associated with a subscribing end user identified by 'X', where 'X' may be a unique end user identifier, interacts with a technical support services architecture (e.g., technical support services architecture 206, FIG. 2) to obtain technical support. A dynamic web page generator 704 of the technical support services architecture dynamically generates targeted web pages that may be browsed by the end user client X 702. An agent 703 may facilitate problem identification an solution determination. In one embodiment, the dynamic web page generator 704 is one of a plurality of tools (e.g., KB system & tools 232, FIG. 2) accessible through the technical support services architecture.

In one embodiment one or more solutions, which can be approved solutions 706 or potential solutions 707, are identified from the solutions set 360 in the technical support service architecture 300. The dynamic web page generator 704 dynamically generates one or more web pages 708 based on the identified approved solutions 706 and/or potential solutions 707. In one embodiment, the solutions 706 comprise one or more eXtensible Markup Language (XML) documents and the dynamic web page generator 704 transforms the XML documents into browsable pages, such as Hypertext Markup Language (HTML) web pages using XSLT.

The dynamic web page generator 704 may use the system configuration file 710 associated with end user X subscription 712 to select content 714 or text for the web pages 708, or otherwise adapt the web pages 708 to end user Xs particular computer system. Content 714 may be stored in a content data store 716 that store content applicable to a general population of end user systems, and wherein content is selectable for inclusion in web pages 708 describing solutions targeted at end user X's particular system configuration. Web pages 708 typically reference one or more items of content 714. Examples of content are images, photos, audio, or media related to parameters or system components of end user X's system. Web pages 708 may be stored in association with end user X's subscription 712, and can be accessed by end user client X 702. In other embodiments, web pages 708 may be stored in other memory.

The dynamic web page generator 704 creates a link 718 (e.g., a hyperlink) to each web page 708. The link 718 may be transmitted to the client 702 by the technical support services architecture. Alternatively, the link 718 may be transmitted to the technical support technician/agent 703, who may then transmit the link 718 to the end user client 702. The end user client 702 may also retrieve the link 718 from the technical support services architecture. The link 718 may be transmitted while the end user is online or offline.

Links 718 are first stored in either a new solutions folder 720 or potential solutions folder 721, depending on whether the solution is approved or potential. From the folders 720, 721 the client 702 can access them for browsing the corresponding web pages 708. After the client 702 browses the corresponding web pages 708, the links are moved to a used solutions 722 folder. The client 702 can access both new solutions and old solutions through links in the new solutions folder 720 and used solutions folder 722.

Figure 8:
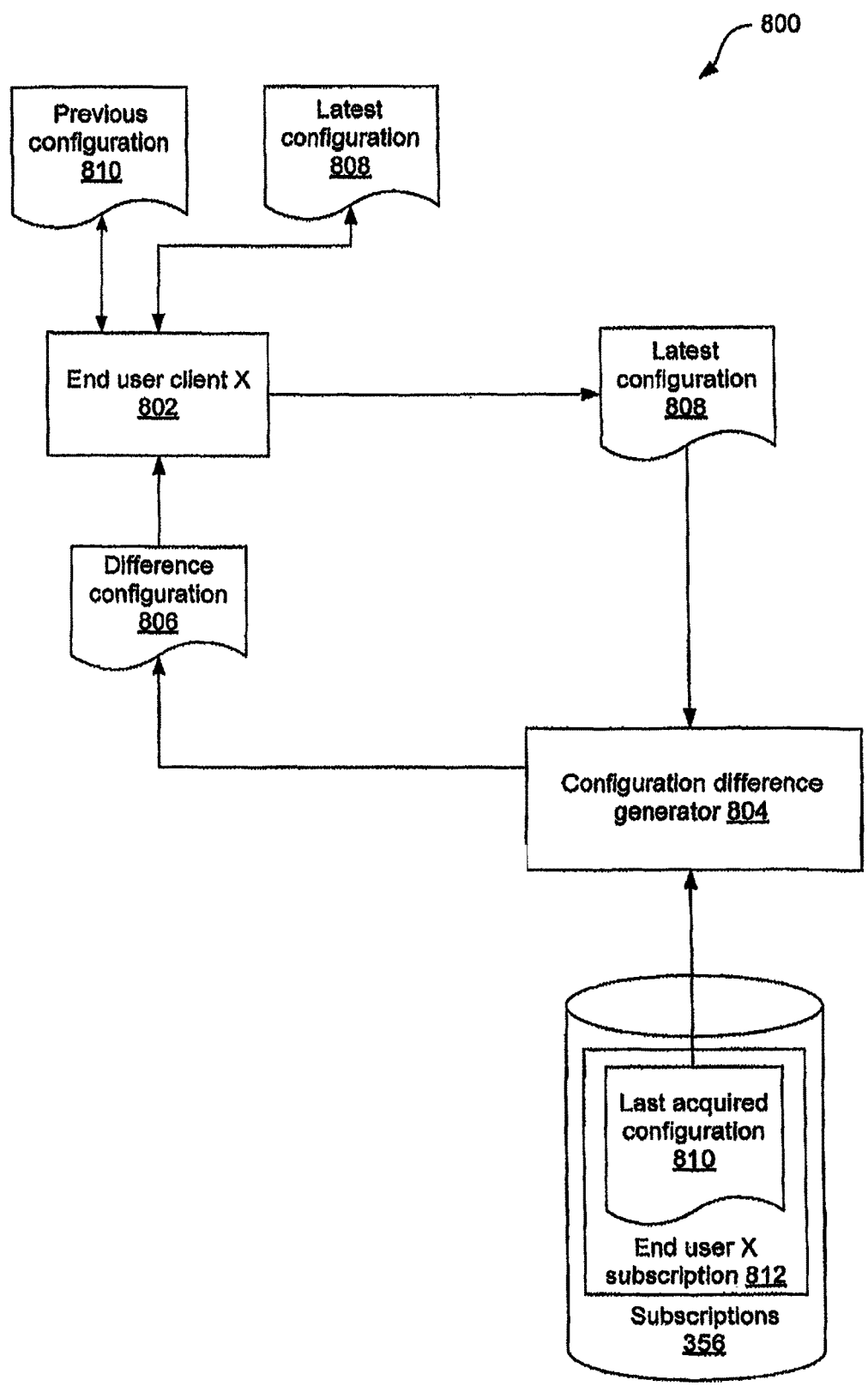
FIG. 8 illustrates a configuration difference generation scheme in accordance with one embodiment.

FIG. 8 illustrates a configuration difference scheme 800 whereby a configuration difference generator 804 of the technical support services architecture (e.g., technical support services architecture 300, FIG. 3) generates a configuration difference 806 indicating differences in system parameters between two configurations of end user X's system. The end user client X 602 generates and transmits a latest configuration 808 to the technical support services architecture. The configuration difference generator 804 receives the latest configuration 808 and compares the latest configuration 808 to the last acquired configuration 610.

Based on the comparison, a difference configuration 806 is generated. The difference configuration 806 in general includes system parameters with associated indicators that indicate whether the system parameters have been added or removed. The difference configuration 806 may include only the differences between the configurations. Alternatively, the difference configuration 806 may comprise a baseline configuration, such as the latest configuration 808 or the last acquired configuration 610, edited to include indicators indicating whether parameters have been added or removed.

The end user client 602 receives the difference configuration 806, whereupon the end user client 602 may store the difference configuration 806 and/or use the difference configuration 806 to generate a prior configuration 810. The prior configuration 810 and the latest configuration 808 may be viewed by the end user.

Figure 9:
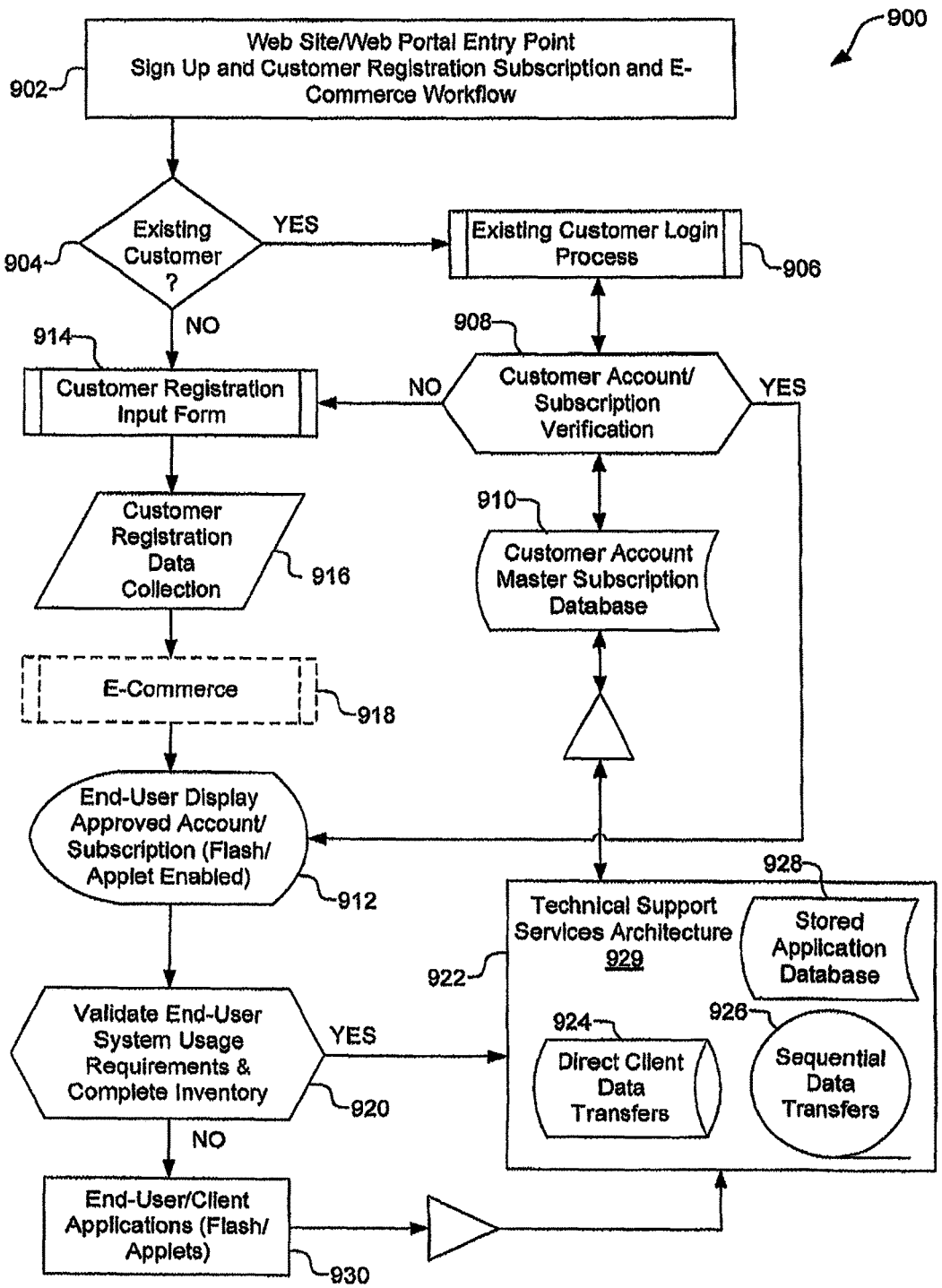
FIG. 9 is a flowchart illustrating a process for registering a customer for technical support and providing and receiving the technical support using a technical support platform according to one embodiment.

FIG. 9 is a flowchart illustrating a process 900 for registering a customer for technical support using the technical support platform according to one embodiment. The customer enters the process through a web site or web portal at an entry step 902. After the customer enters the web portal, it is determined whether the customer is an existing customer or if the customer is a new customer at an inquiry step 904. The inquiry step 904 determines if the customer has previously registered to receive customer technical support.

If the customer is registered, the process 900 branches "Yes" to a login process 906. In the login process 906, the customer logs in with, for example, a username and password. A verification step 908 verifies the customer login information by accessing a customer account master subscription database 910, which has registered customer login information stored therein. If the customer login information is valid, the process 900 branches "Yes" to display step 912, which displays approval of the customer's account registration.

Referring again to the inquiry step 904, if the use is not an existing customer, the process 900 branches "No" to a registration step 914. Also, if in the verification step 908 it is determined that the customer's login information is invalid, the process 900 branches "No" from the verification step 908 to the registration step 914. The registration process 914 gathers customer registration information using a registration input form. A registration data collection step 916 collects the registration data entered into the input form.

An E-commerce process 918 provides functionality related to purchase and distribution of services over the network. E-commerce includes, without limitation, sales, marketing, billing, payment, fulfillment, and/or entitlement. E-commerce may be conducted between, businesses, governmental agencies, individual consumers, or others. In accordance with embodiments described herein, E-commerce includes, without limitation, up-selling, cross-selling that can be performed by service providers.

After the account approval is displayed in deployment and display step 912, the process 900 deploys one or more application(s) (e.g., client applications) to the end user. The applications can be Flash applets, or others. The application(s) collects and validates the customer's system parameters in an inventory step 920. By way of example, but not limitation, inventory step 920 may gather the customer's system configuration, component information, system state information, usage capabilities, requirements, or other information. The inventory step 920 then validates the system parameters. If valid, the process 900 branches "Yes" to integration process 922.

The integration process 922 employs direct client data transfers 924 and sequential data transfers 926 to collect and integrate customer system parameters, which are determined via the "configuration detector" applet to find both hardware devices and software applications; entering the relevant system information into a stored application database 928. A system profile of the end user's system configuration is sent to the technical support services architecture 929. The integration process 922 can involve the technical support services architecture 929 automatically determining whether the user had previously run the configuration detection process to gather the user's system configuration, and, if so, comparing the most recent system configuration profile with the last system configuration profile. Differences between the two profiles are determined. The new profile, the differences, and/or the old profile can be sent to the client so that the client has a history of the system configuration.

In addition, based on the user's system configuration, system-specific help and resolutions are sent to the client. The system-specific help and resolutions are determined by filtering the knowledge base with the user's system configuration to determine only those data sets in the knowledge base that are relevant to the user's system. The filtering is performed on a machine identifier basis, rather than a customer identifier basis to support multi-computer users, businesses, and households.

If the inventory operation 920 determines that the system parameters are insufficient to provide for integration, the process 900 branches "No" to a customer interaction step 930. The customer interaction step 930 involves customer use of the deployed application(s) to determine the cause of technical problems that exist at the client computing device. The deployed application(s) interact with the technical support provisioning center to resolve the technical problems. For example, additional software may be transferred from the technical support services architecture 929 to the client. As another example, the client may receive information from the knowledge base to facilitate problem resolution. Any number of resolutions may be provided to the client. These may be provided while the client is on-line or when the client is offline. If resolutions are provided offline, the end-user can access them later when the client comes online. For example, the end-user may be notified by the client that new resolutions are available. After the interaction operation 930, the process 900 branches to the integration process 922, which integrates the customer system parameters as described previously.

Figure 10:
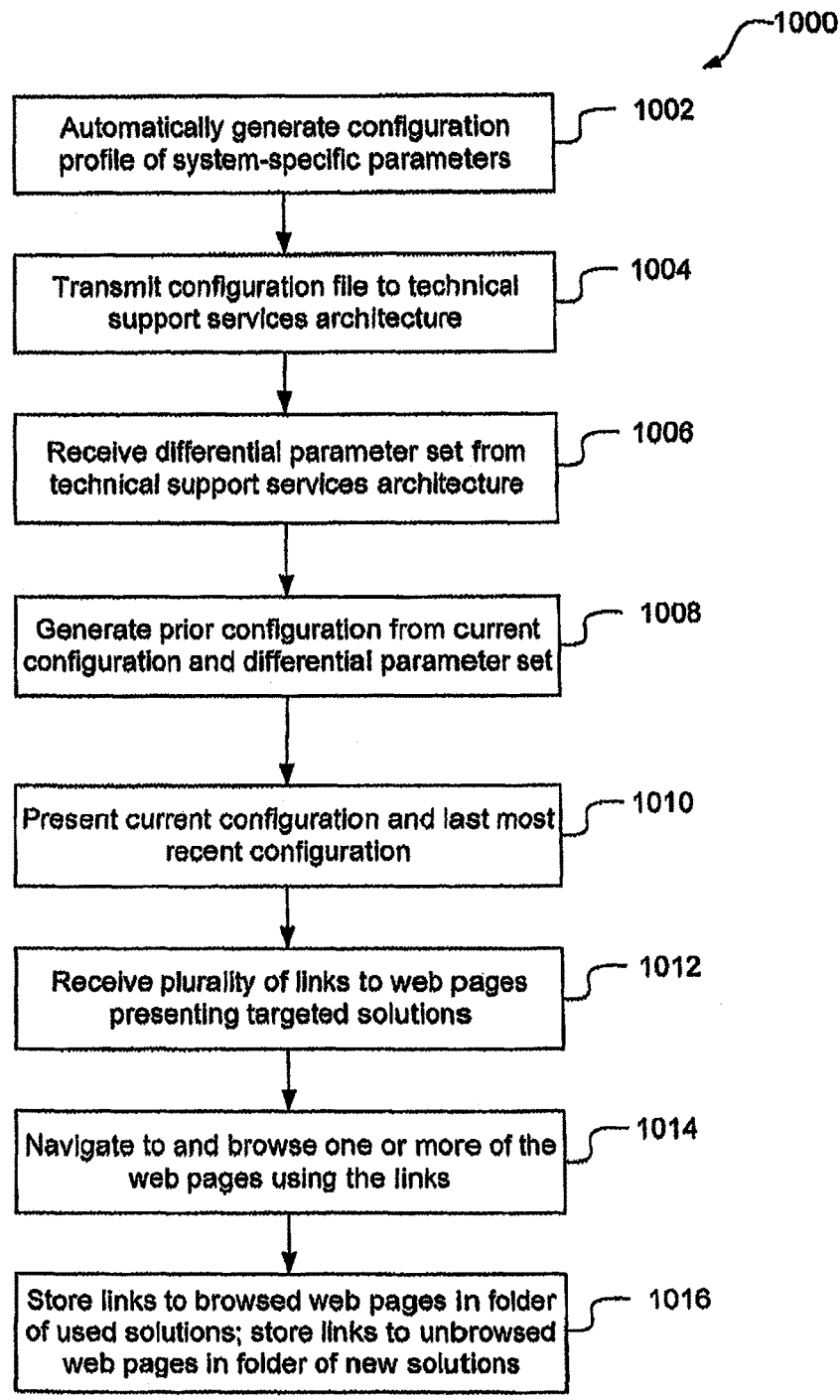
FIG. 10 is a flowchart illustrating an algorithm for determining a client system configuration profile and based on the profile, delivering a determined solution to an identified problem.

FIG. 10 is a flowchart illustrating and embodiment of a technical solution algorithm 1000 that may be carried out by an end user client, such as end user client 109 of FIG. 1. In one embodiment, the algorithm 1000 is performed by an end user client that is in communication with one or more applications, applets or other tools executing on a technical support services architecture, such as technical support services architecture 206 of FIG. 2.

In a generating operation 1002, a system configuration is automatically generated. The generating operation 1002 gathers system-specific parameters associated with the end user computer system and stores the parameters into a configuration file. The generating operation 1002 may occur when the system powers on and/or when the end user logs into the technical support services architecture to obtain technical support. The generating operation 1002 can gather the parameters in different ways. For example, the generating operation 1002 may read a registry of hardware and software components residing on the end user system. The generating operation 1002 may query different hardware and software components to obtain further details about the components, such as versions, models or configuration.

A transmitting operation 1004 transmits the configuration file including system-specific parameters to the technical support services architecture. The transmitting operation 1004 may occur automatically without the end user being notified, or the transmitting operation 1004 may notify the end user prior to transmitting. Further the transmitting operation 1004 may wait for end user approval prior to transmitting the configuration file.

A receiving operation 1006 receives configuration difference information from the technical support services architecture. The configuration different information may be in the form of a difference file. The configuration difference information indicates a delta between the configuration generated in the generating operation 1002 and the last most recent system configuration. For example, software or hardware components may have been removed or disabled since the last time the configuration was transmitted to the technical support services architecture.

In another generating operation 1008, an end user client application uses the configuration difference information to generate a prior configuration file including hardware and software parameters of the prior system configuration. In one embodiment, the generating operation 1008 starts with the current configuration (i.e., the configuration generated in operation 1002) and adds new parameters from the difference set of configuration parameters and deletes parameters that are indicated as not present in the difference set of parameters.

In a presenting operation 1010, the current system configuration and the prior (last most recent) system configuration are presented. The end user can select which configuration to view and/or the two configurations may be presented side-by-side. Alternatively, one of the configurations may be presented with differences highlighted with different colors (e.g., red for deletions, blue for additions). In one embodiment, one or more of the current and prior configurations are presented in a window pane that is positioned next to a chat window pane in an integrated graphical user interface window. In such an embodiment, the end user can view both configurations while chatting with a technical support technician/agent.

In a receiving operation 1012, the end user client receives one or more interactive links to web pages. The links may be hyperlinks that the user can select (e.g., "click on" with a mouse input device). The interactive links may be transmitted (e.g., pushed) to the end user client from the technical support services architecture or a technical support technician/agent. The links may be transmitted to the end user while the end user is online, for example during a chat session, or while the end user is offline. When links (or other information) are sent to the end user when the end user is offline, such as when the end user system is powered off, the end user can retrieve the links (or other information) later by the end user client from a designated inbox or other repository.

When the end user selects an interactive link, a browser navigates to the associated web page in a navigating operation 1014. In one embodiment, the web page resides in memory at the technical support service architecture. The web pages can include various types of information related to the end user's computer system. In one embodiment the web pages instruct the end user of targeted solutions to solve a problem exhibited by the end user's system. The web pages may also include problem descriptions specific to the end user's system. Content of the web pages is targeted to the end user's particular system configuration. For example, images or photos of particular system components (e.g., USB cables, routers, printers, disk drives) specific to the end user's computer can be included in the web pages. As another example, audio (e.g., .wav, .mp3, .rm) may be included on the web pages that provides system-specific instructions to the user. Such images, photos, audio or other content can help the end user more readily identify particular hardware and software components and adjust them in a way to solve a technical problem.

In a storing operation 1016, links to web pages that have been browsed are stored in a folder (or other memory designation) containing old solutions, and links to web pages that have not been browsed are stored in a folder containing new solutions.

Figure 11:
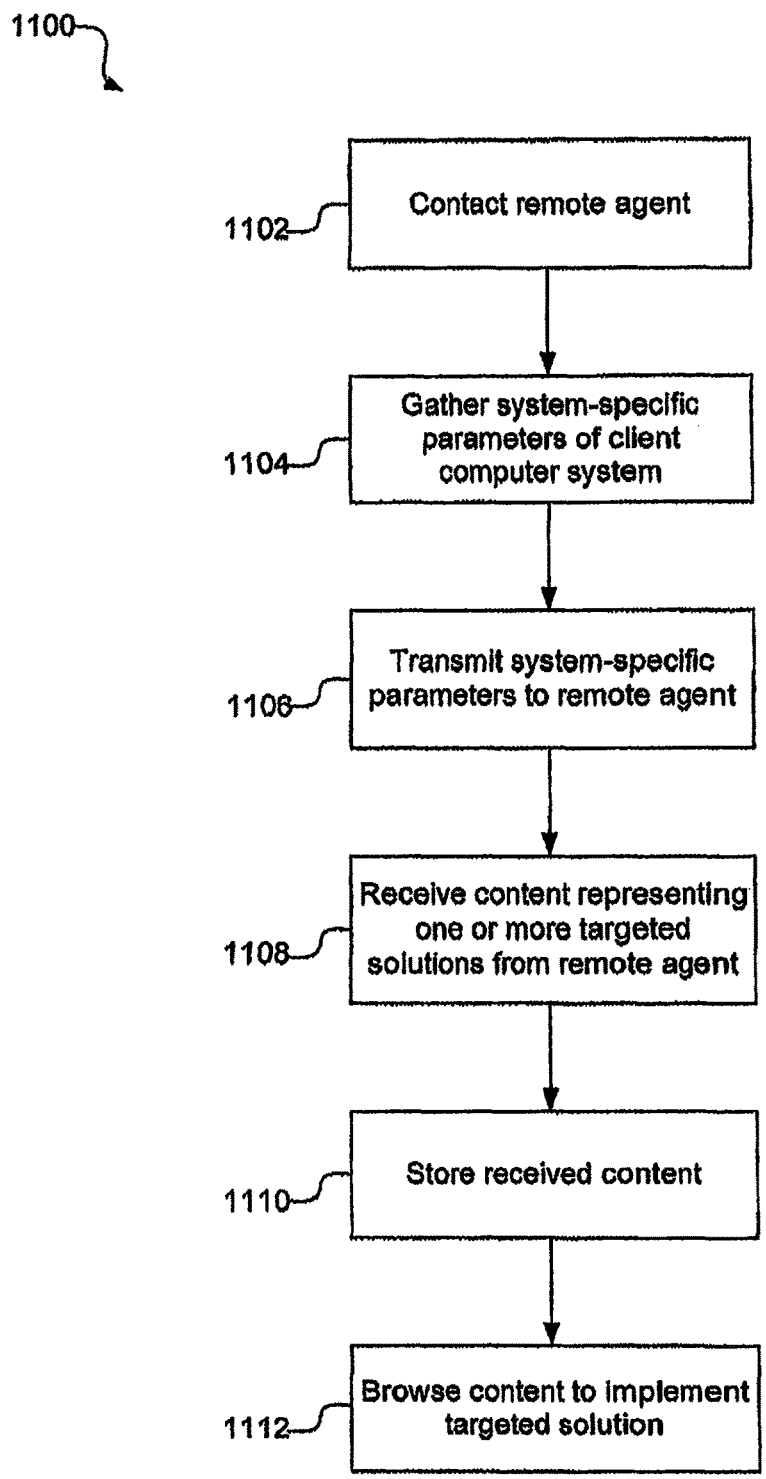
FIG. 11 is a flowchart illustrating an algorithm for contacting a technical support agent and receiving a targeted solution to an identified problem.

FIG. 11 is a flowchart illustrating an embodiment of a technical support algorithm 1100 that could be carried out by an end user, such as end user 118 of FIG. 1. In a contacting operation 1100, the end user contacts a remote agent. The contacting operation 1102 may involve navigating to a particular web site and establishing a technical support chat session with a technical support agent. For example, the end user may access end user web portal API 344 and/or the chat system 348 of the platform 300 shown in FIG. 3. The technical support agent will also access the chat system 348 of the platform 300.

In an identifying operation 1104, system-specific parameters of the end user computer system are gathered. The system-specific parameters characterize the configuration of the end user computer system. The identifying operation 1104 may involve reading system parameters from various sources in the end user computer system and storing them in a system configuration file. Alternatively, the identifying operation 1104 may involve identifying a configuration file associated with the end user in the knowledge base 356 of the platform 300. In a transmitting operation 1106, the system-specific parameters are communicated to the remote agent. The transmitting operation 1106 may involve the end user sending the system-specific parameters or the database driver 370 sending the end user-specific configuration file to the agent.

After receiving the system-specific parameters, the agent may determine one or more targeted solutions for a problem associated with the end user computer system. The targeted solutions may comprise XML files, factored content data, and re-factored potential solutions data, structured and unstructured content, from within the knowledge base solutions set 360 of FIG. 3. The process of factoring content refers generally to any one or more of creating content, modifying content, regenerating content.

The dynamic web page generation includes dynamically assembling parts of the web page, including content. An extensible style sheet language transformation (XSLT) process may be applied to the XML files to generate customizable and stylized HTML based content in representation of the targeted solutions. XML queries and data driven results sets may be applied to and through the XSLT transformational process for factoring and re-factoring content into forms other than HTML in support of providing solution sets in various other native formats or style sheets. The targeted solution that is generated consists of content that can be presented at the end user. This content may include images, text, video, audio, or other content that is relevant to the end user computer system's particular configuration and/or problem set. For example, if the solution relates to a cable connection, an image of a cable having the particular connection types may be included in the solution so that the customer can tell what type of cable he needs for his particular system.

In a receiving operation 1108 the end user receives content representing one or more targeted solutions. In one embodiment, the receiving operation 1108 involves the agent pushing a hyperlink referencing the targeted solution content to the end user. In another embodiment, targeted solution content may be sent to the end user in the form of a document (e.g., a browsable web page). In a storing operation 1110, content representing the targeted solution(s) is stored in a manner that the end user can retrieve the content to view and implement the targeted solution(s). In some embodiments, the targeted solution(s) are first saved as web pages in a file folder of available targeted solutions. Once the end user accesses and implements the content associated with the available targeted solutions, the content is moved to a solutions history folder storing a history of implemented solutions. In a browsing operation 1102, the end user can browse the content representing the targeted solutions.

Figure 12:
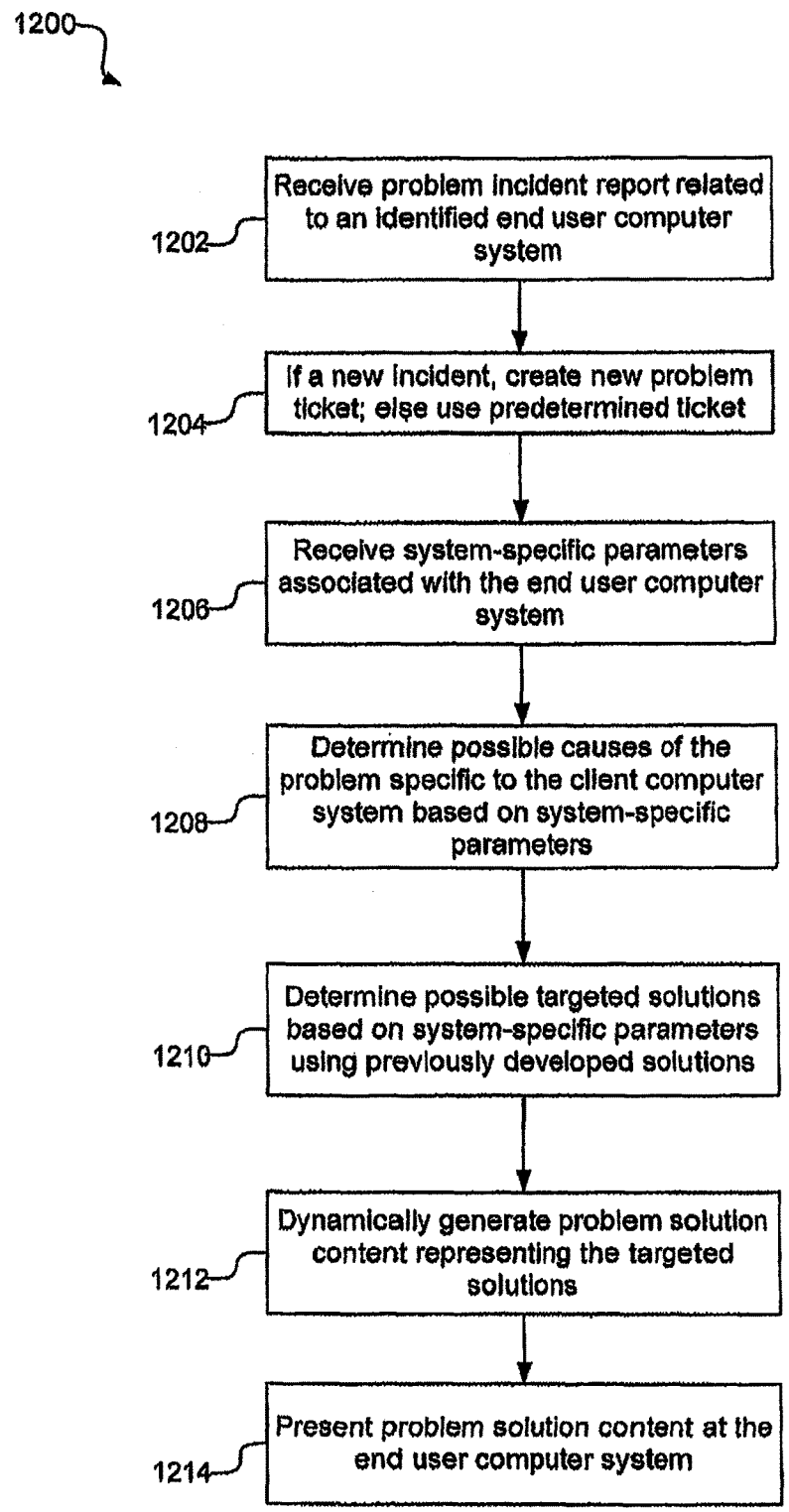
FIG. 12 is a flowchart illustrating an algorithm for determining a targeted solution to an identified problem.

FIG. 12 is a flowchart illustrating an embodiment of an agent side technical support algorithm 1200 that could execute in conjunction with the end user algorithm 1100 shown in FIG. 11. In a receiving operation 1202 the agent receives an incident report reporting a problem exhibited by the end user's computer system. In a creating operation 1204, a new problem incident ticket is created if a ticket has not been created yet for the reported incident. The ticket uniquely identifies the technical support job carried out in response to the reported incident. The ticket may be any unique identifier such as a series of alphanumeric characters. If a ticket was previously created, the predetermined ticket is user.

In another receiving operation 1206, the technical support agent receives system-specific parameters characterizing the hardware and software configuration of the end user's computer system. As discussed, the system-specific parameters may be delivered in the form of a configuration file from the end user computer system or a stored set of configuration files, such as the end user subscriptions 356.

A determining operation 1208 determines one or more possible causes of the problem reported by the end user. The determining operation 1208 could simply rely on the agent's own knowledge; for example, the technical support agent may be familiar enough with the system-specific parameters that he can recognize the problem and its cause himself. However, in general the agent queries a knowledge base 358 of problem information in the technical support platform 300. The problem information includes sets of problem identifiers with their associated problem descriptions and possible causes. The agent may perform keyword searches using words from the problem description in the incident report or words provided by the end user or other words selected by the agent. The knowledge base 358 returns problem identifiers, problem descriptions and/or possible causes based on the keywords and the system-specific parameters. Any problems returned by the technical support platform 300 are filtered according to the system-specific parameters so that they are targeted to the end user computer system.

In another determining operation 1210 one or more possible solutions are determined that address the one or more causes to the problem. In one embodiment, problems identified in the knowledge base 358 are linked to solutions in the solutions set 360. In this embodiment, the solutions linked to the problems having causes specific to the end user's computer are sent to the technical support agent.

In another embodiment the determining operation 1210 searches a set of stored pre-developed and validated solutions, such as solutions set 360, using key words related to the problem or its possible causes. Any solutions that found during the search are filtered based on the system-specific parameters of the end user's computer system, to derive one or more possible solutions that are targeted to the end user's computer system.

In a generating operation 1212, content is dynamically generated that can be used for presenting the one or more targeted solutions. In one embodiment, XML pages of the targeted solutions are translated using XSLT. The generated targeted solution content is then made available to the end user. In one embodiment the targeted solution(s) content is sent to the end user via e-mail. In another embodiment, the end user is sent a hyperlink the references a targeted solution content. A presenting operation 1214 presents the targeted solution content at the end user's computer system. In one embodiment, the targeted solution content is presented when the end user selects it for presentation (e.g., selecting an associated hyperlink). In some embodiments, the targeted solution content is stored in a file folder storing available solutions. The end user can access the available targeted solutions through the file folder of available solutions. After the user accesses the content related to the available targeted solutions the targeted solution content is moved to another file folder that stores a history of accessed targeted solutions.

Figure 13:
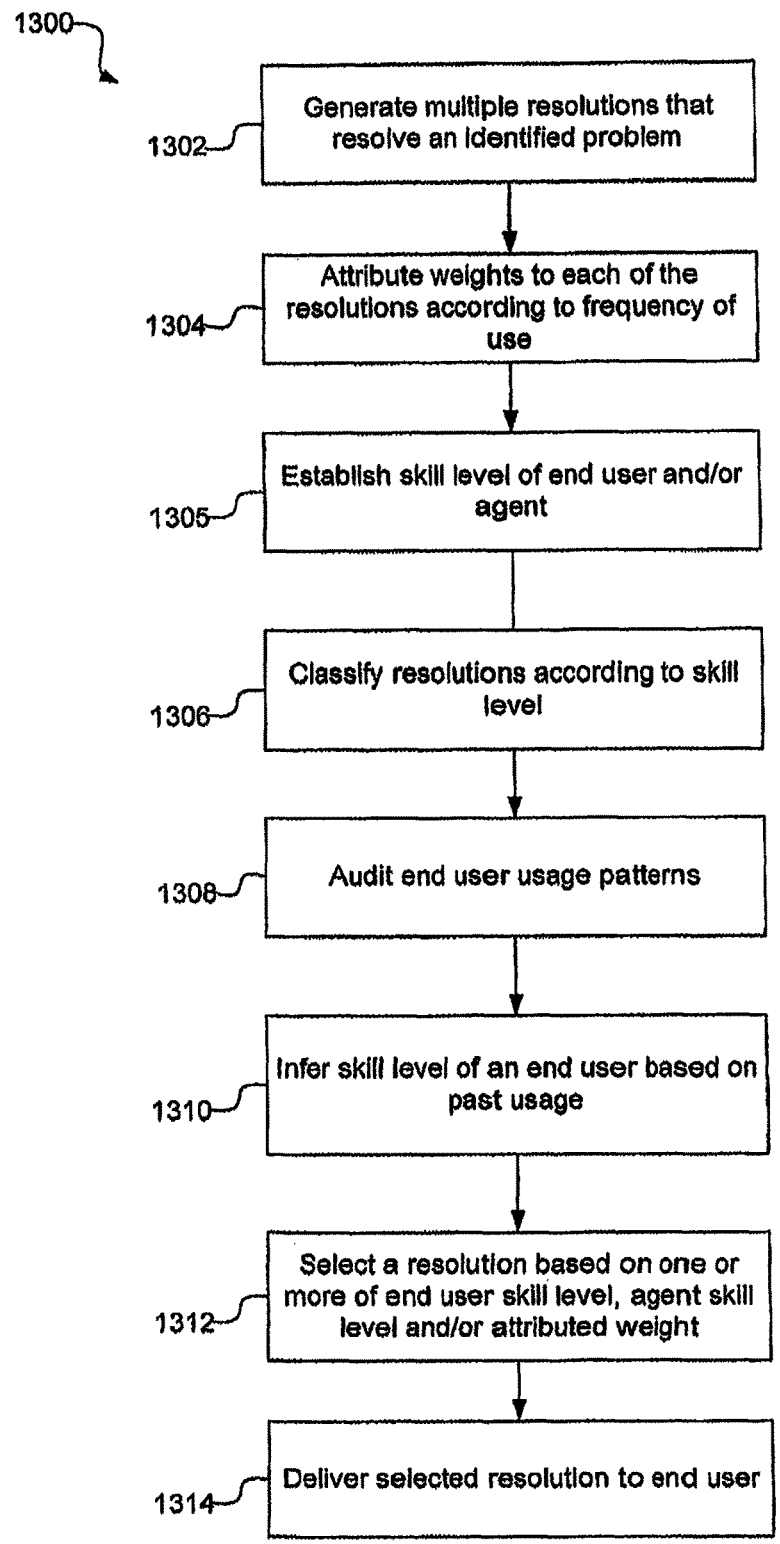
FIG. 13 is a flowchart illustrating an algorithm for determining a targeted solution based on an inference of end user skill level and/or a weighting of possible solutions according to some criteria, such as frequency of use.

FIG. 13 is a flowchart illustrating a problem resolution algorithm 1300 using problem resolution weighting, inference and end user usage pattern auditing. Portions of the algorithm 1300 can be performed by modules in the knowledge base, the agent application or the client application. In a generating operation 1302, multiple resolutions are generated for an identified problem. The generating operation 1302 occurs over time through the reporting of multiple problems. Multiple different resolutions may be generated for each identified problem. The problem resolutions can be reused to address an identified problem.

A weighting operation 1304 attributes numerical weights to each of the resolutions for an identified problem according to some criteria. One criterion is frequency of use. More frequently used resolutions can be attributed higher weights. Other criteria may be used, and a combination of criteria can be used. For example, weighting criteria could include efficiency of implementation, number of components affected for implementation, difficulty of implementation, age of the resolution, or others.

An establishing operation 1305 establishes skill levels associated with a technical support agent and an end user. Skill levels may be established by input from the agent and/or the end user. For example, the end user may enter what he suspects his skill level to be. Alternatively, or in addition, default skill levels can be assigned to the agent and/or the end user.

A classifying operation 1306 classifies resolutions according to skill level. In one embodiment, each resolution is classified as being high, medium and low, meaning that an end user would need high skill level, medium skill level, or low skill level, respectively, in order to implement the resolution. The classifying operation 1306 could derive the classification of each resolution based on technical support agent ratings or input. Classifications could also be determined from customer feedback or ratings.

An auditing operation 1308 audits an end user's usage pattern. In one embodiment, the auditing operation 1308 periodically queries the end user client application for usage information. Usage information indicates what applications the end user has been using, how the applications have been used (e.g., what functions), skill level of resolutions implemented by the end user, or other usage patterns. Auditing of the end user system is typically performed in a secure fashion and may or may not be transparent to the end user. For example, the end user may be prompted to grant permission for the audit before the auditing can take place. Alternatively or in addition, auditing operation 1308 may involve analysis of the end user's system configuration profile, which can indicate installed software applications, but could also be adapted to include usage pattern information.

An inferring operation 1310 infers the skill level of an end user based on past usage by the end user. In one embodiment inferring operation 1310 uses a lookup table that associates applications or functions with predetermined skill levels. For example, using Microsoft Excel™ may be designated as a nigh skill level application, whereas a Microsoft Paint™ may be designated as a low skill level application.

A selecting operation 1312 selects a resolution to a reported problem based on one or more of skill level or weight. For example, in some embodiments the selecting operation 1312 may choose a resolution only if the skill level classification of the resolution matches the inferred skill level of the end user. Alternatively, or in addition, the selecting operation 1312 may choose the resolution with the greatest weight, meaning that it is more frequently used. In some cases the only resolution available may be at a higher skill level than the end user. In these cases, the resolution may be flagged to indicate that the end user is recommended to seek help from a technical support agent.

After a resolution is selected, a delivering operation 1314 delivers the resolution to the end user (e.g., to the client application), or the client application retrieves the selected resolution from a specified location. Alternatively, the selected resolution may be pushed to the end user by a technical support agent. In delivering operation 1314, if the resolution is flagged, a recommendation will be made to the end user to contact a technical support agent to assist in implementing the resolution.

Over time, as the algorithm 1300 is carried out, the system "learns" (derives advanced information) about relationships between end user skill levels, agent skill levels and applicably weighted resolutions. The algorithm 1300 could use the learned information to prioritize resolutions for presentation to the agent and/or end user.

Figure 14:
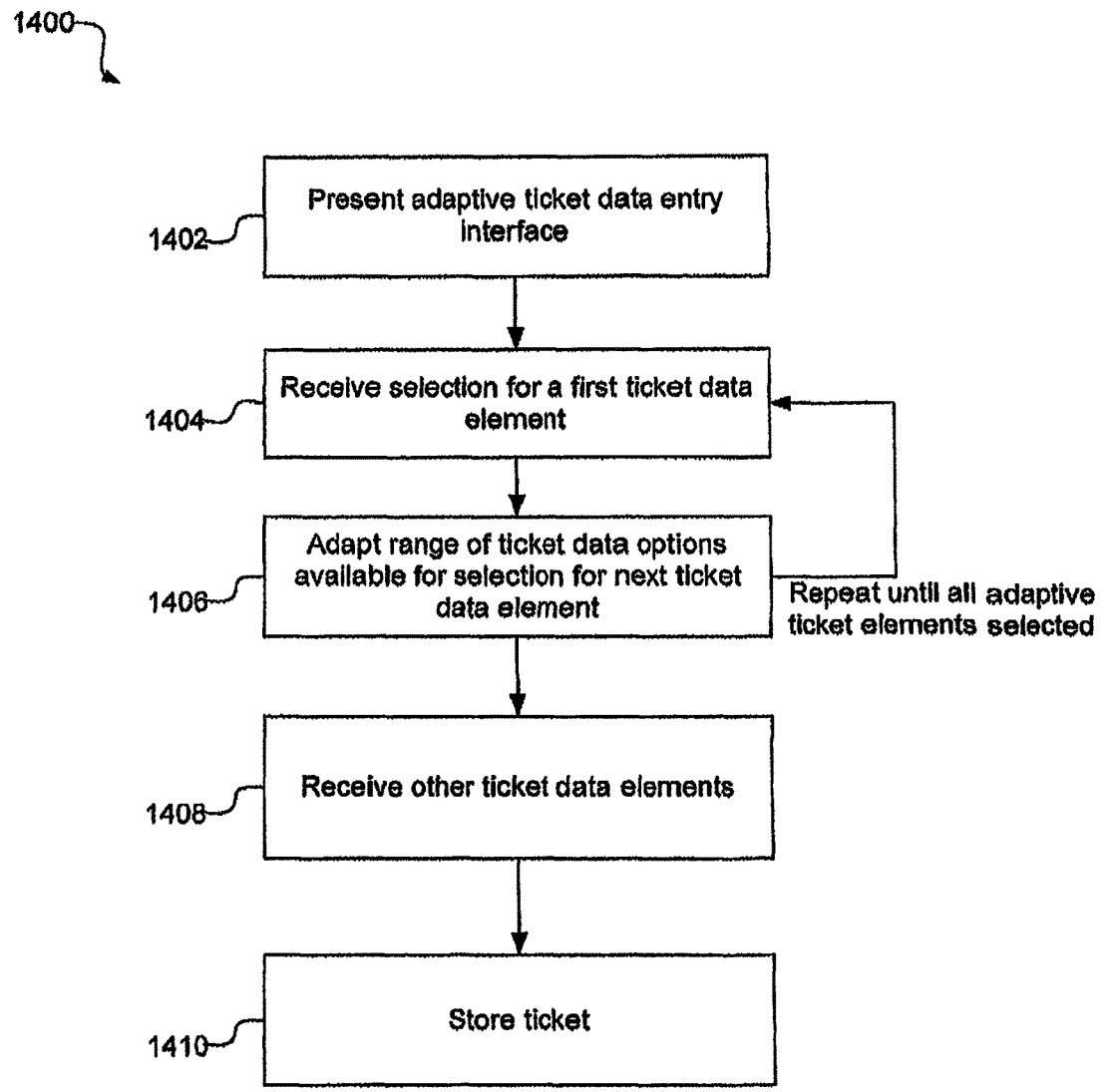
FIG. 14 is a flowchart illustrating an algorithm for adaptively generating a problem report ticket.

FIG. 14 is a flowchart illustrating an adaptive problem report ticket generation algorithm 1400. The algorithm 1400 may be performed in conjunction with an adaptive ticket data entry user interface, such as the interface shown in FIGS. 32-34. In general a problem report ticket include one or more ticket data elements, and ticket data available to enter into one or more of the ticket data elements may depend on ticket data entered into another ticket data element.

In a presenting operation 1402 an adaptive ticket data entry interface is presented. In a receiving operation 1404, ticket data is entered for a ticket data element. In one embodiment, the ticket data is selected from a range of possible options. In an adapting operation 1406, a range of ticket data available for entry into another ticket data element is adapted based on the selection made for an earlier ticket data element.

The receiving operation 1404 and adapting operation 1406 repeat until the adaptive ticket elements have been entered. A receiving operation 1408 receives other "nonadaptive" ticket data. Nonadaptive ticket data may include ticket status or problem description. In a storing operation 1410, the generated problem report ticket is stored, and is preferably made available for later use and review.

Figure 15:
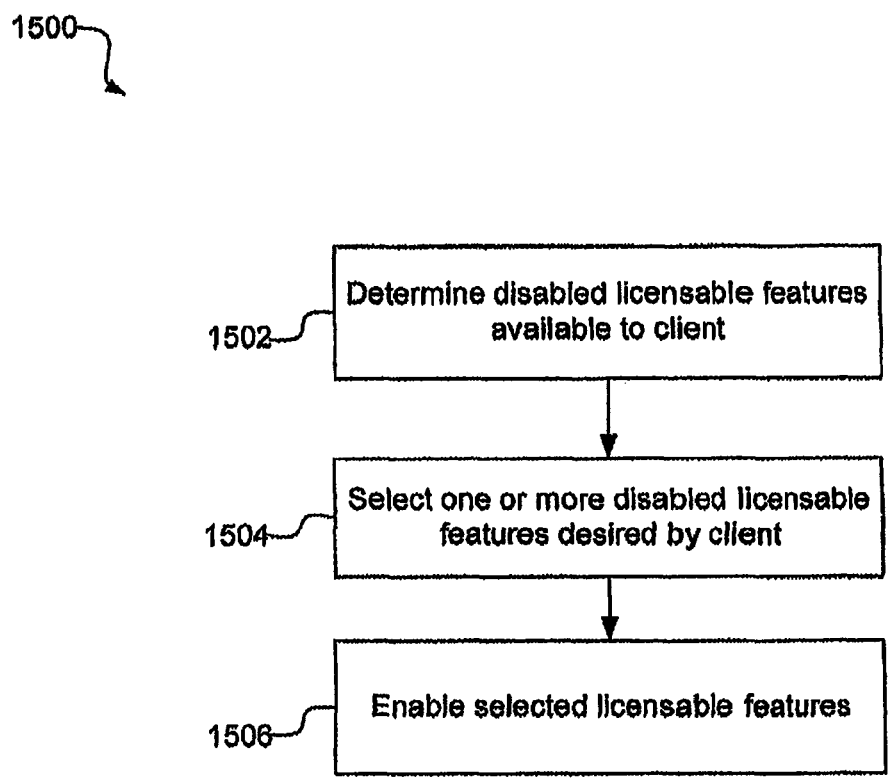
FIG. 15 is a flowchart illustrating an algorithm for monetizing features of a client application.

FIG. 15 is a flowchart illustrating a monetization algorithm 1500 whereby additional features (e.g., functionality) can be sold or licensed to the end user. In one embodiment, a client application resident on the end user system includes one or more disabled features, which can be enabled if the end user pays for them. In some embodiments, a technical support agent can determine the additional features, encourage the user to purchase or license a feature and cause the purchased or licensed feature to be enabled on the end user system. This is an opportunity for an agent to "upsell" additional products or services to end users. An exemplary user interface for the monetizing process is shown in FIG. 30 and discussed below.

In a determining operation 1502, disabled licensable features of the end user's system are determined. The determining operation 1502 may involve the client application on the end user system notifying an agent application or knowledge base what disabled licensable features are available. A selecting operation 1504 chooses one or more features from the disabled licensable features for activation. The selection may depend on particular problem or recurring problem being reported by an end user.

Monetizing or upselling can play a roll in the selection process. For example, a given feature may be on a reduced price and the end user can be notified of the reduced price from the client application or a technical support agent. In addition, a technical support agent may have discretion to adjust the license fee for one or more of the licensable features. Also, features could be bundled, whereby the license fee is greater to license all the bundled features separately, than if the end user were to license all the features in the bundle. Also, individual pieces of content and content types can be sold and delivered through the client application. In addition, premium products and services can be marketed to the end user through the application.

An enabling operation 1506 enables the selected licensable features. An embodiment of the enabling operation 1506 involves a technical support agent sending an activation command to a client application. Another embodiment involves the client application informing the end user of a password or key to enable the feature(s). In yet another embodiment, the technical agent could activate the feature(s) through a remote control of the end user's system.

Example User Interfaces

Figure 16:
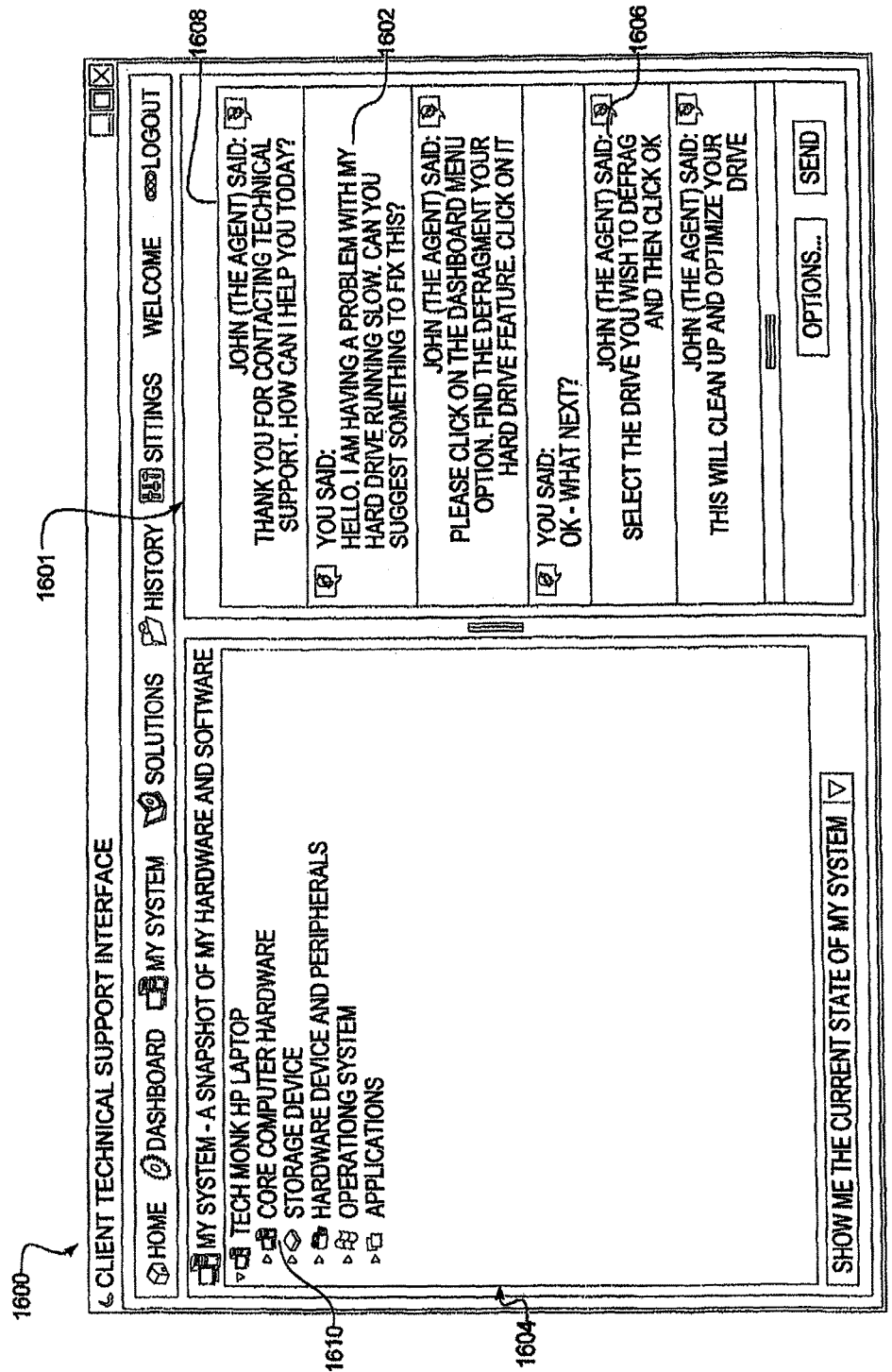
FIGS. 16-28 illustrate exemplary graphical user interfaces that may be presented by a client application for use by a customer.

FIG. 16 is a snapshot of an integrated user interface including a chat region 1601 and a user region 1604. The chat region 1601 provides a chat interface through which a customer can interact with an agent during a technical support session. Through the integrated user interface 1600 the user can chat with a technical support agent while viewing selected information in the user region 1604. The user can select from a number of possible items to view in the user region 1604.

For example, the user can select to view technical support related information in the user region 1601. Through the chat pane 1602 the customer can engage in a technical support session in the form of a chat session with a technical support agent. Chat messages from each chat user are separated into clearly delineated sections 1606 of the pane 1602, and each message is clearly identified with the person who sent the message. In the illustrated embodiment, for example, the name and role 1608 of the chatter are indicated at opposite sides of their respective delineated sections 1606. Further, in some embodiments, chat pane message sections 1606 have different background colors for different chatters to further distinguish messages from each of the chatters.

Turning to the user region 1604, a variety of browsable information can be presented therein. In the illustrated embodiment, a home page, a dashboard, system configuration information, technical solutions, a technical support history, and settings can be viewed in the user region 1604. When the user selects the system configuration button, hardware and software parameters associated with the user's computer system are presented in a tree structure 1610. By clicking on higher levels of the tree, the user can "dig deeper" into the configuration parameters. If the user selects the technical solutions button, currently available technical solutions are presented for the user to implement. These technical solutions are typically ones that were previously sent (e.g., pushed) to the user's computer by a technical agent or the technical support platform.

By selecting the history button, the user can view the history of technical solutions that have been implemented in the user region 1602. This may be particularly helpful if, for example, a technical solution is implemented and some other problem occurs; the agent and user can more easily determine the cause of the problem by viewing the history of technical solutions. Further, in many cases, technical solutions that were previously implemented can be reversed by undoing the steps of a technical solution shown in the history.

Figure 17:
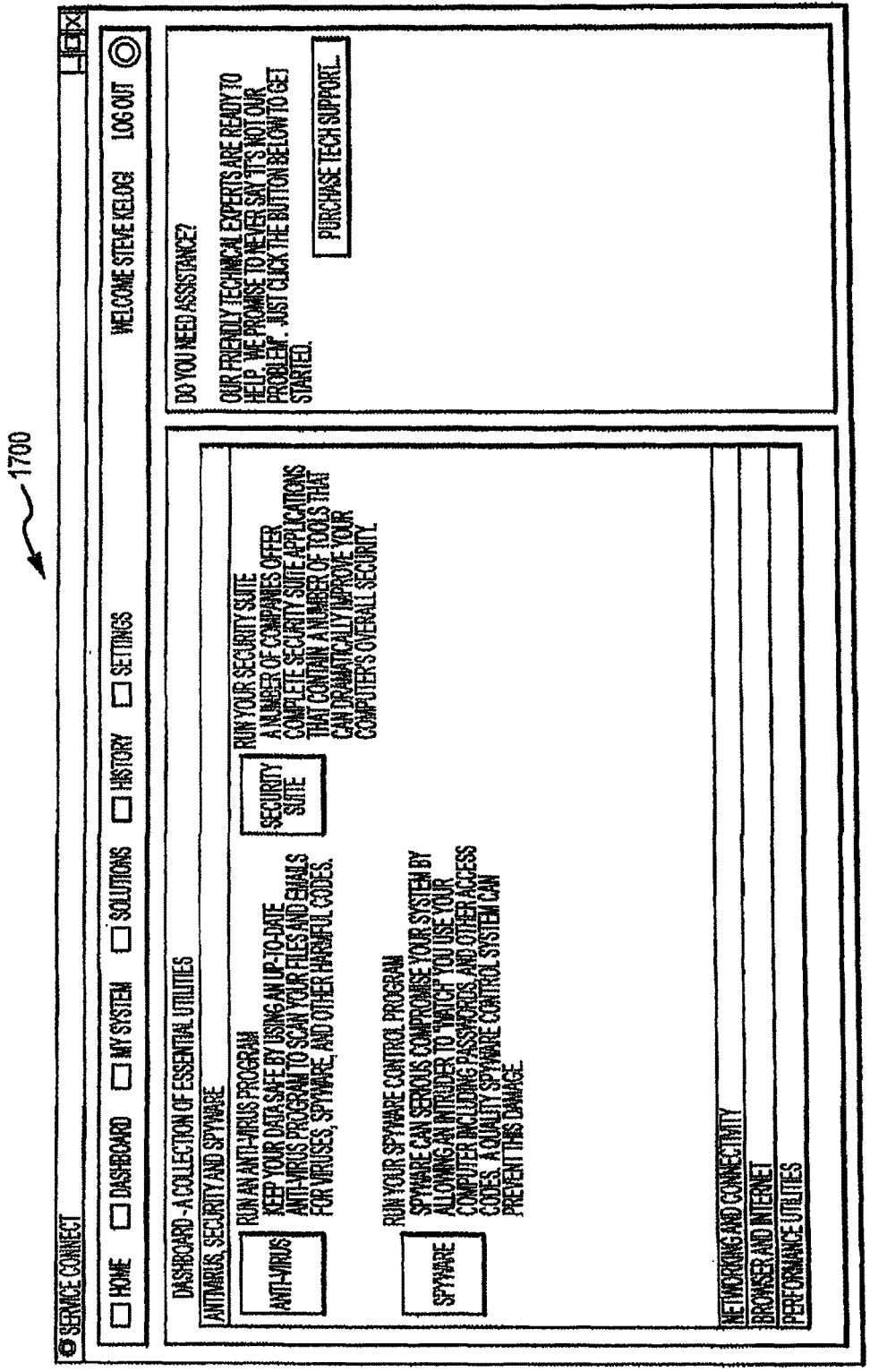

FIG. 17 is a snapshot of a Dashboard graphical user interface 1700 that may be presented by the end user client application in accordance with one embodiment. The GUI 1300 includes functionality for Anti-Virus/Security/Spyware, One Click & Automated Fixes. Via the exemplary GUI 1700, the end-user may click on any one of the options to trigger the corresponding action. For example, selecting "Run an Anti-Virus Program" causes the client application to automatically search, retrieve and launch the loaded and configured Anti-Virus program resident on the end-user computer. If the end-user computer does not have an operating version of the particular type of event driven application such as an AV program, the client application has the ability to present (e.g., pop-up) a message that is able to offer the end-user with the option to purchase and operate a working version of the relevant application type.

Figure 18:
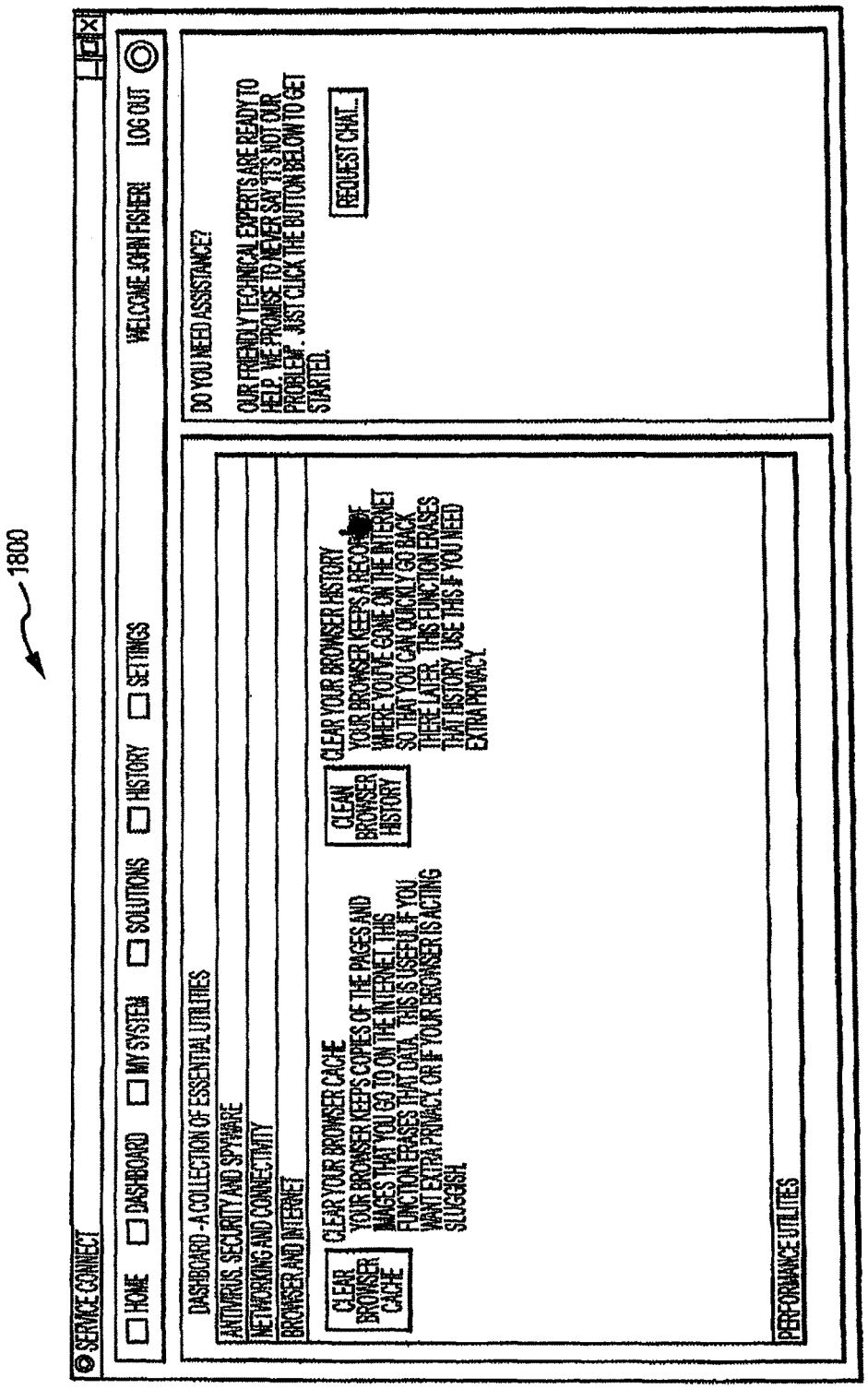

FIG. 18 illustrates another GUI 1800 presented by the end user Client Application in accordance with one embodiment. More specifically, the GUI 1800 presents another state of Dashboard providing access to Browser and Internet and/or One Click & Automated Fixes. In this exemplary embodiment and scenario, the end-user, the end-user may click on any one of the options such as "Clear your Browser History" and the client application will responsively perform a one-click fix and automatically complete all of these steps required to perform this particular solution operation.

Figure 19:
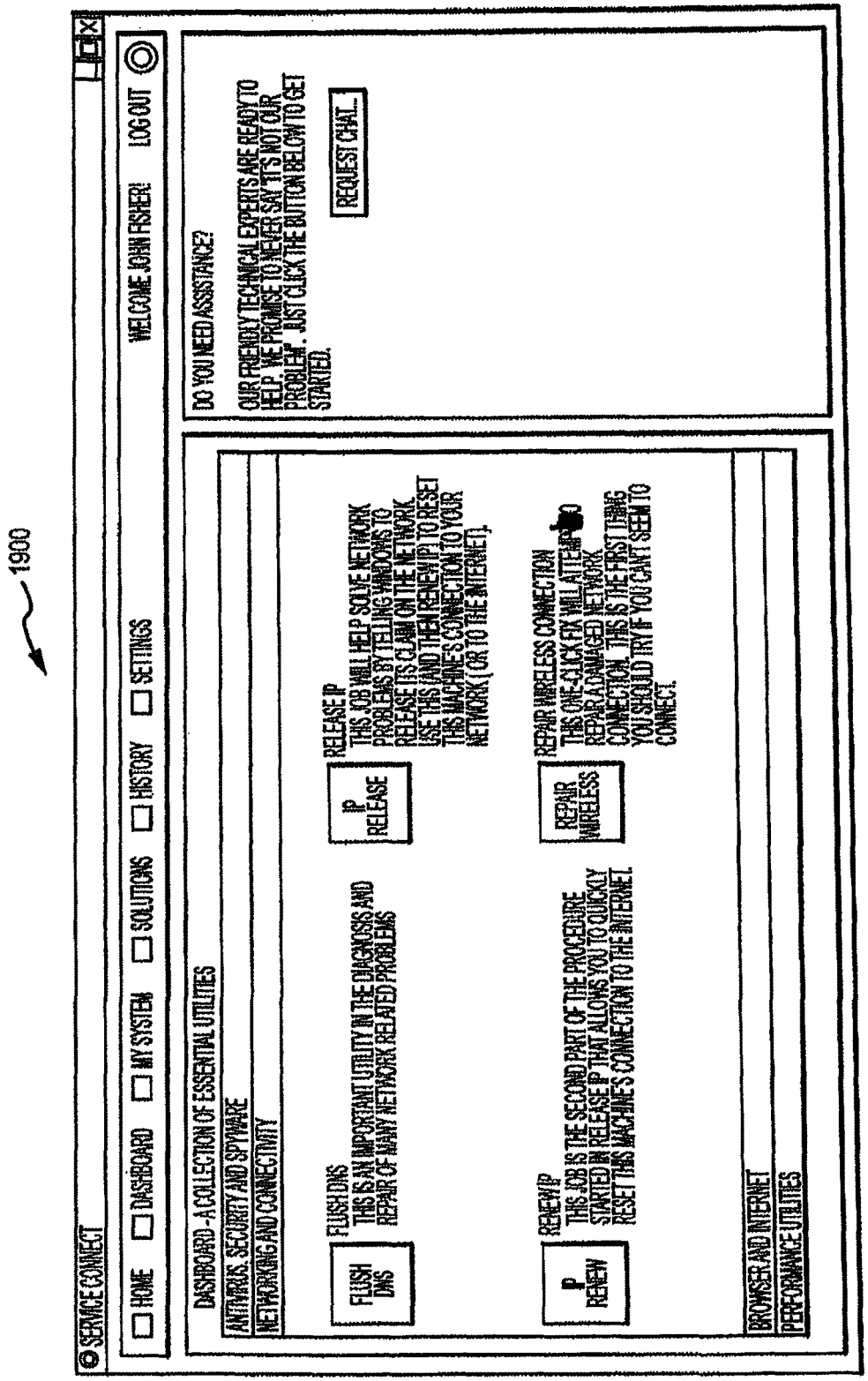

FIG. 19 illustrates another GUI 1900 that may be presented by the end user Client Application in accordance with one embodiment. In this embodiment and scenario, when the end user selects option "Repair Wireless Connection", the client application responsively performs a one-click fix and automatically completes one or more steps required to perform this particular solution operation (e.g., repair the wireless connection).

Figure 20:
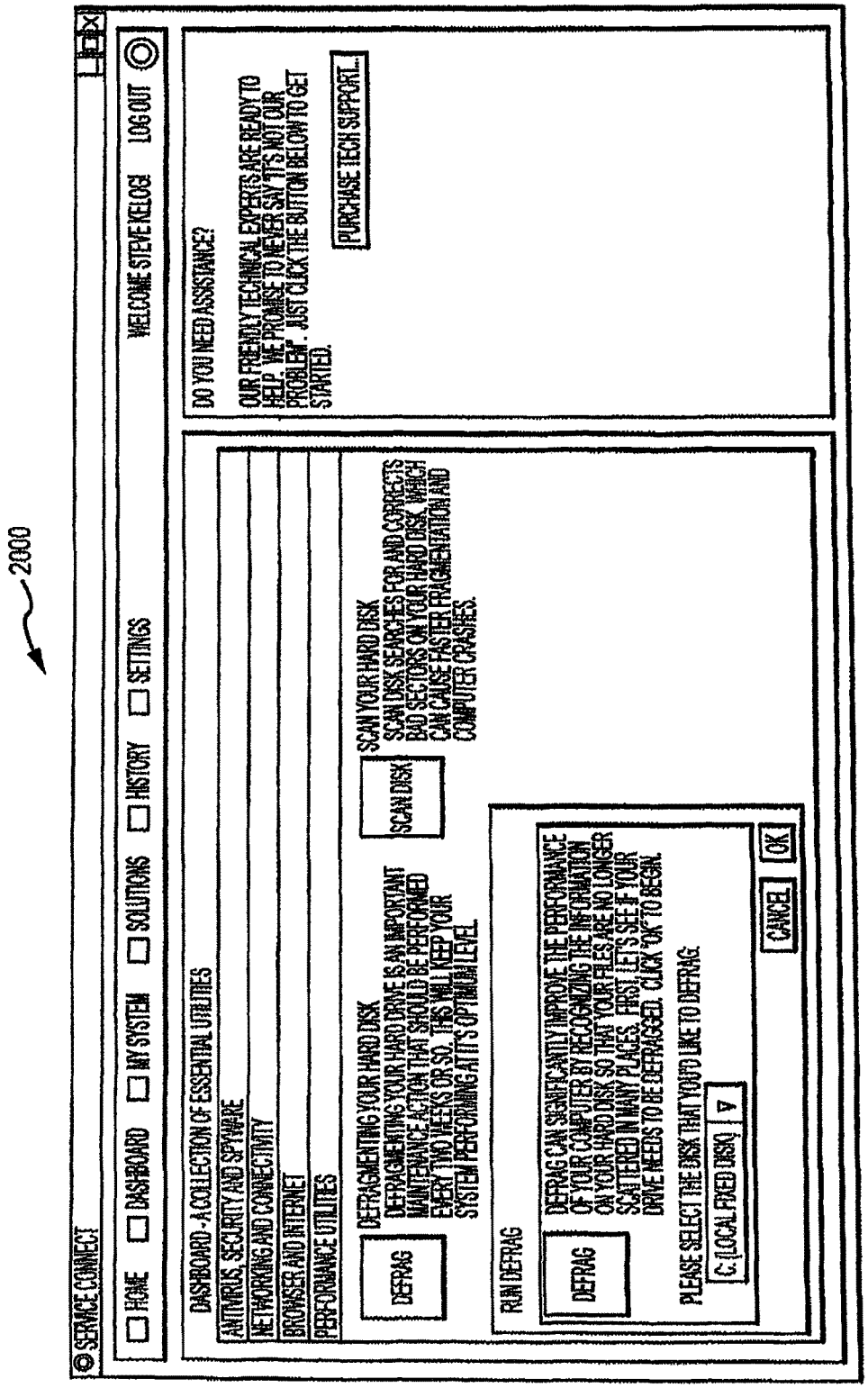

FIG. 20 is a snapshot of yet another GUI 2000 presented by the end user Client Application in accordance with one embodiment. In response to the user selecting an option such as "Defragment your Hard DiskRepair", the client application launches another applet selection window (e.g. Run Defrag) that will allow the end-user to select the appropriate hard drive to perform the automated solution (e.g., Defragment) and automatically complete all of the steps required to perform this particular service operation.

Figure 21:
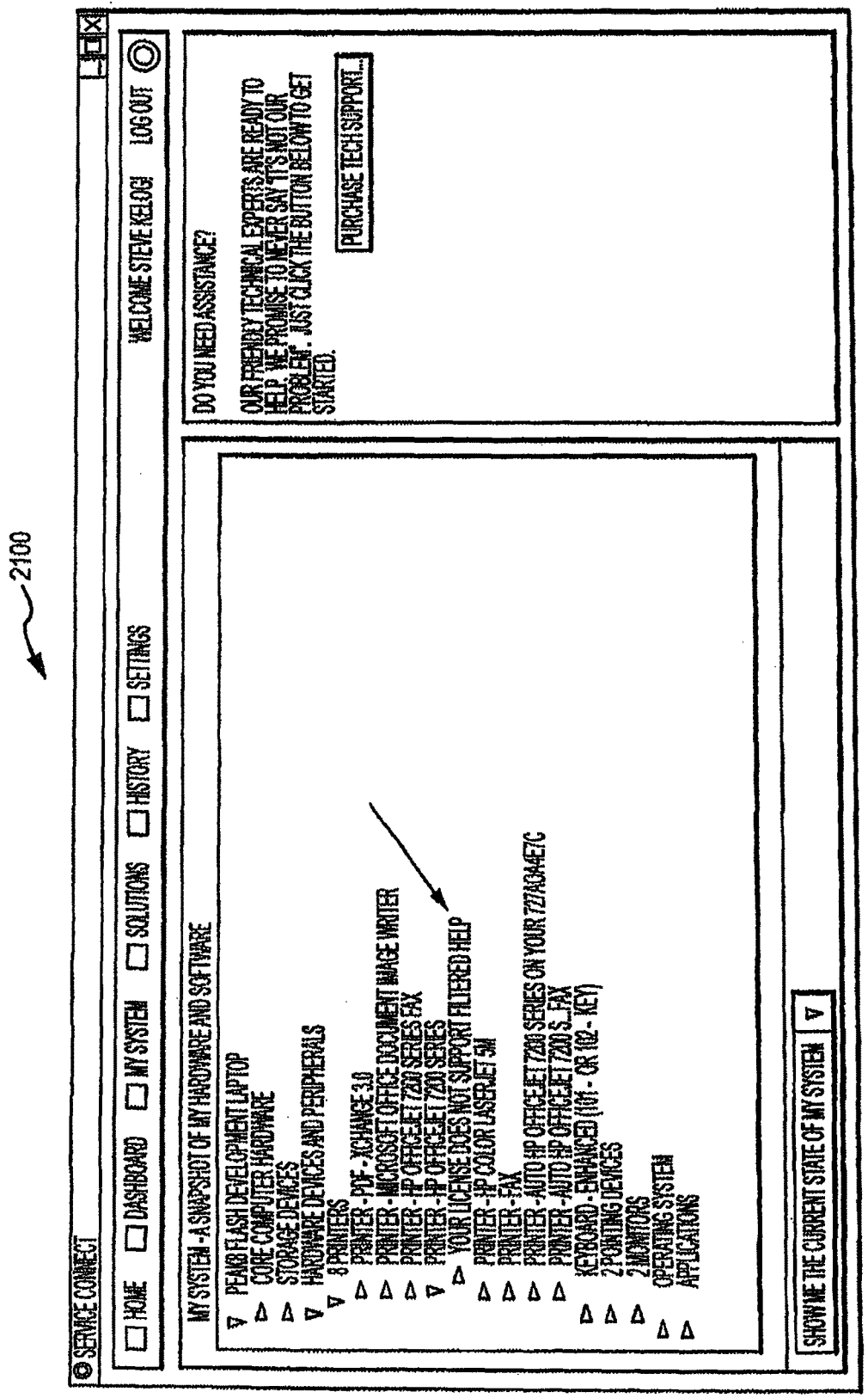

FIG. 21 is a snapshot of another GUI 2100 presented by the end user Client Application in accordance with one embodiment. In this embodiment and scenario, the end-user, via client application interface listed under the My System option, has the capability to review the CURRENT state of the user's system, which includes a complete Hardware and Software Inventory. Once the end user has reviewed the current state the end user may drill down on any item such as a specific printer (e.g. Printer—HP Office 7200 series). In this instance the end-user could have received problem and solutions sets specifically related to this model of printer that they are using on their current system. However, as the diagram shows in this particular scenario this user does not have the "Filtered Help" feature enabled as part of the user's license. The end-user is automatically prompted to obtain the necessary license to use "Filtered Help". For example, the end user is given an option to purchase a "premium" subscription of license for the client application and have this feature enabled.

Figure 22:
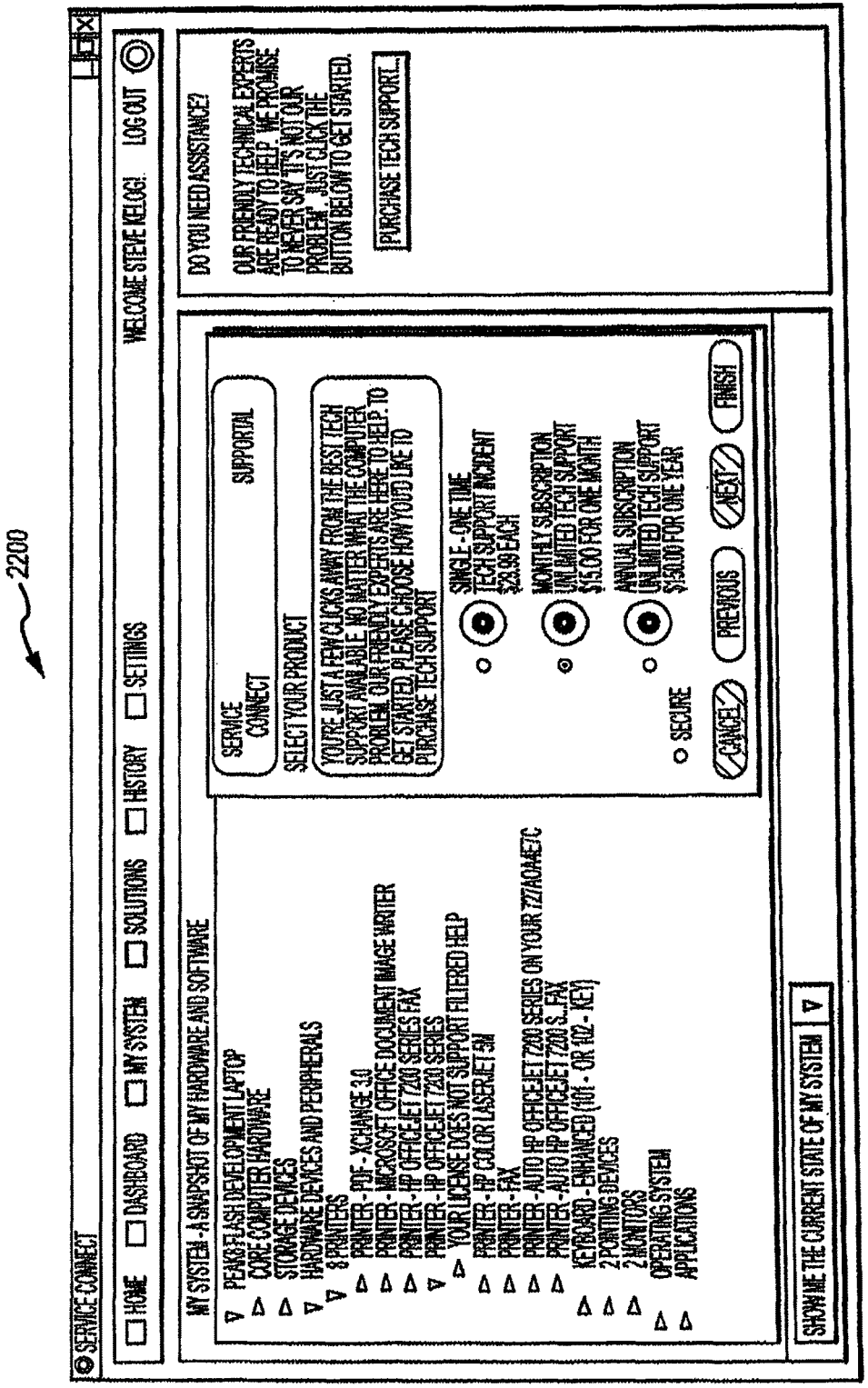

FIG. 22 is a snapshot of another GUI 2200 that can be presented by the Client Application in accordance with one embodiment. This scenario illustrates the functionality to purchase special features. For this embodiment and sample, the end-user, via client application interface, the end-user may purchase an advanced and/or premium client application license that has one or more additional features enabled for their use. The end-user may make this purchase through an embedded and full secured and encrypted E-Commerce Purchasing Module (Process) that at the completion of the purchase will automatically activate the additional features and functionality based on the enhanced subscription and/or client application license they chose to acquire.

Figure 23:
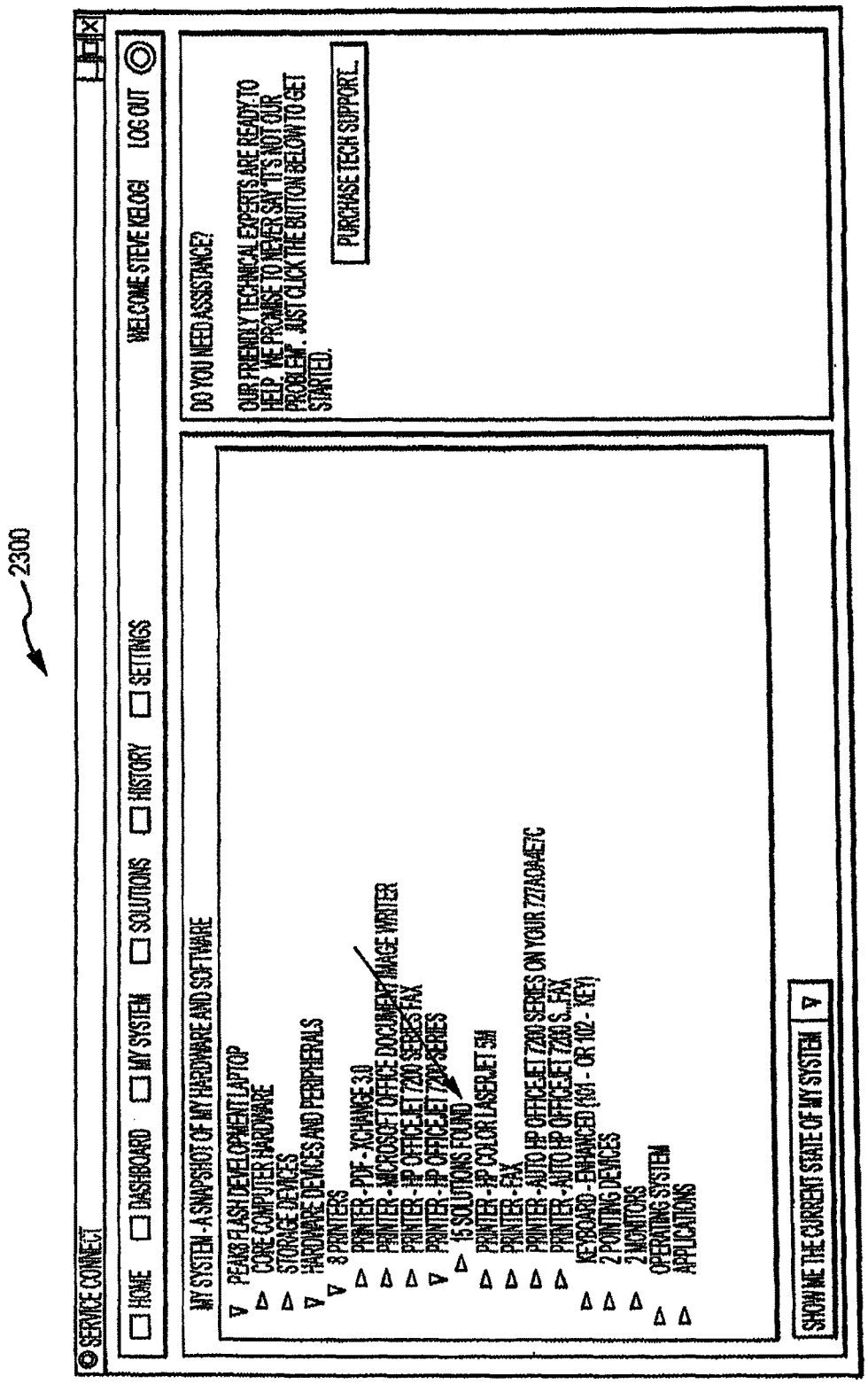

FIG. 23 is another snapshot of another GUI 2300 presented by the Client Application in accordance with one embodiment. In this scenario a feature set is activated. For this embodiment and sample, the end-user, via client application interface listed under the My System option, has the capability to review the CURRENT state of their system, which includes a complete Hardware and Software Inventory. Once they have reviewed their current state they may drill down on any item such as a specific printer (e.g. Printer—HP Office 7200 series). In this instance the end-user is able to drill down on their specific printer listed in their inventory, and they are immediately presented with the Filtered Help response, that states there are 15 Solutions to printer problems that are relevant to this make and model printer type.

Figure 24:
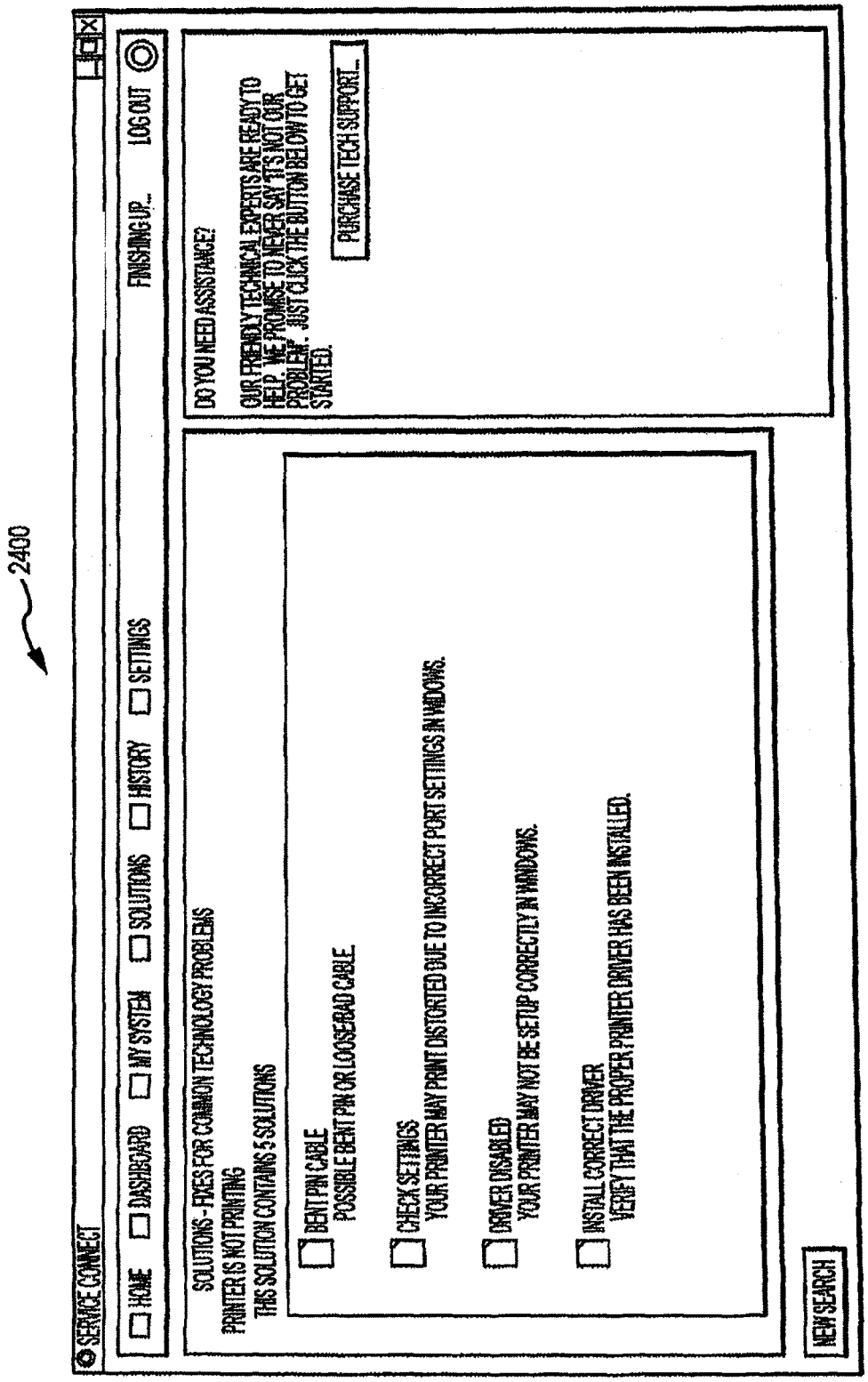

FIG. 24 illustrates yet another GUI 2400 presented by the Client Application in a particular embodiment. FIG. 20 illustrates a scenario involving Filtered Help and Drill Down Capability. For this embodiment and sample, after the end-user is presented with the number of relevant solutions sets that are available for their particular hardware and/or software (e.g. HP Printer 7200 series) problem, the end-user may drill down to the next step in the Filtered Help problem/solution discovery process and they are presented with a series of problem types. Once the end-user selects what is believed to be the problem, the client application interface presentation screen is automatically updated with a series of combined problem/solution set selectable options, In this diagram the end-user has highlighted "Bent Pin Cable". Once the end-user clicks on this selection they will activate the dynamic generation of the appropriate Filtered Help solution response for use.

Figure 25:
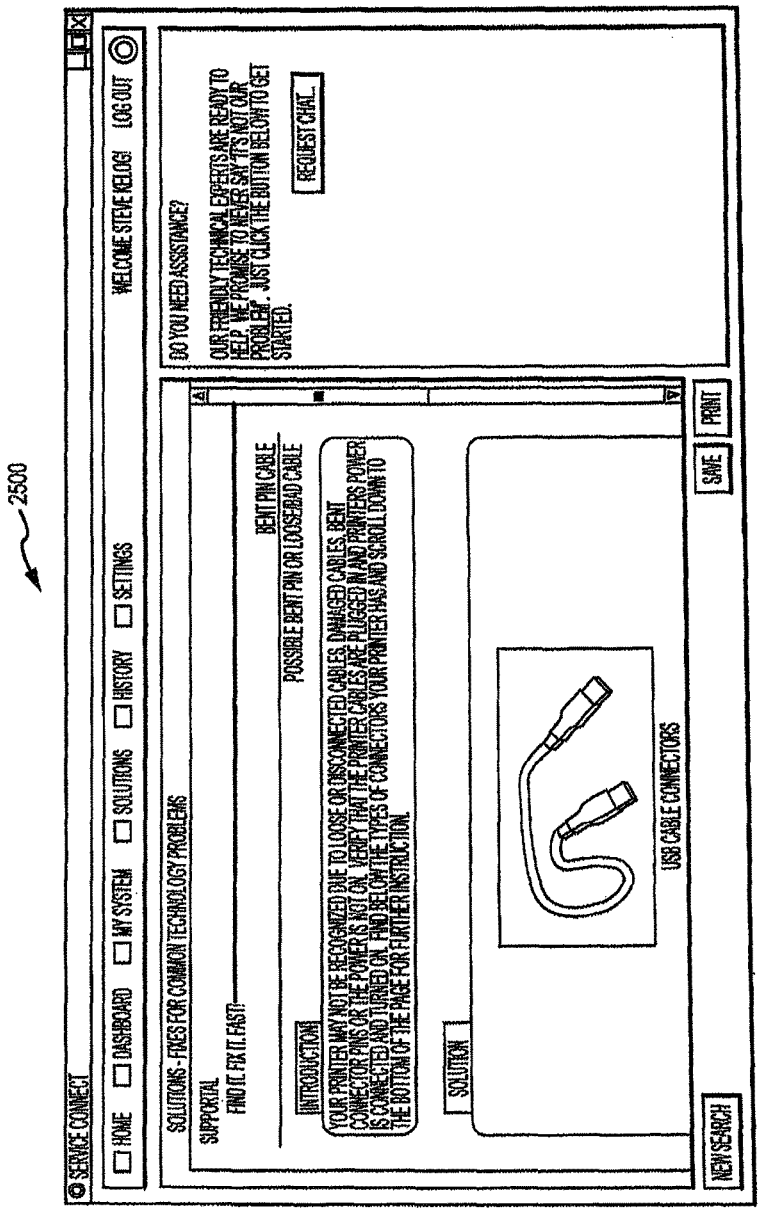

FIG. 25 is another snapshot of another GUI 2500 presented by the Client Application illustrating a scenario involving Filtered Help and Solution Presentation via Embedded Micro-Browser. For this embodiment and sample, the end-user clicks on the "Bent Pin Cable" problem/solution item and this activates the dynamic content generation Process To pull together all of the correct text, images, and structured presentation layer(s) to present a viewable and scrollable solution to the end-user for problem resolution. The dynamically generated content pulled via the Filter Help process and functionality is presented to the end-user via a operating system and browser independent "micro-browser, which is an embedded applet within the framework of the client application interfaces.

Figure 26:
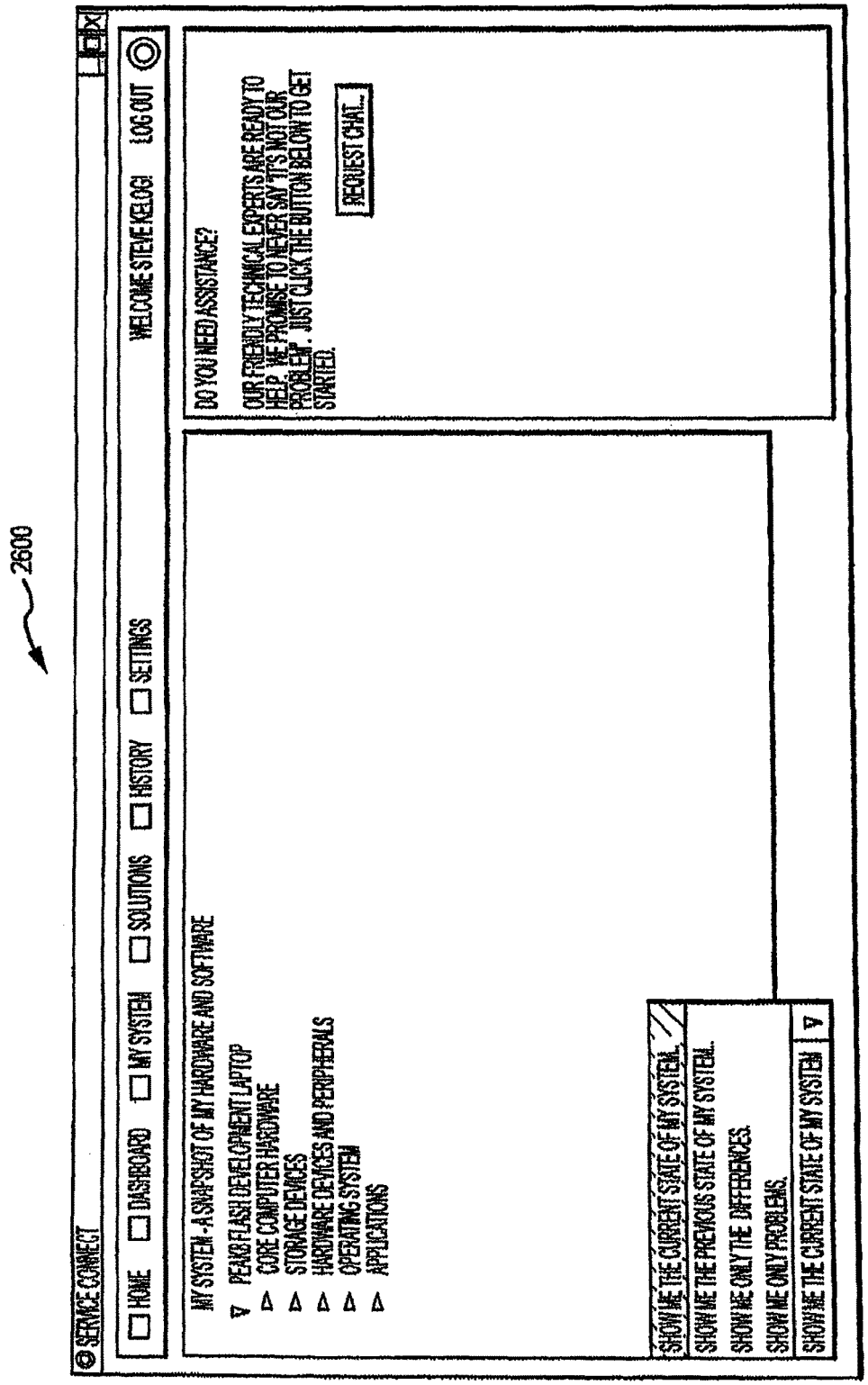

FIG. 26 is another snapshot of another GUI 2600 presented by the Client Application illustrating an inventory process showing State, Differences, Problems Selections. For this embodiment and sample, the end-user, via client application interface listed under the My System option, has the capability to review the CURRENT state of their system, which includes a complete Hardware and Software Inventory. The end-user may also view their previous state of their computer system to determine changes since last time they ran the Client Application Diagnostics and System Inventory Reporting assessment and testing components. The end-user may choose to be shown the differences in there CURRENT and PREVIOUS state via a selection option within the client application Interface, to which specific hardware and/or software changes will me immediately displayed for end-user review and usage. End-user may also click on the "Show me only PROBLEMS" selection option and they will be provided with a list of any discovered system and/or software failures, such as drivers, application and hardware device errors.

Figure 27:
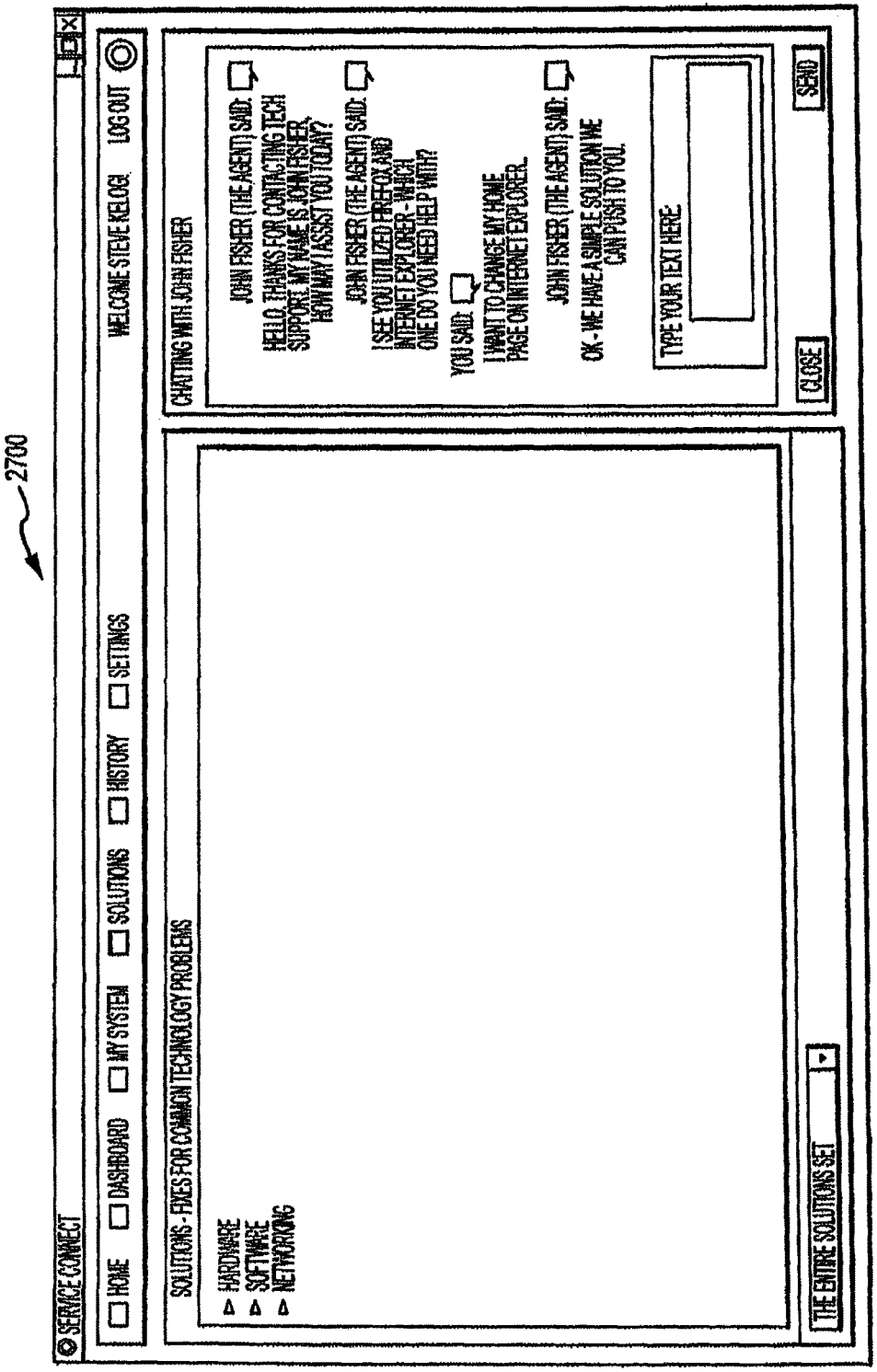

FIG. 27 is another snapshot of another GUI 2700 presented by the Client Application illustrating Drill Down & Keyword Search Help. For this embodiment and sample, the end-user, via client application interface listed under the Solution section, the end-user may choose to either drill down and search solutions relevant to a specific problem or the end-user may request a chat communication with a technical support agent (e.g. end-user is chatting with the agent) who is capable of assisting in the diagnosing and resolving of the specific problem communicated by the end-user. This agent has the capability to push a solution or series of solutions (solutions sets) to the end-user for them to utilize to resolve the specific issue or set of issues identified.

Figure 28:
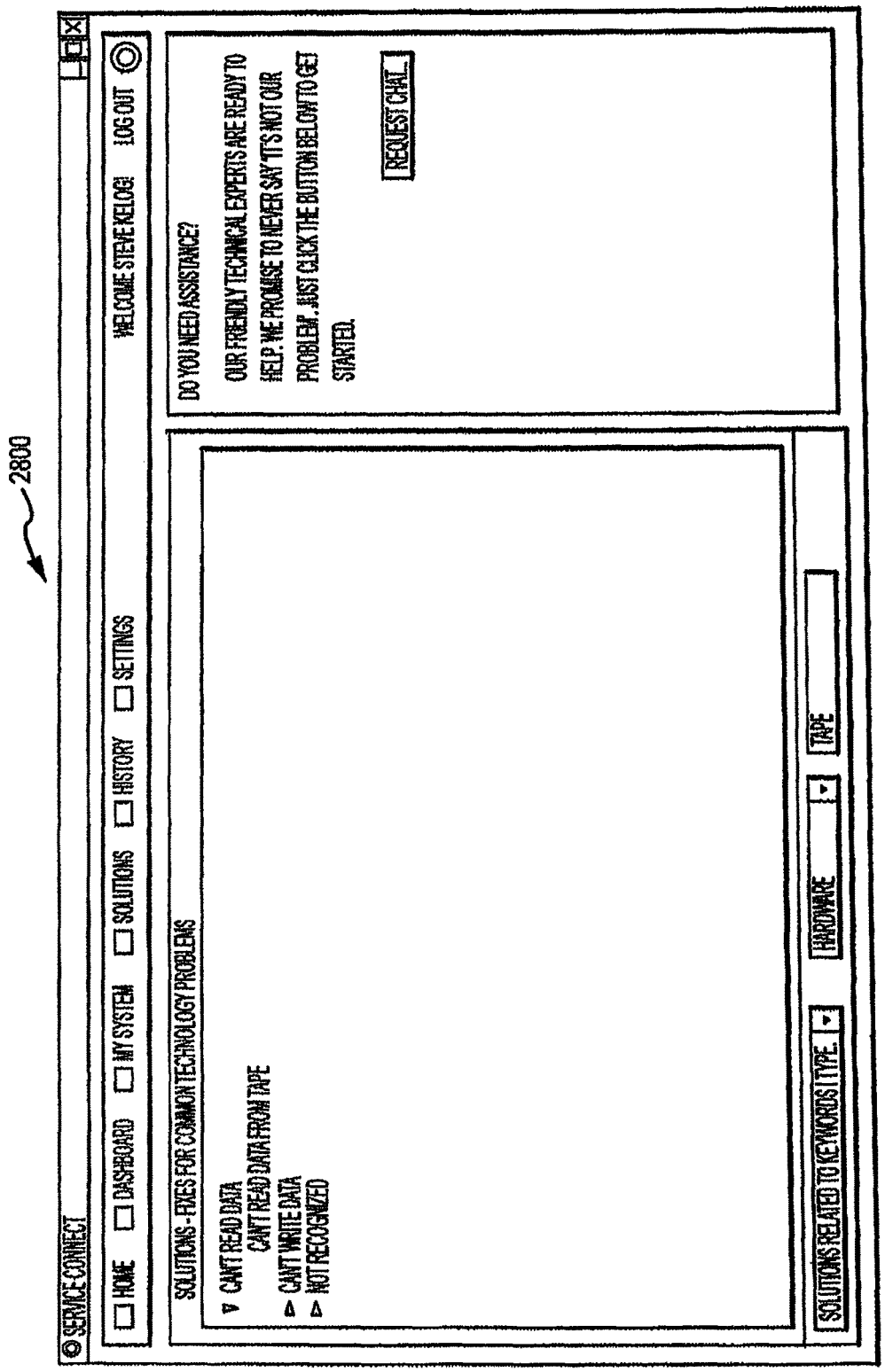

FIG. 28 is another snapshot of another GUI 2800 presented by the Client Application involving Keyword Search Help. For this embodiment and sample, the end-user, via client application interface listed under the Solution section, the end-user may choose to search the Knowledge Base System utilizing and intelligent keyword search approach. In this diagram the end-user has selected that his issue is hardware related, and then typed in "tape" into the search field. As quickly as the search field is populated the client application, communicating via the service oriented architecture communications layer, accesses the forward looking search capabilities of the KB System and presents a list of known problem type issue relevant to the tape drives. At this point the end-user may select the problem set most relevant to them and the KB System will report back a series of likely match solutions and/or solutions sets. Once the user finds the most appropriate solutions and/or solutions sets they may activate them by clicking on them. At this point solutions are presented via the micro-browser for immediate review, use and application against the identified problem(s).

Figure 29:
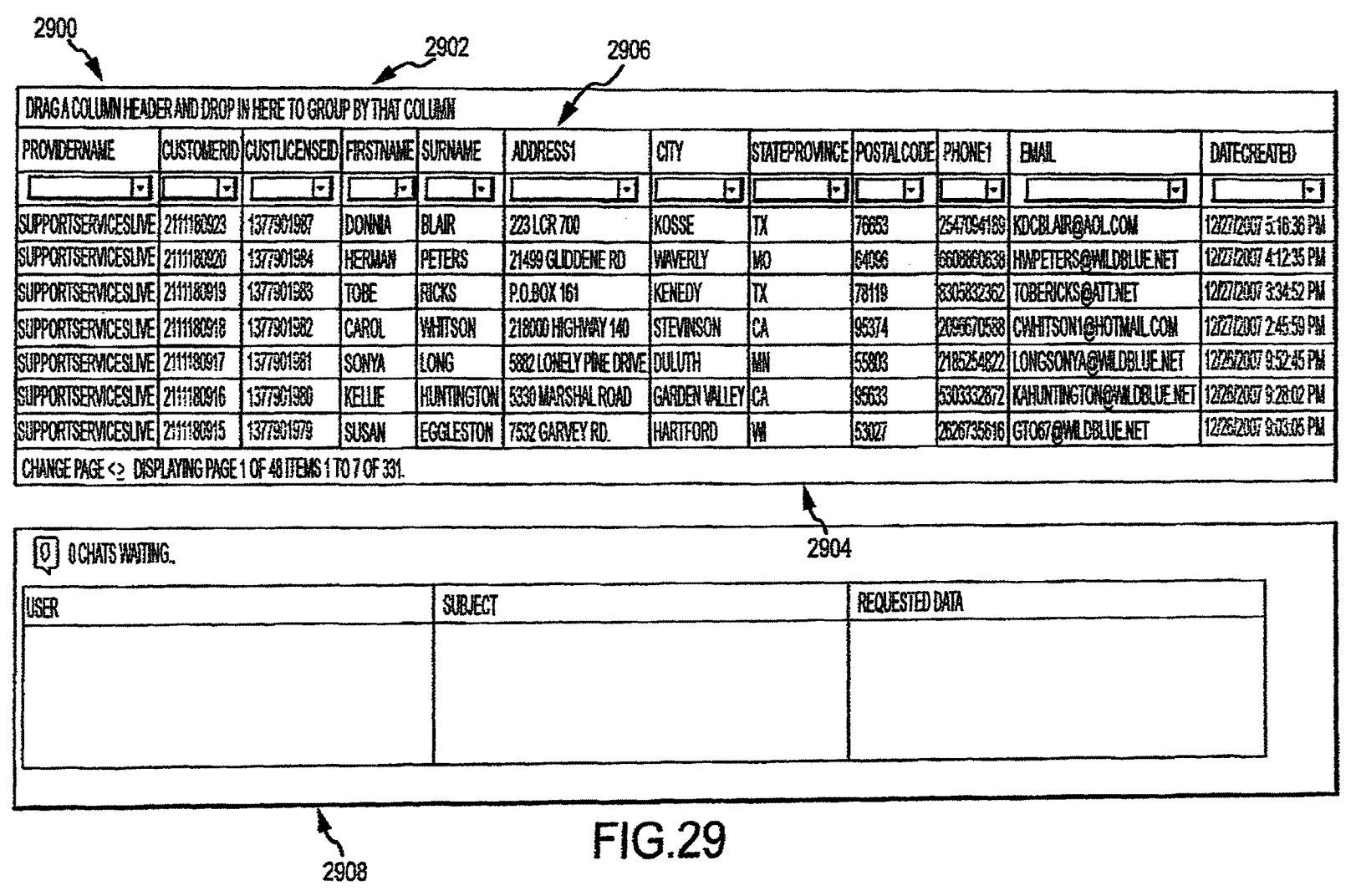

FIG. 29 illustrates an example technical support agent graphical user interface 2900 for viewing customer identification information and selecting a customer to interact with. The interface 2900 includes a table 2902 that has a number of rows 2904 and columns 2906. Each row 2904 is associated and labeled with a customer name. Each column 2906 includes information (e.g., customer ID, license ID, service provider name, etc.) associated with the customers. The selection interface 2900 is based on HTML, XML or some other markup language document, which the agent's Internet browser can read. The associated markup language document may include dynamic configuration portions that enable the agent to dynamically configure the appearance of portions of the interface 2900.

For example, in this embodiment, the table 2902 is configurable, whereby the agent can "grab" (e.g., using a mouse or other pointing device) a column and move the column to another position. Grabbing may be performed for example, by clicking on a column header and dragging the column to another location in the table 2902. For example, the agent may grab the column labeled "Surname" and drag the column to another table position, such as the far left. The markup language document and presentation layer can be dynamically configured for the user via various technologies, such as, but without limitation, AJAX technology.

The selection interface 2902 also includes a chat indicator portion 2908 indicating whether a chat session is waiting. The chat indicator portion 2908 can show the agent if one or more customers have requested a chat. The chat indicator portion 2908 can also allow the agent to select, and thereby accept, one of the requested chat requests, for example by clicking on the indicated chat request. Upon selection of the chat request, a chat interface is presented to the agent.

FIG. 30 illustrates an example monetization agent user interface 3000 that enables a technical support agent to view licensable client features that can be enabled, and enable desired client features. In this embodiment, the monetization user interface 3000 includes a table 3002 composed of one or more rows 3004 and a number of columns 3006. Each row 3004 corresponds to a feature on a given client application that is disabled, but could be enabled. Each row 3004 includes a graphical selection element, such as a button 3008 (labeled "Activate Feature"), which can be selected to enable the corresponding feature.

For example, one row 3010 in FIG. 30 is labeled "SC.FIL-TEREDHELP". The technical support agent can select the corresponding button 3012 to enable the feature "filtered help" on the client application. In one embodiment, upon selection of the button 3012, a command is sent to the client application, instructing the client application to turn on the filtered help feature. In another embodiment, upon selection of the button 3012, a password or other enabling information is sent to the end user of the client application, whereby the end user can input the enabling information to enable the filtered help feature. Other information can be provided for disabled features, such as feature ID, expiration date, license product ID and activation status.

FIG. 31 illustrates a technical support agent user interface 3100 through which a technical support agent can perform numerous activities, including, but not limited to, generate a problem report ticket, review and update problem report tickets, engage in chat with a customer, build a problem solution, obtain or view Internet-based or knowledge-base resources (e.g., hyperlinks) in support of a problem solution, and send a problem resolution to a customer. This embodiment of the technical support agent user interface 3100 includes a problem report ticket management user interface 3102 and a problem solution development interface 3104.

The problem report ticket management user interface 3102 is adaptive. More specifically, the interface 3102 allows for adaptive ticket data entry. Adaptive ticket data entry involves adapting a range of ticket data input options based on a prior entered ticket data. For example, based on the customer identification entered in a customer ID tab 3106, ticket data presented or made available in a ticket data entry tab 3108 will be adapted to correspond to the entered customer. Adaptive ticket data entry is discussed further below with regard to FIGS. 32-34, where an example adaptive ticket generation scenario is presented.

Continuing with the ticket management user interface 3102, other tabs include an inventory tab 3110 in which the agent can view system inventory of the customer's system, a notes tab 3112 where the agent can view and take notes, and a history tab 3114 where the agent can view a history of a problem incident, including problem resolution attempts.

Also included in the ticket management user interface 3102 is a monetization selector, such as the button 3116 labeled "License Products". If the agent selects the monetization selector 3116, the monetization user interface 3000 (FIG. 30) is presented. The interface 3102 also has a licensed product selector 3117, whereby the agent can select a particular product that is licensed to the identified customer. Using the licensed product selector 3117 (in this case a drop down list), the agent can view or generate one or more problem report tickets associated with the selected licensed product and the identified customer.

The problem solution development interface 3104 includes a number of tabs, such as a chat tab 3118, a knowledge base (KB) tab 3120, a client KB push tab 3122, a problem solution (PS) builder tab 3124 and a support links tab 3126.

Figure 32:
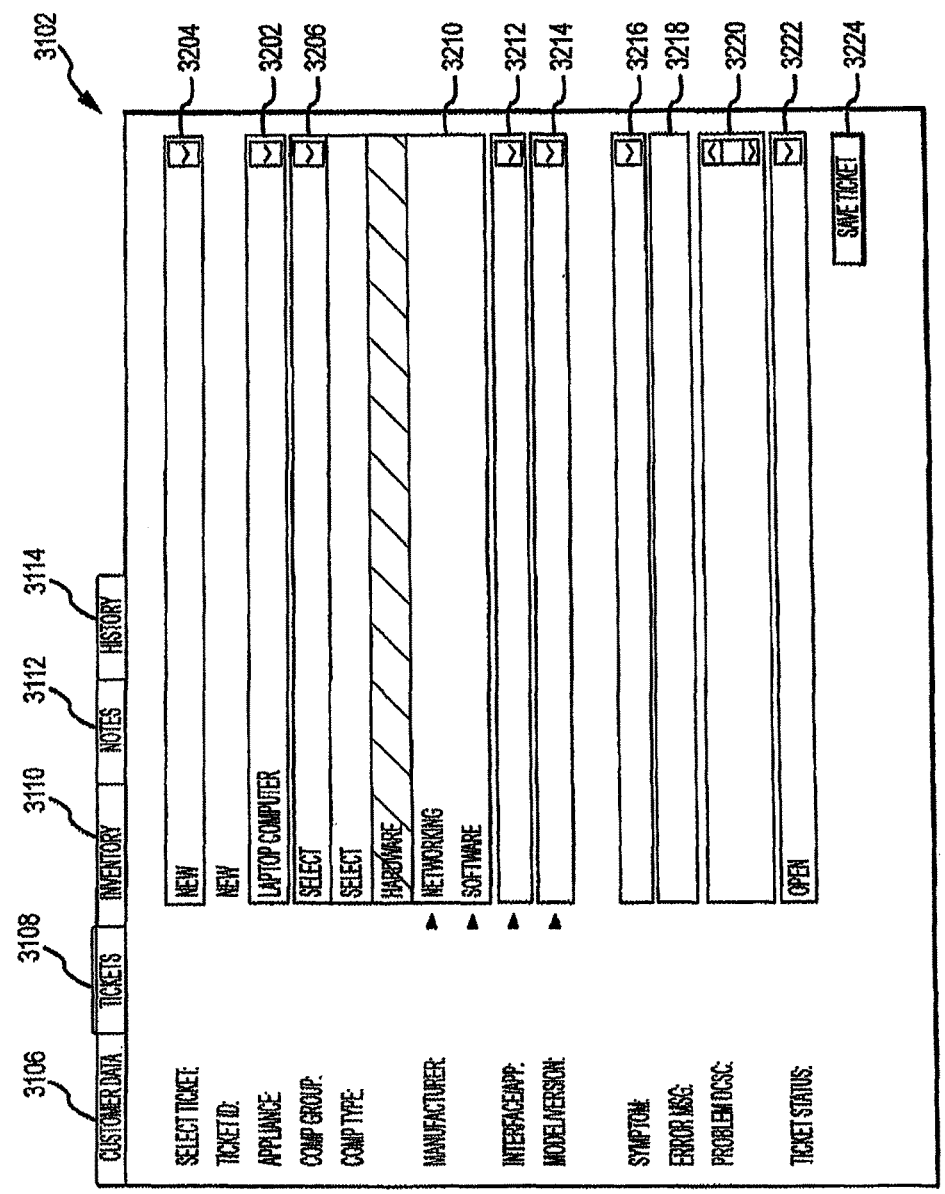
Figure 33:
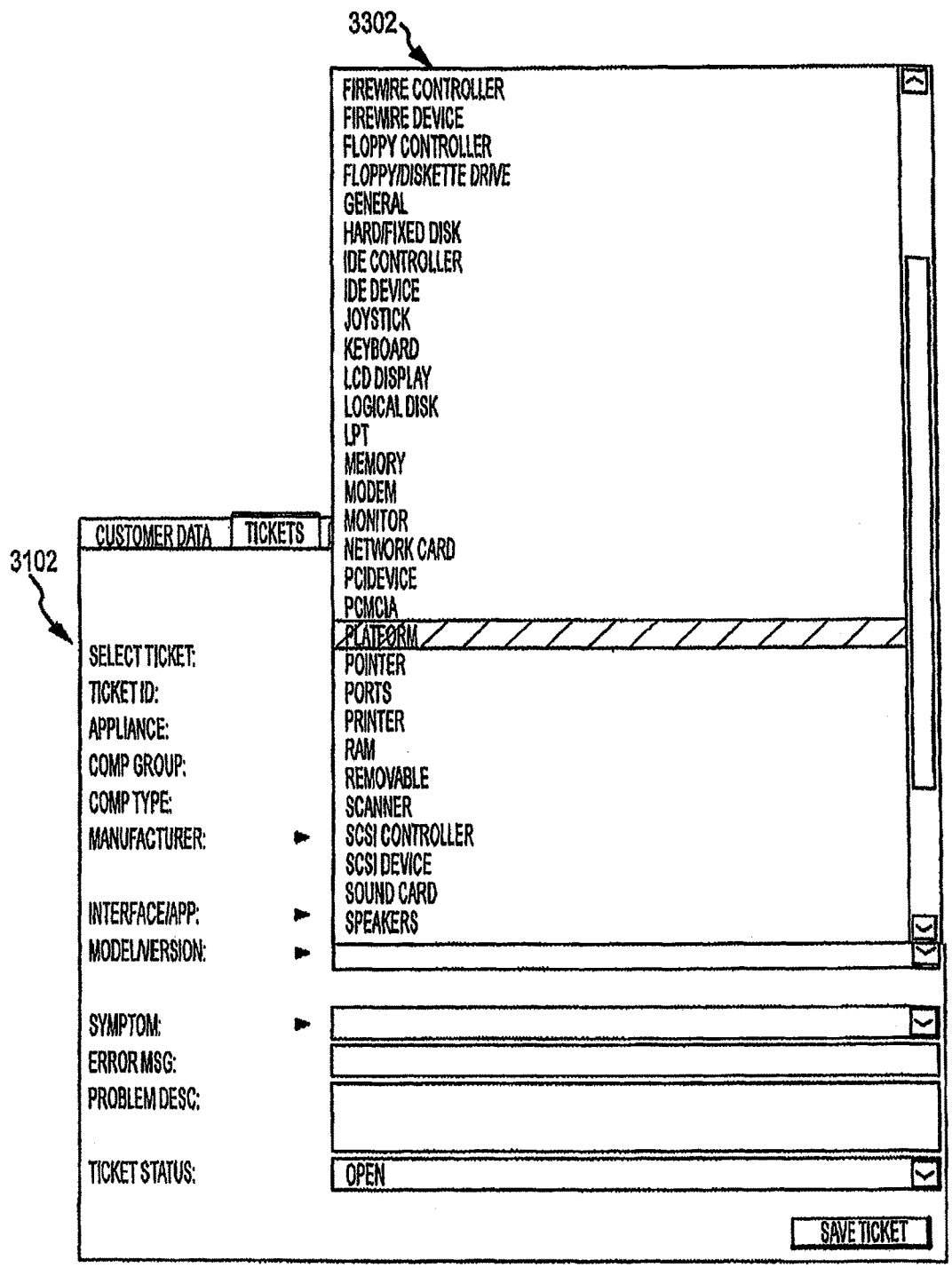

FIG. 32 illustrates the ticket management user interface 3102 when the ticket tab 3108 is selected. The agent can enter and/or view ticket data in the ticket tab 3108. As such, the agent can build a new problem report ticket or view and update an existing problem report ticket. In general a problem report ticket includes a number of ticket data elements. These ticket data elements are populated through the entry fields shown in the ticket tab. For example, an appliance entry field 3202 is used to choose an appliance that the ticket relates to.

A ticket is selected through a ticket selector 3204. Ticket data entry fields include the appliance entry field 3202, component group entry field 3206, component type entry field (hidden by component group drop down list 3210), manufacturer entry field (hidden by component group drop down list 3210), interface/application entry field 3212, model/version entry field 3214, symptom entry field 3216, error message entry field 3218, problem description entry field 3220, and ticket status entry field 3222. In the illustrated embodiment, the data entry fields are implemented with drop down lists, whereby the agent can select a drop down arrow of the data entry field and select from a range of available ticket data options. For example, component group drop down list 3210 lists high-level component groups that a problem pertains to, such as hardware, network and software.

The ticket tab 3108 is referred to as an adaptive ticket data entry interface because entry of data in one ticket field causes the range of available data entry options to change in one or more other ticket fields. The ticket data available to populate some ticket data elements are dependent on the ticket data entered in to one or more other ticket data elements. For example, in a given scenario, the component group "hardware" may be selected from the component group drop down list 3210. When hardware is selected, a range of hardware components is available via the component type drop down list 3302, shown in FIG. 33. Examples of hardware are LCD display, network card, RMA, scanner, and others.

If, on the other hand, the component group that is selected from the component group drop down list 3210 is "software", a different range of ticket data is available via the component type entry field. When the component type drop down arrow is selected this time, a component type drop down list 3402 (FIG. 34) is presented. The component type drop down list 3402 includes a list of software component types, such as antivirus, browser, and email. As such, the available component type data is adapted, depending on the component group that is selected. After the ticket data elements are specified, the ticket can be saved by selecting the "save ticket" button 3224.

Exemplary Computing Device

Figure 35:
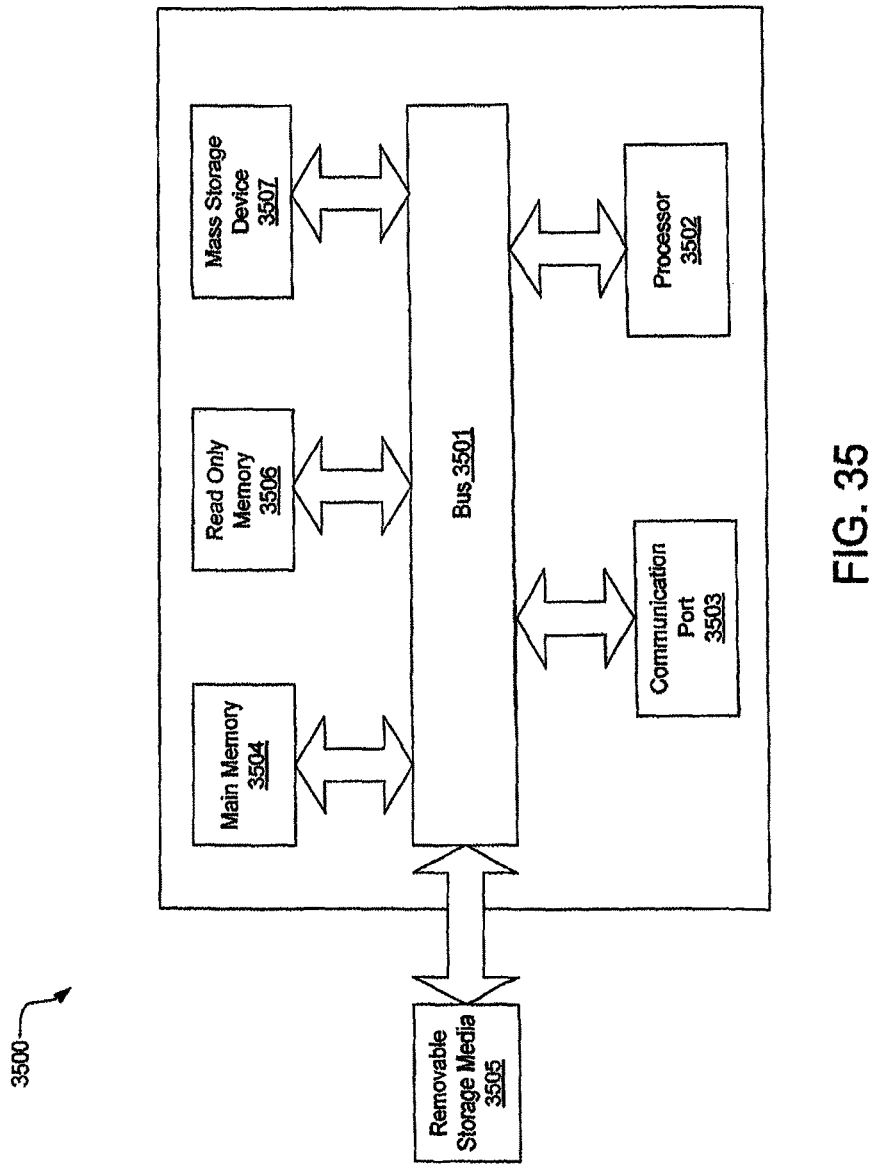
FIG. 35 depicts a general purpose computing device upon which a technical support and services platform, or portions thereof, may be implemented, accessed, and/or executed.

FIG. 35 depicts a general computing device upon which a technical support delivery platform or portions thereof, may be implemented, accessed, and/or executed. The components computing device 3500 are illustrative of components that client and server computers typically include. As such, the embodiments of the client application described herein can be implemented on the computing device 3500. In any particular implementation, more or fewer than those components shown may exist. In addition, components shown may be combined or rearranged in any particular implementation, without departing from the scope of the present invention.

As discussed herein, embodiments of the present invention include various steps. A variety of these steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

According to the present example, the computing device 3500 includes a bus 3501, at least one processor 3502, at least one communication port 3503, a main memory 3504, a removable storage media 3505 a read only memory 3506, and a mass storage 3507. Processor(s) 3502 can be any know processor, such as, but not limited to, an Intel® Itanium® or Itanium 2® processor(s), or AMD Opteron® or Athlon MP® processor(s), or Motorola® lines of processors. Communication port(s) 3503 can be any of an RS-232 port for use with a modem based dialup connection, a 10/100 Ethernet port, a Gigabit port using copper or fiber, or a Universal Serial Bus (USB) port. Communication port(s) 3503 may be chosen depending on a network such as a Local Area Network (LAN), Wide Area Network (WAN), or any network to which the computing device 3500 connects. The computing device 3500 may be in communication with peripheral devices (not shown) such as, but not limited to, printers, speakers, cameras, microphones, or scanners.

Main memory 3504 can be Random Access Memory (RAM), or any other dynamic storage device(s) commonly known in the art. Read only memory 3506 can be any static storage device(s) such as Programmable Read Only Memory (PROM) chips for storing static information such as instructions for processor 3502. Mass storage 3507 can be used to store information and instructions. For example, hard disks such as the Adaptec® family of SCSI drives, an optical disc, an array of disks such as RAID, such as the Adaptec family of RAID drives, or any other mass storage devices may be used.

Bus 3501 communicatively couples processor(s) 3502 with the other memory, storage and communication blocks. Bus 3501 can be a PCI/PCI-X, SCSI, or USB based system bus (or other) depending on the storage devices used. Removable storage media 3505 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

The functional modules, systems, operations, and data structures discussed herein are capable of combination, separation, or any other type of rearrangement without departing from the spirit scope of the invention. For example, the data structures illustrated in the technical support platform 300 of FIG. 300 may each comprise one or more databases, or, in some cases, multiple data stores may be physically implemented in the same database. Data stored in the data stores can be implemented in any format as may be suitable for the particular implementation including, but not limited to, extensible markup language (XML), extensible stylesheet language (XSL), and extensible hypertext markup language (XHTML) as entries in a relational database, flat files, object-oriented, or a proprietary format. Inclusive of these data storage formats is the use of extensible stylesheet language transformation (XSLT) for purposes of defining structured input and outputs from the various data stores.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

The invention claimed is:

1. An apparatus comprising:
a device platform that includes at least one processor-readable storage device coupled to at least one processor;
an operating system stored in the at least one processor-readable storage device and executable by the at least one processor; and
a client application operable to facilitate technical support services independent of the operating system, wherein the client application is configured to:
generate a current configuration file including current system-specific parameters of a current configuration of the device platform;
transmit to a remote technical support server the current configuration file including the current system-specific parameters;
receive from the remote technical support server configuration difference information;
generate, using the configuration difference information received from the remote technical support server, a prior configuration file including prior system-specific parameters of a prior system configuration of the device platform;
present to a user the current configuration of the device platform and the prior system configuration of the device platform in a window pane that is positioned next to a chat window pane in an integrated graphical user interface window;
receive from the remote technical support server a plurality of selectable hyperlinks to a plurality of web pages that include a plurality of solutions to solve a plurality of problems with the device platform;
navigate to the one of the plurality of web pages in response to receiving an indication of a user selection of one of the plurality of hyperlinks;
store the one of the plurality of hyperlinks in a first file; and
store each of the plurality of hyperlinks, other than the one of the plurality of hyperlinks, in a second file.

2. The apparatus of claim 1, wherein the client application is functionally at least semi-autonomous from the operating system.

3. The apparatus of claim 2, wherein the client application includes an embedded browser functionally autonomous from any browser application installed on the apparatus.

4. The apparatus of claim 3, wherein the embedded browser enables Internet browsing if a technical problem prevents browsing via another browser application.

5. The apparatus of claim 4, wherein the embedded browser is configured to navigate to one or more technical problem resolution pages accessible via the Internet.

6. The apparatus of claim 3, wherein the client application further comprises a chat module.

7. The apparatus of claim 6, wherein the chat module enables online chat between an end user and a technical support agent.

8. The apparatus of claim 7, wherein a chat user interface is integrated with an apparatus inventory interface.

9. The apparatus of claim 7, wherein a chat user interface is integrated with a user region configured to present a user interface selectable from a plurality of user interfaces.

10. The apparatus of claim 9, wherein the plurality of user interfaces comprise two or more of an inventory user interface, an embedded browser user interface, and a resolutions user interface.

11. The apparatus of claim 2, wherein the client application comprises a virtual machine.

12. The apparatus of claim 2, wherein the client application includes a network adapter interface independent from the operating system to enable network communications if the operating system network adapter interface is not fully operational.

13. The apparatus of claim 2 wherein the client application includes a process manager independent from the operating system to enable process management if the operating system process manager is not fully operational.

14. The apparatus of claim 2, wherein the client application includes a memory manager independent from the operating system to enable memory management if the operating system memory manager is not fully operational.

15. The apparatus of claim 2, wherein the client application includes structured file system support independent from the operating system to enable file system support if the operating system file system support is not fully operational.

16. The apparatus of claim 2, wherein the client application includes security functionality independent from the operating system to enable security if the operating system security functionality is not fully operational.

17. A method comprising:
providing a device platform;
providing an operating system on the device platform;
loading a client application on the device platform, the client application being operable to facilitate technical support services independent of the operating system;
generating, by the client application, a current configuration file including current system-specific parameters of a current configuration of the device platform;
transmitting, by the client application, to a remote technical support server the current configuration file including the current system-specific parameters;
receiving, by the client application, from the remote technical support server configuration difference information;
generating, by the client application using the configuration difference information, a prior configuration file including prior system-specific parameters of a prior system configuration of the device platform;
presenting, by the client application, to a user the current configuration of the device platform and the prior system configuration of the device platform in a window pane that is positioned next to a chat window pane in an integrated graphical user interface window;
receiving, by the client application, from the remote technical support server a plurality of selectable hyperlinks to a plurality of web pages that include a plurality of solutions to solve a plurality of problems with the device platform;
navigating, by the client application, to the one of the plurality of web pages in response to receiving an indication of a user selection of one of the plurality of hyperlinks;
storing, by the client application, the one of the plurality of hyperlinks in a first file; and
storing, by the client application, each of the plurality of hyperlinks, other than the one of the plurality of hyperlinks, in a second file.

18. The method of claim 17 wherein the client application is functionally at least semi-autonomous from the operating system.

19. The method of claim 17 wherein the client application can establish network communications, despite improper functioning of a network communications function of the operating system.

20. The method of claim 17, further comprising providing an embedded browser as part of the client application.

21. The method of claim 20, wherein the embedded browser is autonomous from any browsers installed on the device platform.

22. The method of claim 20, wherein the embedded browser enables network resource browsing, despite malfunction of the operating system or malfunction of other browser applications provided on the computer.

23. The method of claim 17, further comprising providing a chat module as part of the client application.

24. The method of claim 17, further comprising providing a user interface comprising a chat interface region and a user interface region, wherein the chat interface region presents a user interface for chatting and wherein the user interface region presents a user interface associated with another module.

25. The method of claim 24, wherein the user interface associated with another module is user selectable from a plurality of user interfaces.

26. The method of claim 24, wherein the plurality of user interfaces comprises a computer inventory user interface, a problem resolutions interface, and an embedded browser interface.

27. The method of claim 17, wherein the device platform comprises one of a computer, a handheld computer, a PDA, a set-top box, a cell phone, a router, a game console, or a media console.

28. A non-transitory computer-readable storage medium having contents that enable a device platform to deliver technical support service, the contents causing the device platform to:
load a client application on the device platform, the client application being operable to facilitate technical support services independent of an operating system provided on the device platform the client application causing the device platform to:
generate a current configuration file including current system-specific parameters of a current configuration of the device platform;
transmit to a remote technical support server the current configuration file including the current system-specific parameters;
receive from the technical support server configuration difference information;
generate, using the configuration difference information, a prior configuration file including prior system-specific parameters of a prior system configuration of the device platform;
present to a user the current configuration of the device platform and the prior system configuration of the device platform in a window pane that is positioned next to a chat window pane in an integrated graphical user interface window;
receive from the remote technical support server a plurality of selectable hyperlinks to a plurality of web pages that include a plurality of solutions to solve a plurality of problems with the device platform;
navigate to the one of the plurality of web pages in response to receiving an indication of a user selection of one of the plurality of hyperlinks;
store the one of the plurality of hyperlinks in a first file; and
store each of the plurality of hyperlinks, other than the one of the plurality of hyperlinks, in a second file.

29. The non-transitory computer-readable storage medium of claim 28, wherein the chat window pane presents a user interface for chatting and wherein the integrated graphical user interface window presents a user interface associated with another module.

30. The non-transitory computer-readable storage medium of claim 29, wherein the integrated graphical user interface window includes a computer inventory user interface, a problem resolutions interface, and an embedded browser interface.

* * * * *